Dec. 27, 1966 J. G. NIGHTINGALE 3,294,911

TELEPHONE SYSTEM CALCULATOR

Filed Oct. 16, 1963 54 Sheets-Sheet 1

INVENTOR.
J. G. NIGHTINGALE
BY G. E. Kersey
ATTORNEY

Dec. 27, 1966 J. G. NIGHTINGALE 3,294,911

TELEPHONE SYSTEM CALCULATOR

Filed Oct. 16, 1963 54 Sheets-Sheet 3

Dec. 27, 1966 J. G. NIGHTINGALE 3,294,911

TELEPHONE SYSTEM CALCULATOR

Filed Oct. 16, 1963 54 Sheets-Sheet 7

Dec. 27, 1966 J. G. NIGHTINGALE 3,294,911

TELEPHONE SYSTEM CALCULATOR

Filed Oct. 16, 1963 54 Sheets-Sheet 11

Dec. 27, 1966 J. G. NIGHTINGALE 3,294,911

TELEPHONE SYSTEM CALCULATOR

Filed Oct. 16, 1963 54 Sheets-Sheet 15

TELEPHONE SYSTEM CALCULATOR

Filed Oct. 16, 1963

Dec. 27, 1966 J. G. NIGHTINGALE 3,294,911

TELEPHONE SYSTEM CALCULATOR

Filed Oct. 16, 1963 54 Sheets-Sheet 21

Dec. 27, 1966 J. G. NIGHTINGALE 3,294,911

TELEPHONE SYSTEM CALCULATOR

Filed Oct. 16, 1963 54 Sheets-Sheet 22

Dec. 27, 1966 J. G. NIGHTINGALE 3,294,911

TELEPHONE SYSTEM CALCULATOR

Filed Oct. 16, 1963 54 Sheets-Sheet 24

Dec. 27, 1966 J. G. NIGHTINGALE 3,294,911

TELEPHONE SYSTEM CALCULATOR

Filed Oct. 16, 1963 54 Sheets-Sheet 25

Dec. 27, 1966 J. G. NIGHTINGALE 3,294,911

TELEPHONE SYSTEM CALCULATOR

Filed Oct. 16, 1963 54 Sheets-Sheet 27

Dec. 27, 1966 J. G. NIGHTINGALE 3,294,911

TELEPHONE SYSTEM CALCULATOR

Filed Oct. 16, 1963 54 Sheets-Sheet 28

Dec. 27, 1966 J. G. NIGHTINGALE 3,294,911

TELEPHONE SYSTEM CALCULATOR

Filed Oct. 16, 1963 54 Sheets-Sheet 34

Dec. 27, 1966 J. G. NIGHTINGALE 3,294,911

TELEPHONE SYSTEM CALCULATOR

Filed Oct. 16, 1963 54 Sheets-Sheet 39

Dec. 27, 1966 J. G. NIGHTINGALE 3,294,911

TELEPHONE SYSTEM CALCULATOR

Filed Oct. 16, 1963 54 Sheets-Sheet 44

Dec. 27, 1966 J. G. NIGHTINGALE 3,294,911

TELEPHONE SYSTEM CALCULATOR

Filed Oct. 16, 1963 54 Sheets-Sheet 45

Dec. 27, 1966 J. G. NIGHTINGALE 3,294,911

TELEPHONE SYSTEM CALCULATOR

Filed Oct. 16, 1963 54 Sheets-Sheet 46

Dec. 27, 1966 J. G. NIGHTINGALE 3,294,911

TELEPHONE SYSTEM CALCULATOR

Filed Oct. 16, 1963 54 Sheets-Sheet 50

Dec. 27, 1966 J. G. NIGHTINGALE 3,294,911

TELEPHONE SYSTEM CALCULATOR

Filed Oct. 16, 1963 54 Sheets-Sheet 51

Dec. 27, 1966 J. G. NIGHTINGALE 3,294,911

TELEPHONE SYSTEM CALCULATOR

Filed Oct. 16, 1963 54 Sheets-Sheet 53

3,294,911

TELEPHONE SYSTEM CALCULATOR

John G. Nightingale, Fairlawn, N.J., assignor to Bell Telephone Laboratories, Incorporated, New York, N.Y., a corporation of New York Filed Oct. 16, 1963, Ser. No. 316,653
8 Claims. (Cl. 179—7.1)

Figure 1:
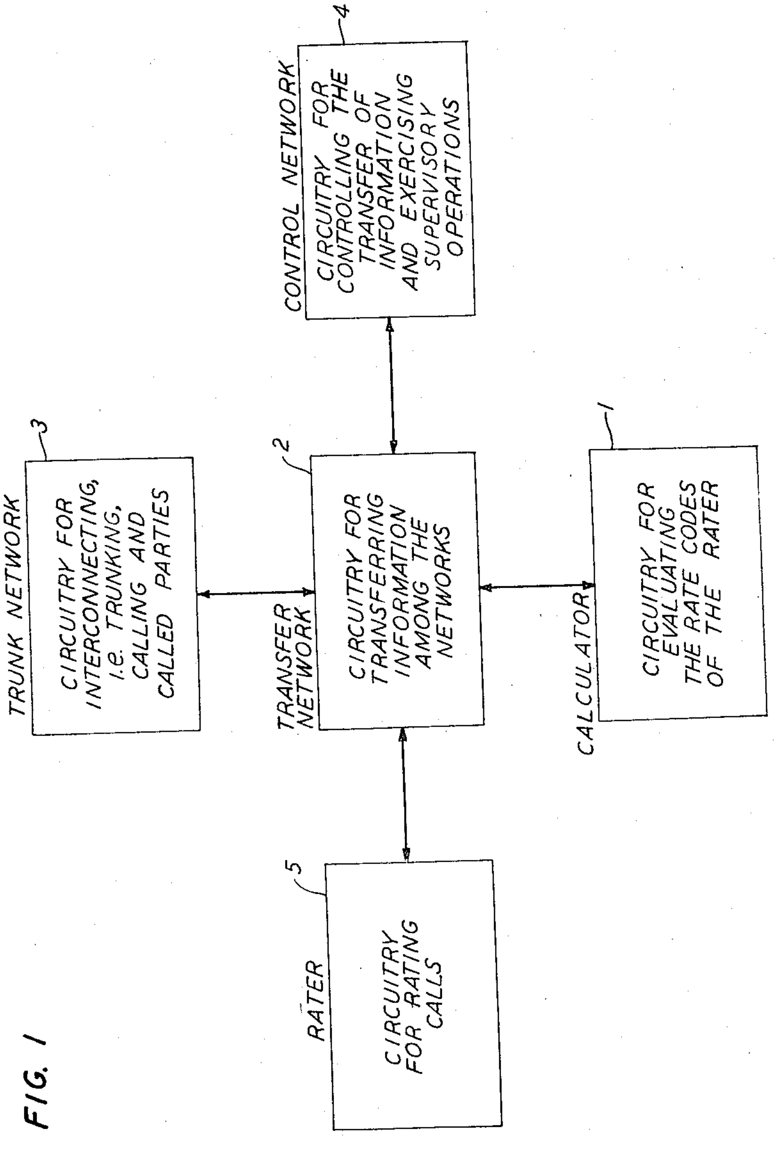

This invention relates to a calculator, particularly for assessing charges in a telephone system.

Among the available services of a telephone system is the facility for making calls from widely distributed public stations. The charges against such calls are assessed on a toll or a "pay-as-you-use" basis. To reach a party within a fixed-charge zone, a caller deposits a prescribed monetary amount. For calls beyond the zone the caller contacts a control center, typically staffed by an operator, where the charges are assessed.

At the control center the assessment is made on the basis of a rate schedule interrelating points of origin with points of destination. As long as the schedule contains a limited number of relatively fixed entries, it can be consulated with ease by an operator. However, where there are many factors and frequent changes, use of the schedule becomes burdensome. Besides having to distinguish between station-to-station and person-to-person calls and between initial and overtime periods, the operator may have to take into account whether there is a surcharge, whether an overtime interval is prepaid or postpaid, and whether there has been an initial deposit. And there is often a tax consideration as well.

Accordingly, it is an object of the invention to make calculations taking into account a multiplicity of factors. A related object is to reduce the burden of assessing charges subject to such factors. Another object is to expedite the assessment of charges against calls originating at pay stations.

For most toll calls, such as those originating at private stations, there is no urgency in the assessment of charges. It is only necessary that the charge data be accumulated for later processing at an automatic accounting center in time for regular billing. With calls from pay stations, however, the charges must be immediately available because they must be levied at the time of each call.

Hence it is a still further object of the invention to provide rapid calculations in the presence of multiple factors. A companion object is to rapidly assess charges against calls originating at pay stations.

The number and character of the digits generated during a calculation will often be at variance with the format of the desired result. In that event the result is rounded to the digit of the lowest order permitted by the format.

Such is the case with a pay station where the assessment on a call includes an element of tax. Ordinarily the tax is a preassigned fraction of a basic charge. This assessment must be rounded to the smallest monetary unit collectible at the pay station. For example, if the tax rate is ten percent and the smallest monetary unit is a nickel, a call rated at twenty cents is not taxed at all since ten percent of the basic rate is but a minor fraction or two-fifths of a nickel. On the other hand, a call rated at thirty cents requires a five cent tax since ten percent of the basic rate is a major fraction or three-fifths of a nickel. The demarcation between tax and no-tax is set at the fifty percent point so that a tax increment is added at twenty-five cents and every fifty cents thereafter.

Thus it is a still further object of the invention to perform rounded calculations according to a prescribed format. A related object is to do so in the context of telephone calls subject to tax assessments.

Because of the "pay-as-you-use" principle in the initial period charge and its associated tax are collected at the time the call is placed. Subsequent overtime periods are treated either individually or collectively in a similar fashion. Each time a charge is calculated, the associated tax is appropriately rounded. Unless care is taken, the successive roundings can lead to a cumulative error that distorts the totality of the tax assessed against the entire duration of a call. The problem is particularly acute with calls originating at pay stations where the caller ordinarily does not know beforehand whether or not the call will extend into an overtime period, or if it should, the duration of the overtime interval.

Accordingly it is another object of the invention to accurately calculate the tax due on calls originating at public stations. A companion object is to eliminate distortions in the taxing of calls for which separate tax deposits are made with respect to initial and overtime periods.

To accomplish the foregoing and related objects the invention provides a calculator with input, multiplier, arithmetic and output sections.

Incoming code information is translated into indications which are variously applied to the multiplier and arithmetic sections. Other incoming information is processed by a control network for the multiplier and output sections.

One of the indications is summed with a preassigned fraction of it in the arithmetic section. The resulting summation is adjusted, typically by subtraction, and coded for outward dispatch.

Under some circumstances the product of another indication by a quantity from the control network is obtained at the multiplier section and successively summed with the first indication and an adjusted fraction of the resultant summation. This fraction is typically the difference between the new, unadjusted fraction and that originally obtained. The ultimate summation is then coded for outward dispatch.

Under other circumstances the successive summations take place with respect to the original product as supplemented by the product of still another indication by another quantity from the control network.

Under still other circumstances the information coded for outward dispatch is adjusted by addition beforehand.

The foregoing operations are particularly appropriate for determining the various charges to be assessed against a call originating at a pay station.

The incoming information is in the form of rate code signals, along with classification and control signals. The rate code signals act upon a translator in conjunction with the classification signals to provide rate and time indications for initial and overtime periods. The control signals cause the control network to indicate the total number of surcharge and regular overtime periods, as well as the entire duration of each overtime interval.

The initial rate indication is applied to the addend register of an adder in the arithmetic section. An auxiliary calculator is used to take a preassigned fraction, typically ten percent, of the addend indication. The latter, as rounded to the smallest monetary unit, is entered into the augend register so that the initial output of the adder represents the tax-augmented rate for the initial period of the call. Before being dispatched outwardly, the tax-augmented rate is adjusted to compensate for any deposit retained at the time the call was initiated.

If the call extends into overtime, the calculator is again brought into operation. Since the basic overtime charge ordinarily will also be subject to augmentation by a tax that is rounded to the smallest monetary unit, the invention provides for preventing the second and subsequent roundings from distorting the total amount collected. This is done by supplementing the overtime charge by the difference between the tax applicable to either the projected or actual entire duration of a call and that assessed against the initial period.

Where prepaid, the overtime charge is tax-incremented at intervals governed by a prescribed rate structure. Where postpaid, the tax-supplemented overtime charge is established by (1) deriving the difference between total and initial tax assessments from initial and overtime period information stored in the addend and augend registers of an adder and (2) replacing the initial period information by the derived difference information.

In the case of a surcharge for overtime, the adder is entered by way of an auxiliary adder which combines the regular and surcharge overtime charges.

According to a feature of the invention, a decoder of the translator is arranged to produce separate fields of code points for station-to-station, person-to-person and overtime period calls. To reduce the number of components required for the rate and time indications of the translator, each code point scheduled for translation is extended from one indicating component to another by successive switching operations.

In keeping with another feature of the invention, calculations made on a biquinary basis are rounded to one digit of a digit pair by having the quinary contacts of the next higher order digit pair combined with its binary contacts, and binary contacts at the level of rounding, to produce an indication according to the range of the numerical quantity stored in the adder.

By still further features of the invention, provision is made for subtractively and additively adjusting provisional calculations by rerouting quinary indications and interchanging pre-existing binary indications.

Figure 2A:
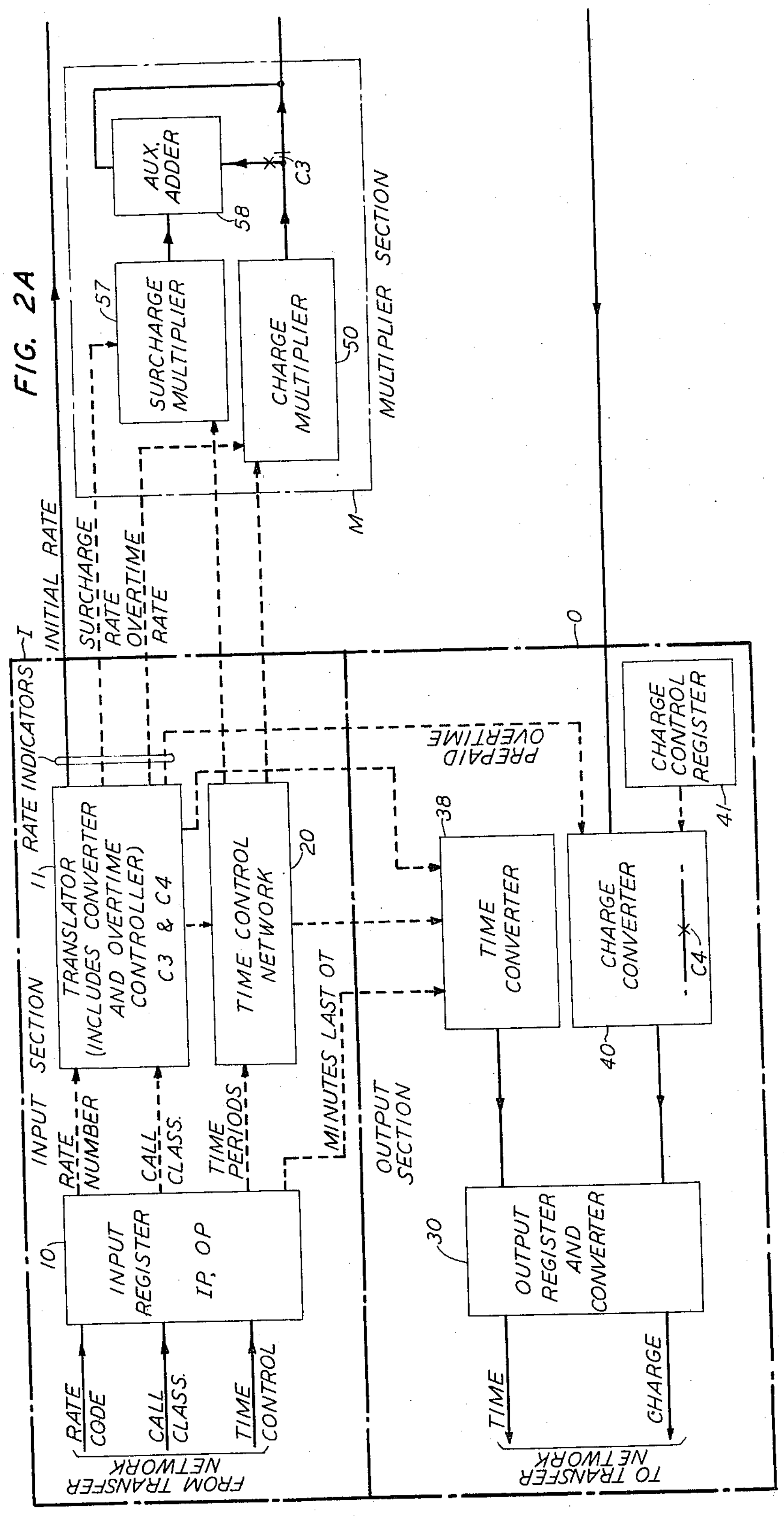
Figure 2B:
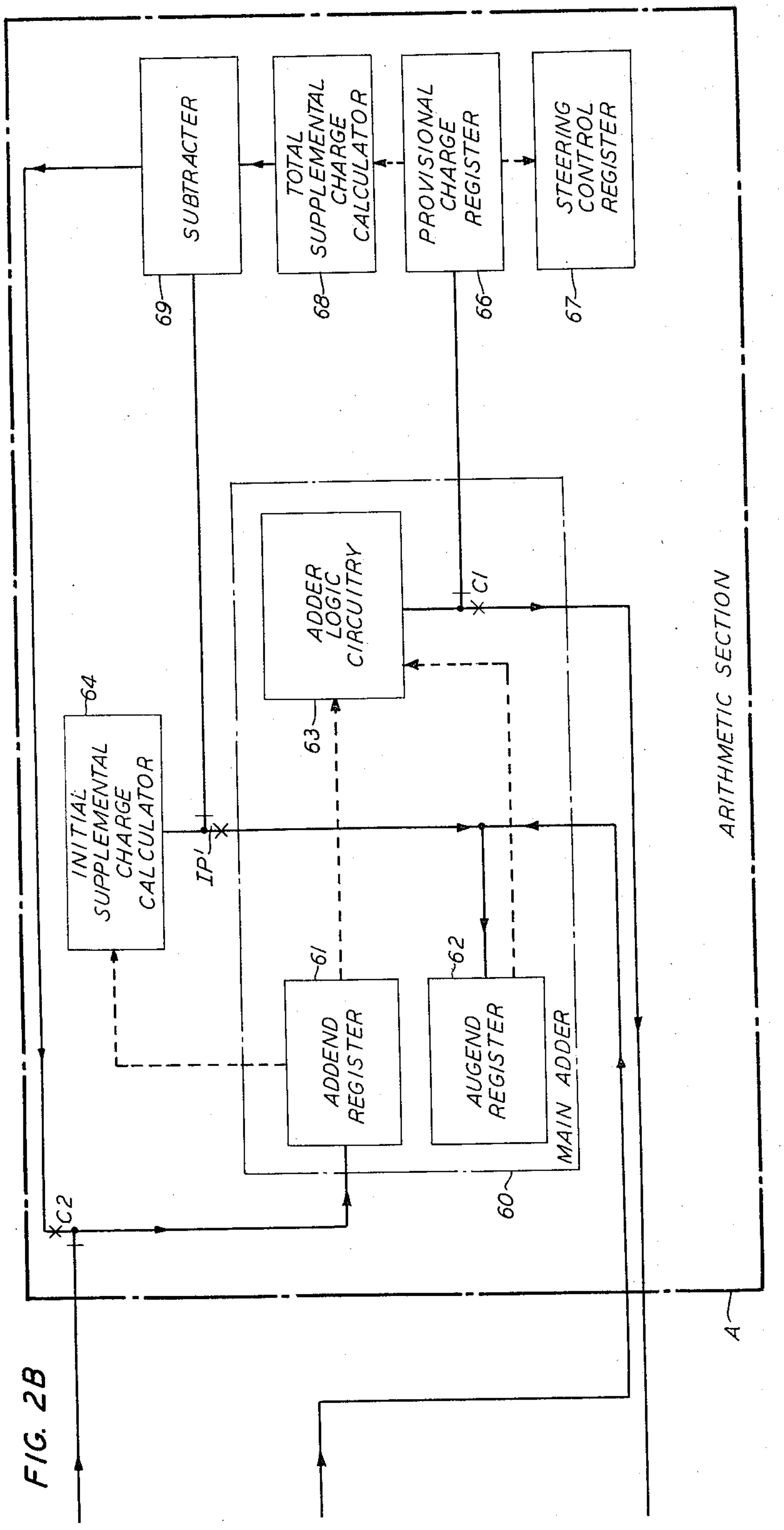
Figures 3, 5:
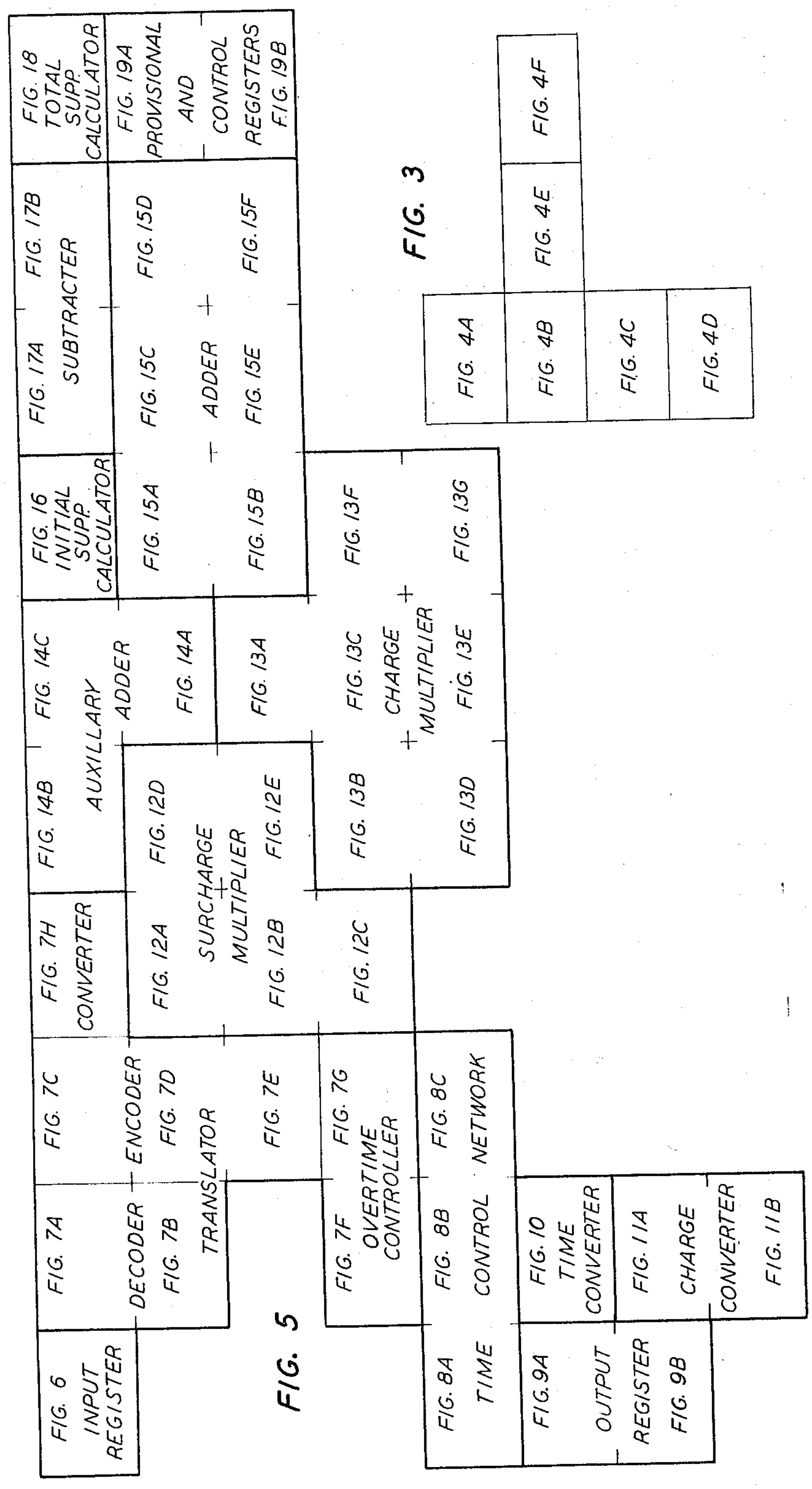

Other aspects of the invention will become apparent after considering an illustrative embodiment taken in conjunction with the drawings in which:

FIG. 1 is a block diagram setting forth the environment of a telephone system calculator;

FIGS. 2A and 2B constitute a block diagram of the calculator in FIG. 1;

FIG. 3 is a key diagram for FIGS. 4A through 4F constituting an expanded block diagram for the calculator of FIGS. 2A and 2B; and FIG. 5 is a key diagram for FIGURES 6, 7A–7H, 8A–8C, 9A–9B, 10, 11A–11B, 12A–12E, 13A–13G, 14A–14C, 15A–15F, 16, 17A–17B, 18, and 19A–19B showing the calculator of FIGURES 4A–4F in detail.

With reference to FIG. 1, the calculator 1 provided by the invention desirably operates in the environment of a telephone system. Central to the system is a transfer network 2 for transferring data and information. Such information arrives from a calling party by way of a trunk network 3 and after being analyzed in a control network 4, provides the basis upon which an interconnection is made with a called party. Typically the control network 4 terminates in a manual switchboard occupied by an operator and designated the "position," but the control network can be fully automatic.

When a call is to be placed from a toll or pay station, the position is supplied with a variety of source and designation information. This information is dispatched through the transfer network 2 to a rater 5 which provides the position with a rate code number. From the position the rate code number is sent to the calculator 1 where a determination is made as to the charges and their associated intervals.

By having the rating and calculating functions performed in separate units, the system is given added flexibility. The rater 5 is needed only once per call, but the calculator 1 is used from time to time in dependence upon the progress of the call. Once the rate code number from the rater is available at the position, it is readily dispatched to the calculator as needed. In addition, changes in complex rate structures are more easily accommodated by having the units separate.

The calculator is set forth broadly in FIGS. 2A and 2B. FIG. 2A is devoted to the input, multiplier, and output sections I, M and O; FIG. 2B deals solely with the arithmetic section A.

Incoming rate code, call classification, and time control information is stored in a register 10 of the input section. Among other things the call classification information designates that the call is in the initial period IP or in the overtime period OP. The rate code information, representing a rate number, in conjunction with the call classification information, activates a translator 11 whose output is in the form of initial and overtime rate and period indications.

A representative indication might be "ten cents for the first three minutes and five cents for each additional two minutes." Also available at a time control network 20 of the input section are indications derived from the time control information relating to the number of overtime periods and the number of sucharge periods.

To determine the initial period assessment, the initial rate indication is entered into the addend register 61 of an adder 60 in the arithmetic section of FIG. 2B. The designation "addend" is arbitrary. Addition involves the summation of two quantities, one called the addend and the other called the augend because it "augments" the addend. But since addition is commutative, it does not not matter whether the first quantity is added to the second or vice versa.

In response to the addend information, the initial supplemental charge calculator 64, discussed in detail subsequently, produces an output indication which is a preassigned fraction, typically ten percent, of the addend monetary charge. This indication enters the augend register 62 through a switch IP′ that is controlled from the input register 10 of FIG. 2A.

The presence of information in both the augend and addend registers operates adder logic circuitry 63 whose output is routed through a switch C1 to a charge converter 40 in the output section of FIG. 2A. Where the initial deposit of a caller has been retained in the coin box of a pay station, a charge control register 41 causes the amount of the deposit, typically ten cents, to be subtracted from the calculated charge.

Finally, an output register 30 responds to the charge converter 40 to provide an indication of the initial period charge to be assessed against the call. Simultaneously the time interval associated with the initial period is available from the translator 11 by way of a time converter 38.

Upon completion of the initial period, the calculator enters a mode of operation governed by the category of the received rate code number. Certain of the codes are assigned to calls for which overtime is prepaid by being collected in advance of selected overtime periods. Other codes apply to postpaid overtime for which charges are collected at the end of the entire interval. Still others indicate a surcharge for which selected overtime periods are assessed at an additional rate over and above that of the other periods.

In the case of prepaid overtime the associated charge indication from the translator 11 directly activates the charge converter 40 to adjust the indicated charge according to the tax schedule. For example, if the initial charge is 10 cents and the overtime period rate is 5 cents, a tax increment is added to the indicated overtime charge at the beginning of the third overtime interval for the reason that at the end of the third overtime interval the total charge assessed against the calling party will be 25 cents mandating a tax charge of 5 cents. Details of the translator are given subsequently.

When the overtime is postapid, the number of elapsed periods is established by the time control network 20 from the incoming time control information. This number is multiplied by the translated overtime rate in a charge multiplier 50 of FIG. 2A to arrive at a basic overtime charge.

It is next necessary to augment the overtime charge by the appropriate tax. A direct assessment of this tax in the same way that the tax was initially calculated will generally distort the totality of the tax due for the entire call. For example, if the initial period charge is 25 cents followed by a similar charge for each additional overtime period, an initial tax of 10 percent collected at a coin box where a nickel is the smallest monetary unit requires the deposit of 30 cents of which 5 cents represents the tax. If the call extends to one overtime period and the tax is computed in a similar fashion, there would be an additional tax of 5 cents despite the fact that the total monetary amount for an initial period and one overtime period warrants only a 5 cent tax.

In avoiding a distortion of tax charges because of the need to make tax calculations separately, the invention calls for the recalculation of the initial tax coupled with (1) the calculation of the appropriately rounded tax on the entire call and (2) the removal of the initial tax from the final tax. The net tax thus established supplements the basic overtime charge.

To make the composite overtime calculation, including the tax assessment, the output of the charge multiplier 50 enters the augend register 62 of the FIG. 2B. Simultaneously the initial rate enters the addend register 61 and the initial tax is calculated in the fashion previously described. When both the augend and the addend registers are occupied, the adder logic circuitry 63 responds by dispatching their total to a provisional charge register 66 through a steering control switch C1. Once entered, the contents of the provisional charge register 66 enable a steering control register 67 which operates the switch C1 in preparation for the transmission of the final calculation to the charge converter 40 of FIG. 2A.

In the meantime an appropriate fraction of the total charge is determined by a total supplemental charge calculator 68. Since the calling party has already paid the initial tax, that amount is deducted in a subtractor 69 from the total amount due and the result enters the addend register 61 through a second steering control switch C2 and is combined with the previously stored contents of the augend register 62 to provide the desired total charge indication.

Contemporaneously, the time control network 20 of FIG. 2A is used to determine the entire duration of the overtime interval. This is done by multiplying the number of time periods, indicated at the input register 10, by the duration of each overtime interval. The product enters the time converter 38 where it is adjusted to include the number of minutes in the last overtime period which, when less than a full period, does not enter into the calculation previously made. The time and charge information now available at the output register 30 are dispatched to the control network 4 of FIG. 1.

Where the overtime interval is subject to a surcharge, a corresponding rate indication appears at the output of the translator 11 and a controller is activated within the translator. The surcharge rate is multiplied by the applicable number of overtime periods in a surcharge multiplier 57 to yield the basic surcharge. Because of the operation of a controller switch C3 in the multiplier section, the surcharge is combined with the basic overtime charge in an auxiliary adder 58 of the multiplier section in FIG. 2A. Thence the overtime charge information is processed in the fashion previously described.

The block units of FIGS. 2A and 2B are made up of switching elements which, for example, may be electromagnetic relays and their associated contacts. In that event the initial period and overtime registrations are made by energizing relay coils. Where the registration is to be retained beyond the energizing interval, provision is made for latching the coils in conventional fashion. The control switches C1 through C3 become transfer contacts of various relays, i.e., paired front and back contacts. When a relay having a pair of transfer contacts is energized, normally closed back contacts, symbolized by a bar, open and disrupt a previously closed path. At the same time normally open front contacts, symbolized by an "*x*," close and establish a conduction path.

Figure 4A:
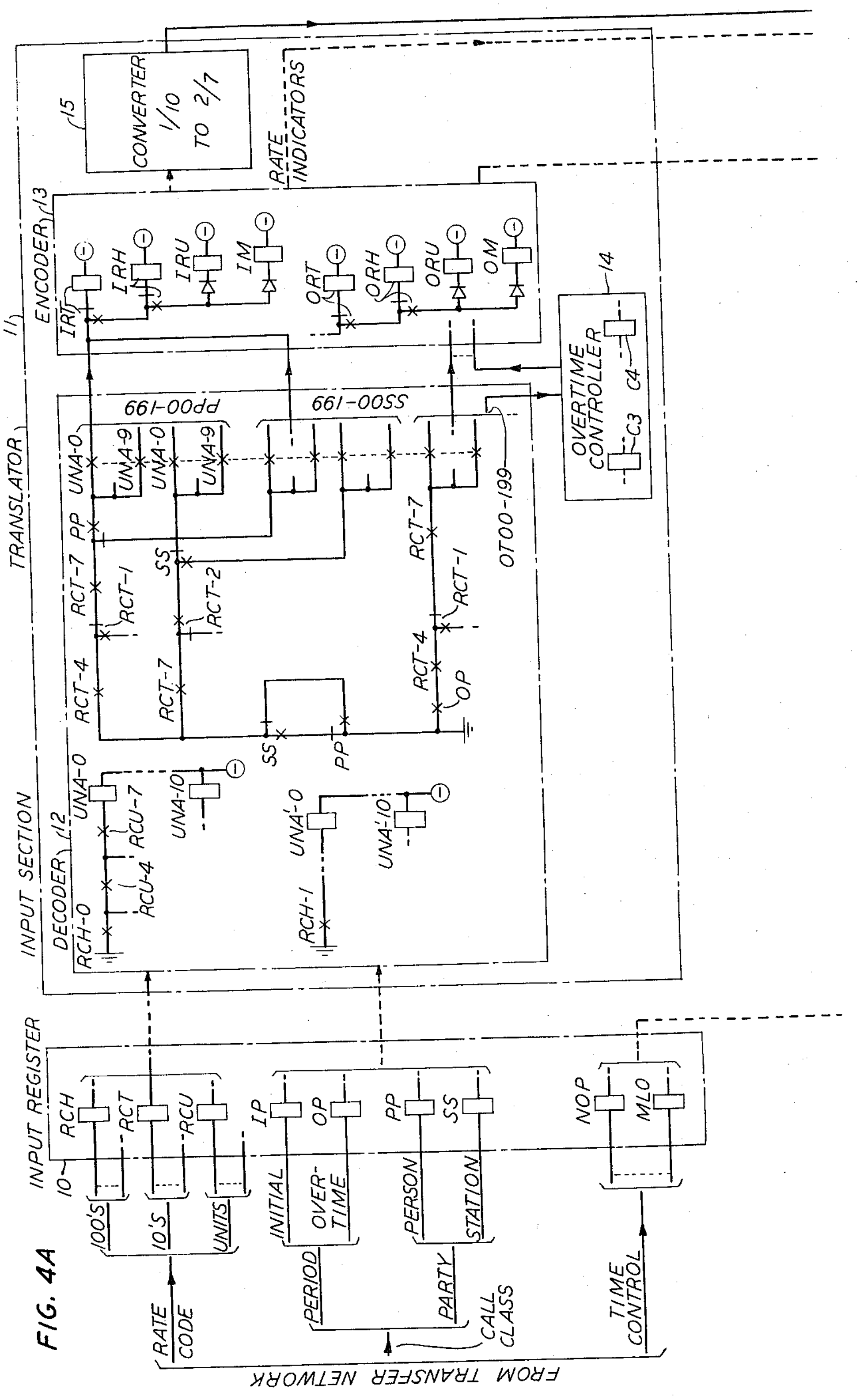

Turning to FIGS. 4A through 4F, arranged according to key FIG. 3, and considering the calculator of FIGS. 2A and 2B in greater detail, the rate code information at the input register 10 of FIG. 4A can represent, for example, any one of 200 decimal designations. For such a case the rate information is expressed by a units, a tens and a hundreds digit. Following customary telephone practice, signals representing the units and the tens digits are transmitted in two-out-of-five code. That is to say, each units digit is represented by a preassigned permutation of signals which activate two-out-of-five Rate Code Unit relays RCU–0, 1, 2, 4 and 7. The suffix designations have been chosen to indicate directly how the relays are paired to represent all digits, except 0. Thus relays RCU–2 and RCU–4 are used for digit 6. Digit 0 is represented by RCU–4 and RCU–7. Similar two-out-of-five Rate Code Tens relays RCT–0, 1, 2, 4 and 7 operate for each tens digit.

It is well known that the number of unique ways in which two items may be selected out of five is ten, which makes this code admirably suited for representing decimal digits. In addition since two signals are transmitted to represent each digit, the code is relatively easy to check for error. If more than two signals are received or if only one is received, it is apparent that there has been a fault in transmission or reception.

Since, for the purpose of illustration, the rate code numbers do not extend beyond 200, the two-out-of-five coding scheme is not required to represent the hundreds digits. For the latter it is only necessary to activate one out of two Rate Code Hundreds relays RCH–0 and RCH–1.

Another category of the registered information relates to the classification of the call. For this purpose a Station-to-Station relay SS or a Person-to-Person relay PP is energized. In addition an initial talking period is indicated by an Initial Period relay IP, while overtime is signified by an Overtime Period relay OP.

Associated with each overtime interval is time control information which operates the Number of Overtime Period relays NOP–0, 1, 2, 4 and 7 and the Minutes in the Last Overtime period relays MLO–0 through 4. The input register is shown in complete detail in FIG. 6.

Once the rate code number is registered, it must be translated to provide a rate indication in dollars and cents and an associated time period indication. For this purpose the translator 11 of FIG. 4A includes a decoder 12, and encoder 13 and a converter 15.

The decoder 12 transforms a number in two-out-of-five code to a code point on one of a plurality of leads in one or more fields PPOO–199, SSOO–199 and OTOO–199 respectively associated with person-to-person, station-to-station and overtime call classifications. The Rate Code Unit relays RCU–0, 1, 2, 4 and 7 operate associated contacts in the decoder which, in conjunction with the operation of a Rate Code Hundreds relay RCH–0 or 1, close a path to one of ten Units Auxiliary relays UNA-0 through 9 or UNA'–0 through 9. For example, in keeping with the two-out-of-five code, the zero Units Auxiliary relay UNA–0 is activated for the simultaneous occurrence of signals at the Rate Code Units relays RCU–4 and RCU–7.

Similarly, the Rate Code Tens relays RCT–0, 1, 2, 4 and 7 close one path out of ten, which, by virtue of one out of ten Units Auxiliary contacts, culminates in one out of two hundrede code points 00 to 199.

The number of code points is doubled into separate fields for person-to-person and station-to-station calls by the operation of the Person-to-Person PP and Station-to-Station SS relays. The contacts for these relays are arranged so that in the person-to-person and station-to-station fields, half of the code points are associated with normally open contacts while the other half are associated with normally closed contacts. Spurious effects through normally closed contacts are prevented by having the path extending to the code points include Station-to Station and Person-to-Person transfer contacts arranged so that one or the other must be operated for continuity.

A third field, estabishing overtime code points, requires closure of the Overtime Period relay contacts OP. Thus, during overtime the rate code information, together with the call classification information, results in the appearance of one out of two hundred code points in the overtime field and in either the person-to-person or the station-to-station field. Complete details of the decoder 12 are given in FIGS. 7A and 7B.

The paths extended to the code points 00 to 199 serve in the encoder 13 to energize indicating relays which establish the monetary charge and its associated time interval. This is accomplished by having successive relays operate and extend the path to still others. Thus a ground on one of the code points in the station-to-station or person-to-person field SSOO–199 or PPOO–199 activates one of ten Initial Rate Tens relay IRT which, in turn, extends the ground through a transfer to one of ten Initial Rate Hundreds relay IRH. Operation of the latter is responsible for an extension through a transfer to an Initial Rate Units relay IRU and an Initial Minutes relay IM. During overtime there is an additional operation of an Overtime Rate Tens relay ORT, an Overtime Rate Hundreds relay ORH, an Overtime Rate Units relay ORU and an Overtime Minutes relay OM.

Figure 7A:
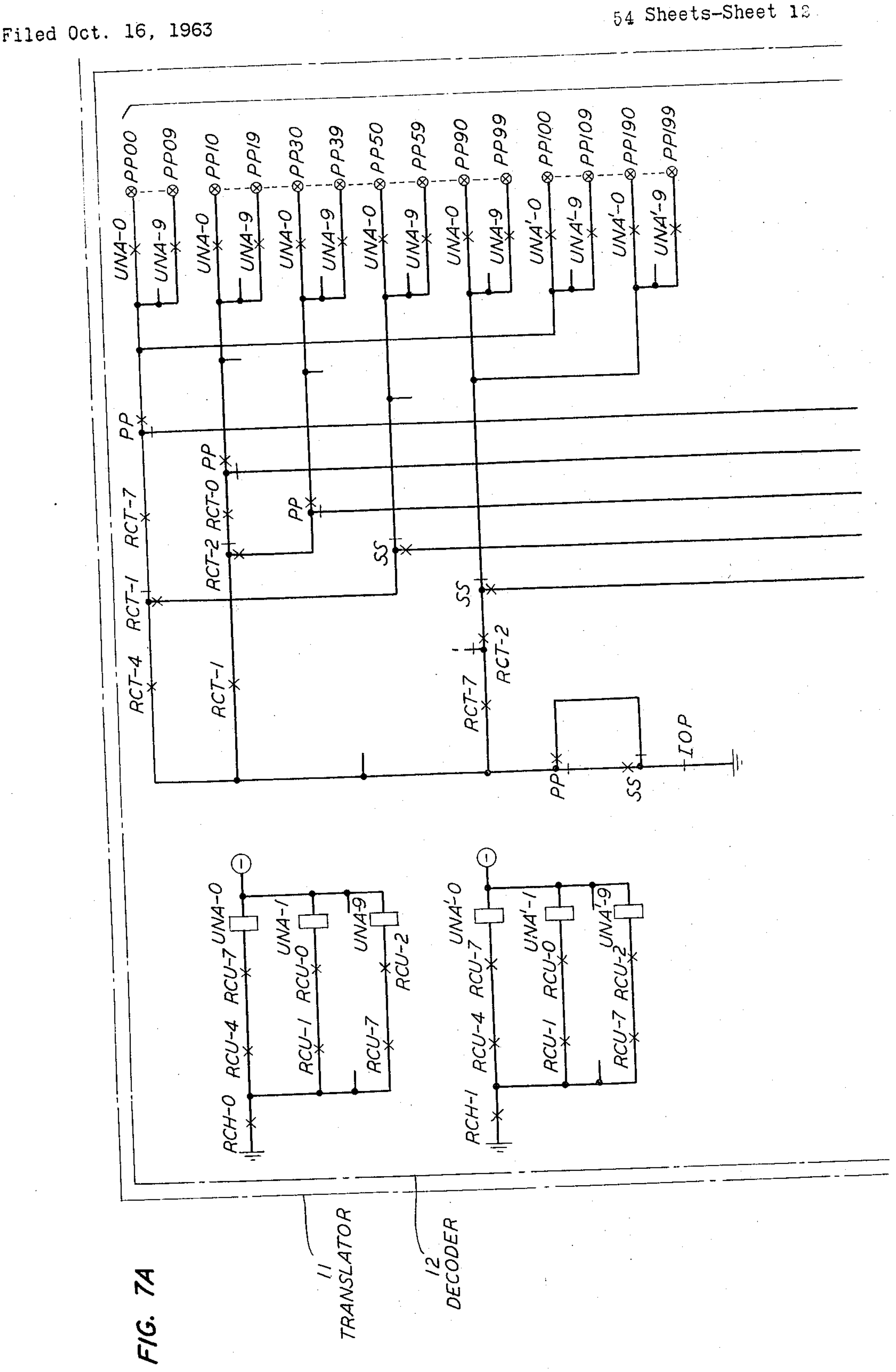
Figure 7B:
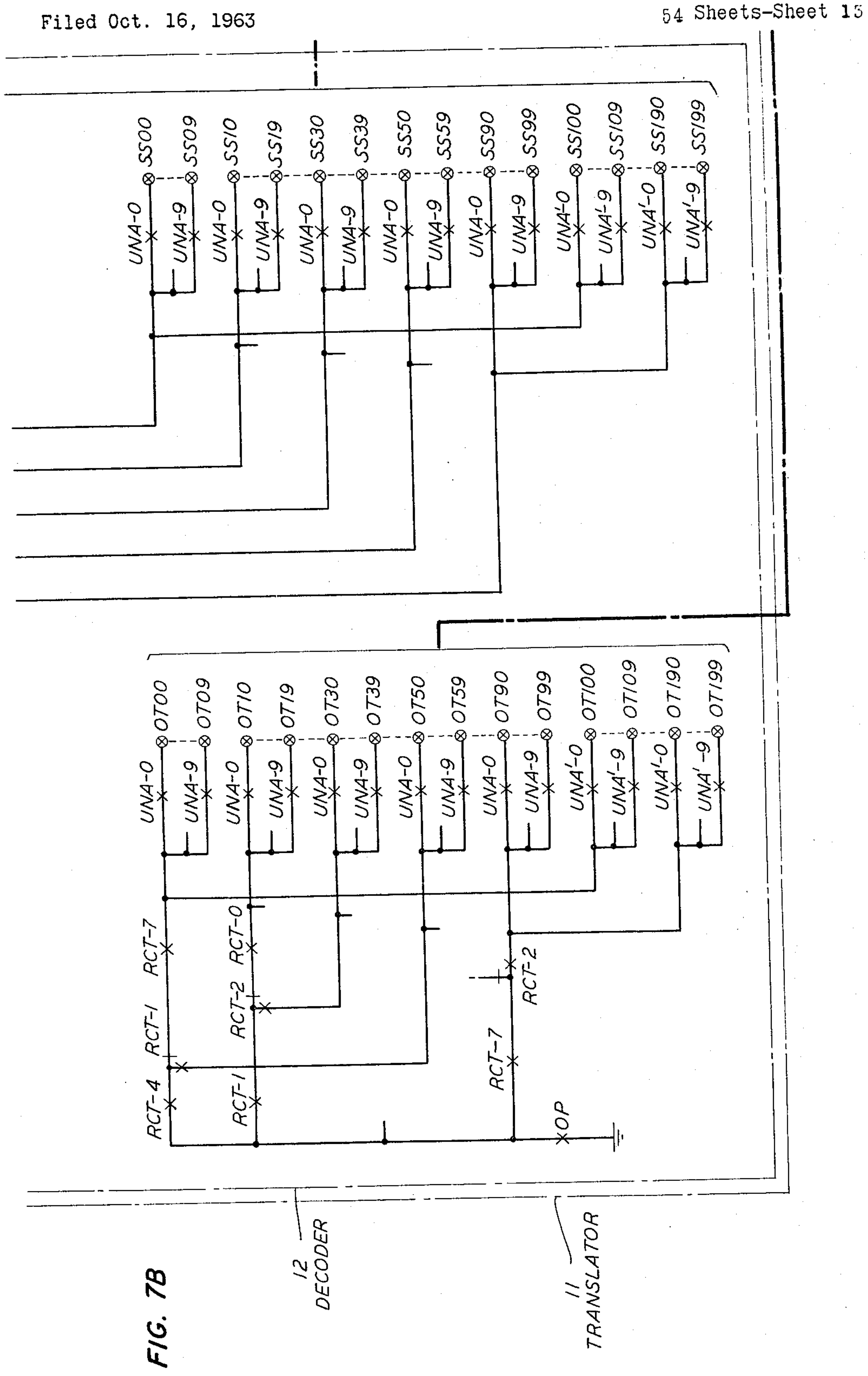
Figure 7C:
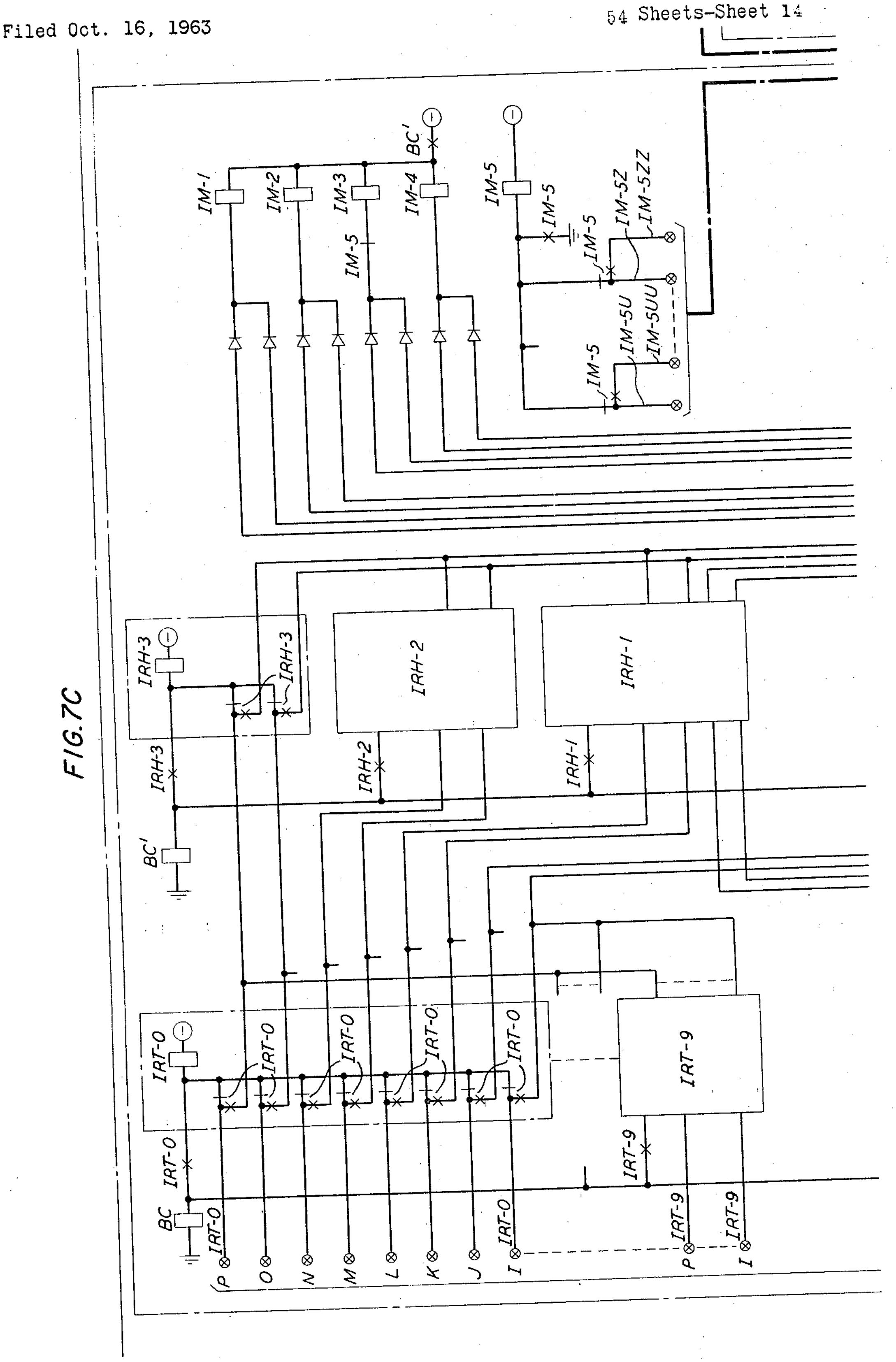
Figure 7D:
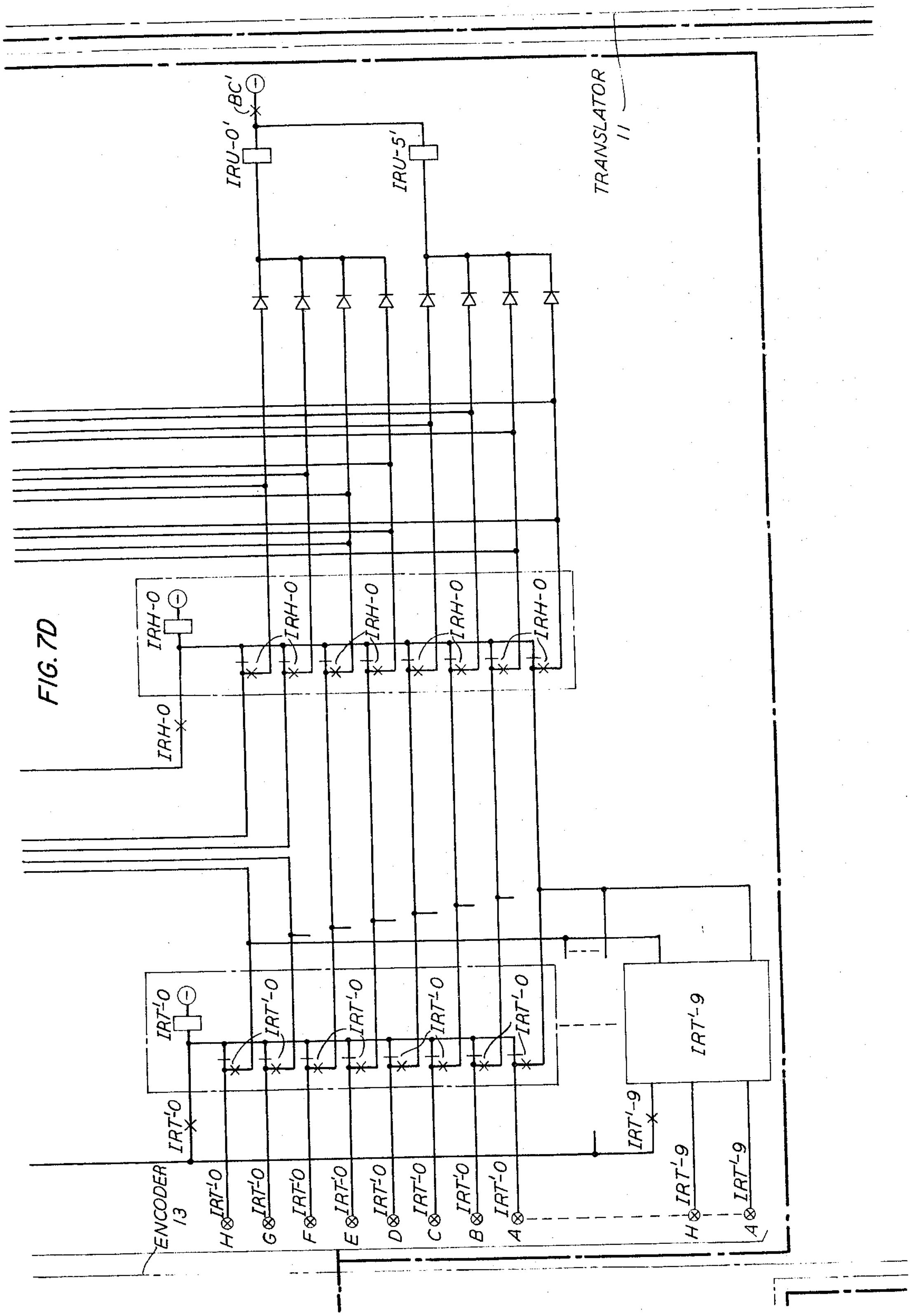
Figure 7E:
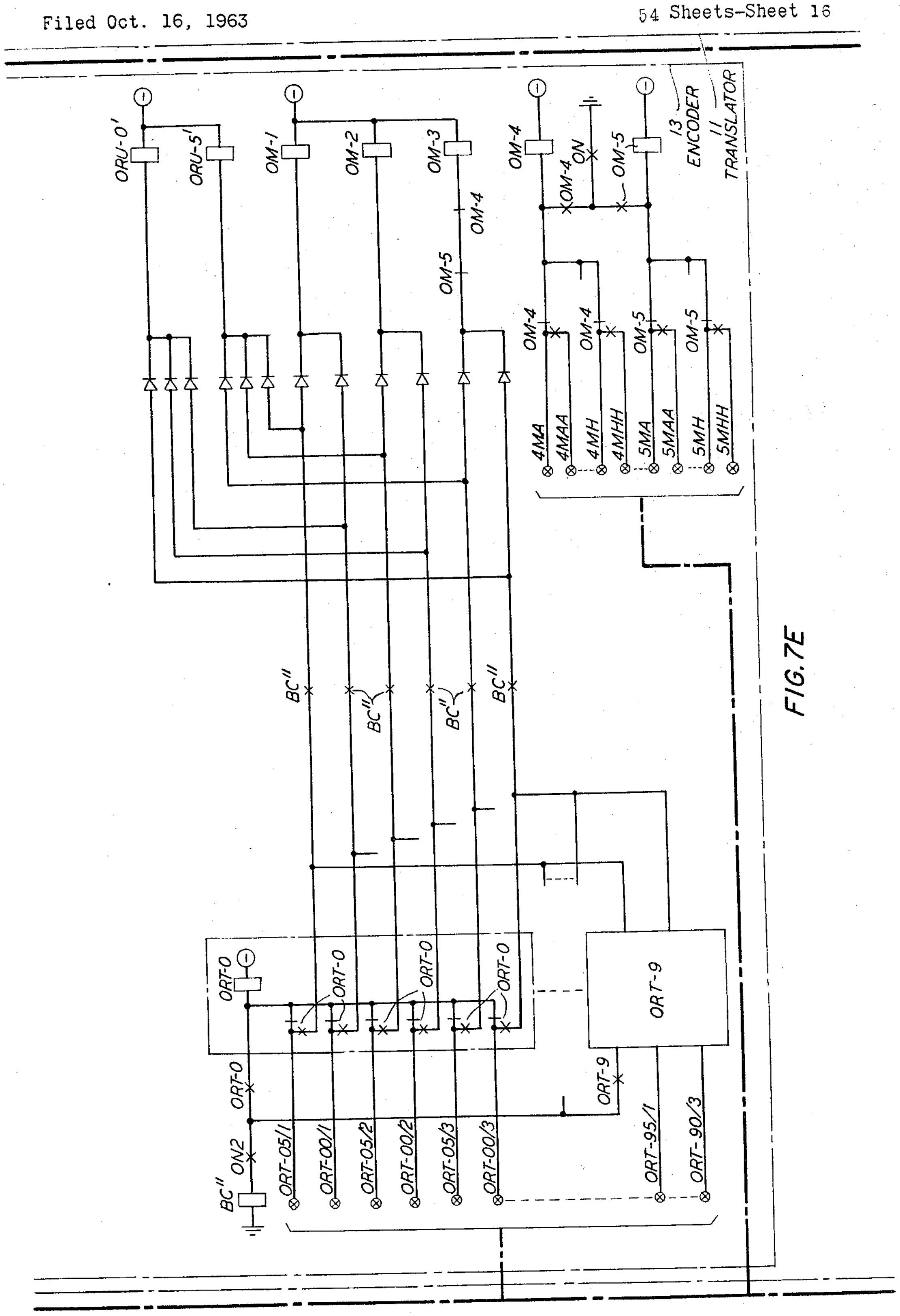

The encoder is presented in complete detail in FIGS. 7C through 7E.

Also included in the translator 11 is an overtime controller 14 which operates from the overtime field. The controller, detailed in FIGS. 7F and 7G, contains control relays C3 and C4 whose functions will be discussed shortly.

The rate indications of the encoder are decimal. To facilitate ensuing calculations, the indications destined for the adder of FIG. 4F are rendered biquinary in a converter 15.

Biquinary coding, sometimes designated two-out-of-seven coding, facilitates the relay instrumentation of addition and subtraction. In biquinary notation each digit of a number from another system of notation is represented by a digit pair, the first being binary, i.e., two-valued, and the second being quinary, i.e., five-valued, hence the name biquinary. For example, a two-digit decimal number $A_d=a_{1d}; a_{2d}$ is the biquinary number $A_{bq}=a_{1b}, a_{1q}; a_{2b}, a_{2q}$, where the binary portion, designated by a $b$ subscript, of each digit pair has the value zero or five, and the quinary portion, designated by a $q$ subscript, ranges from zero through four. Thus, the decimal digit eight becomes 5′3 in biquinary, and the decimal digit four becomes 0′4. The prime is used to indicate the binary portion of each biquinary number.

Figure 4B:
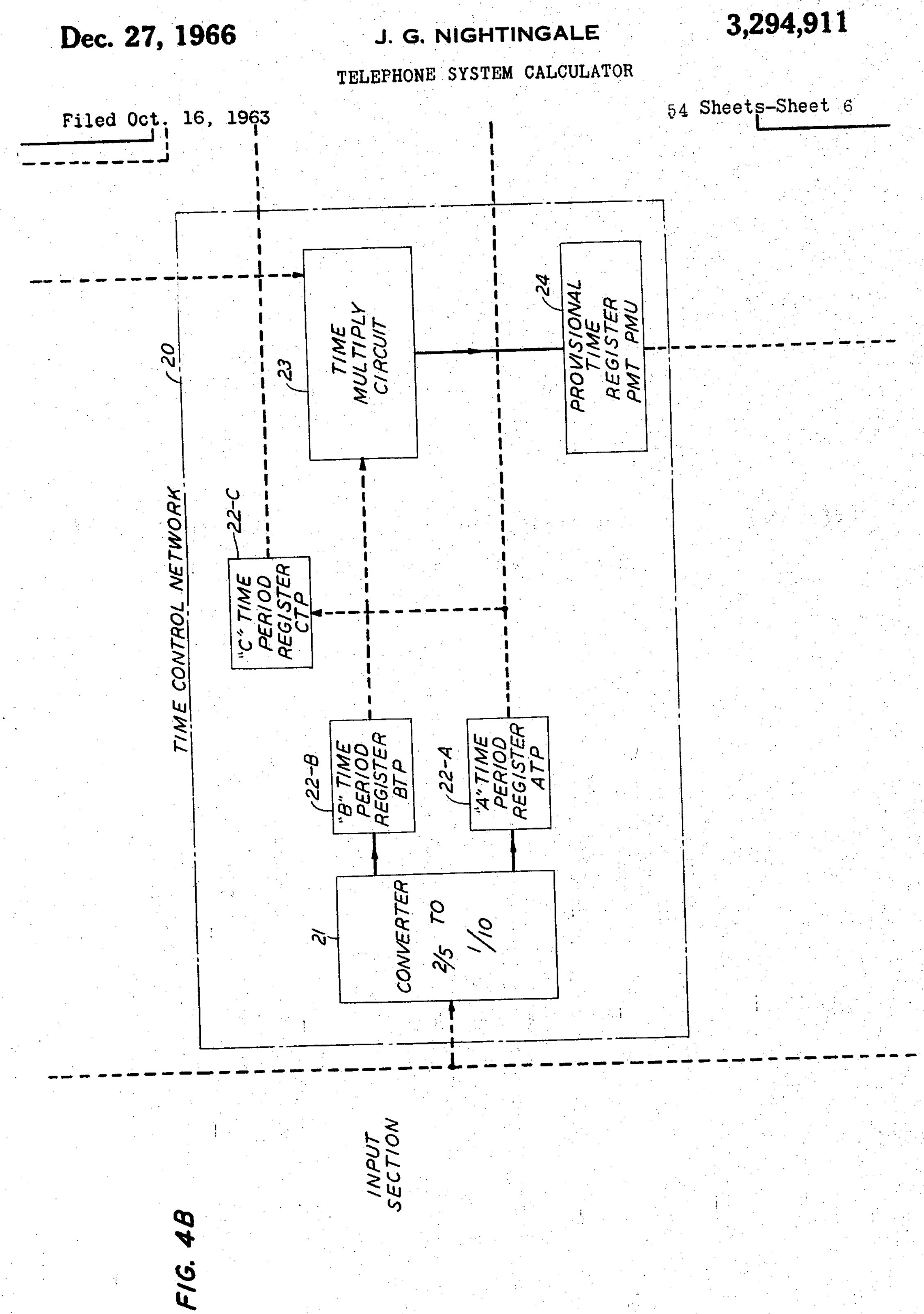
Figure 4C:
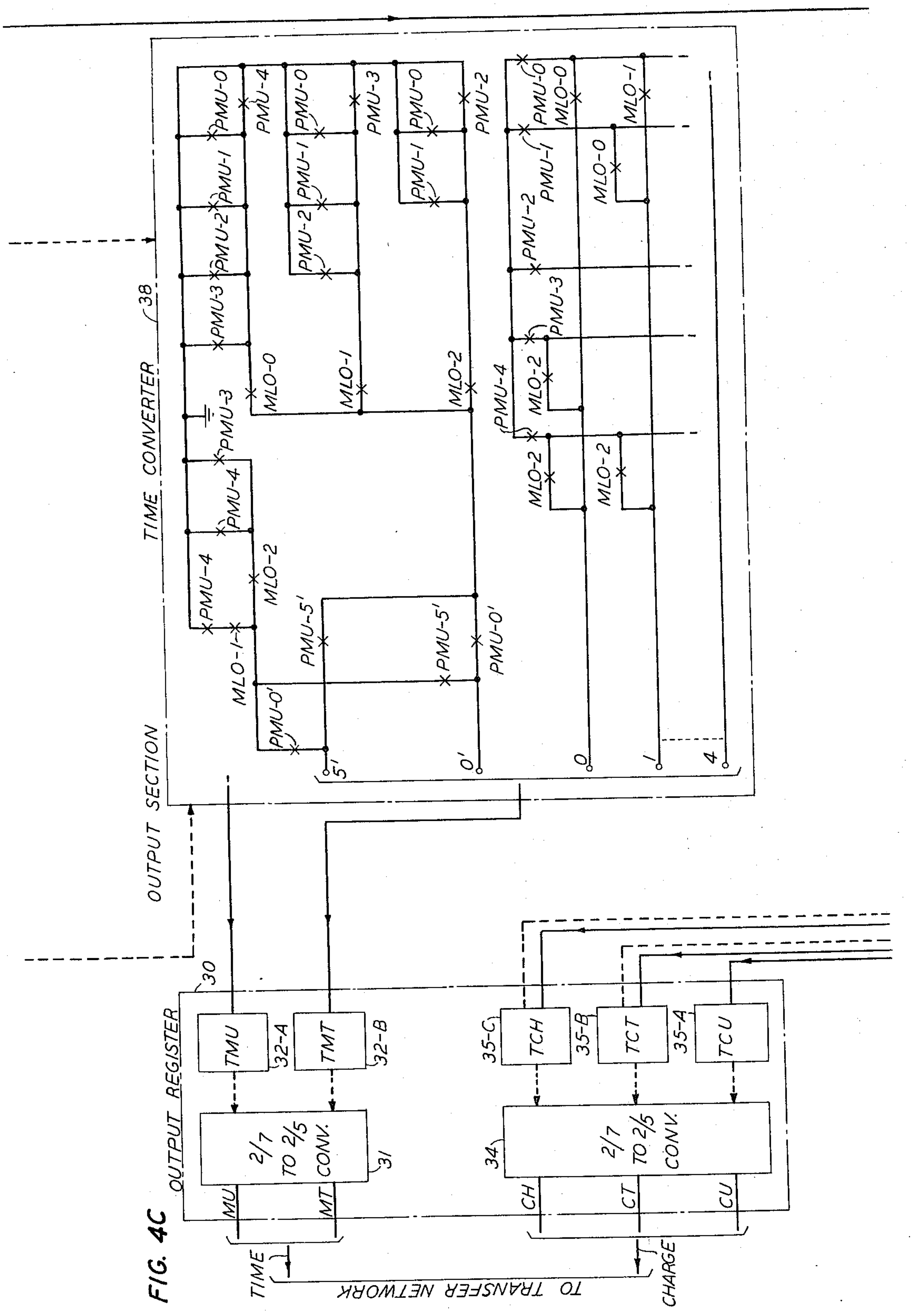
Figure 4D:
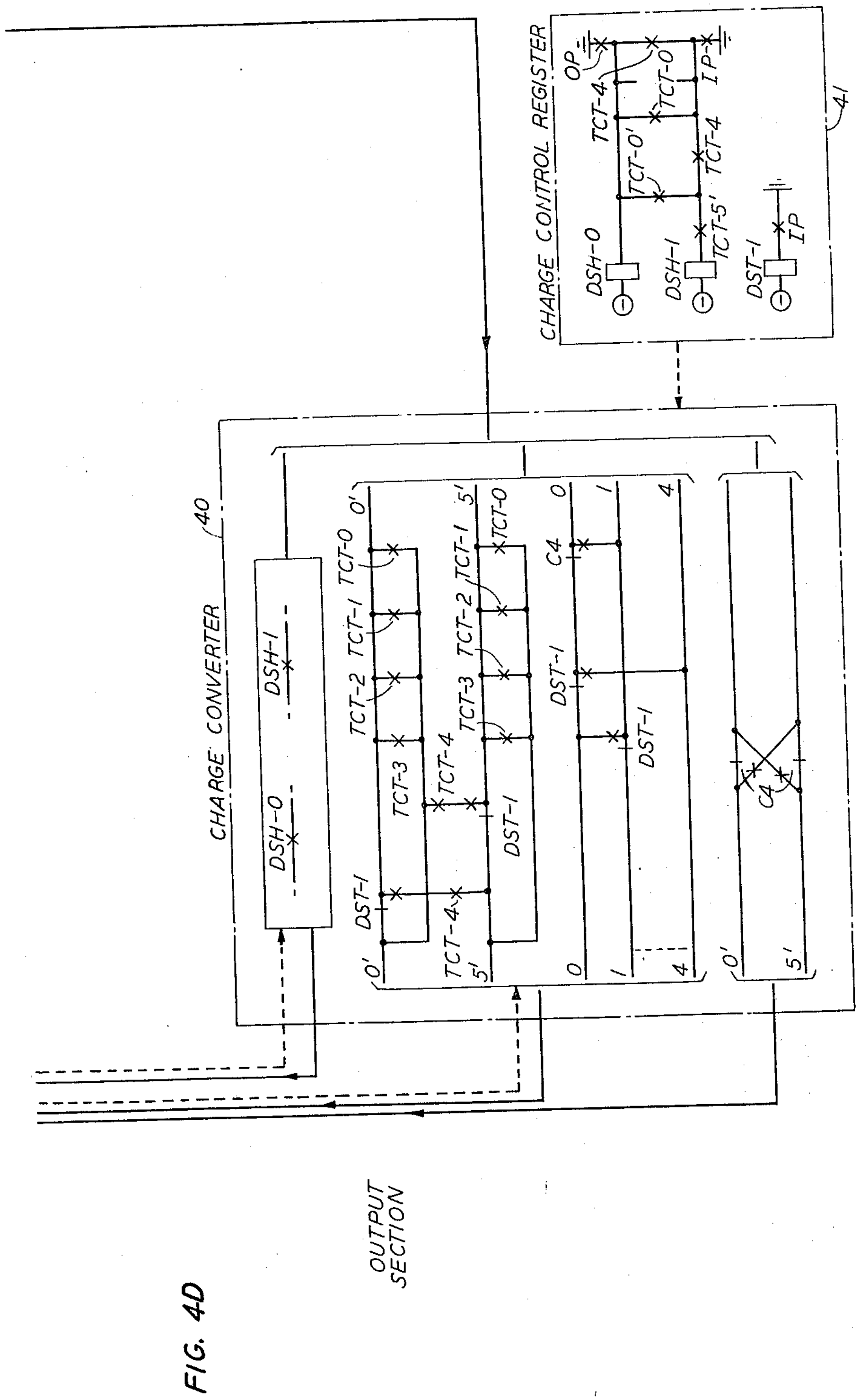
Figure 4E:
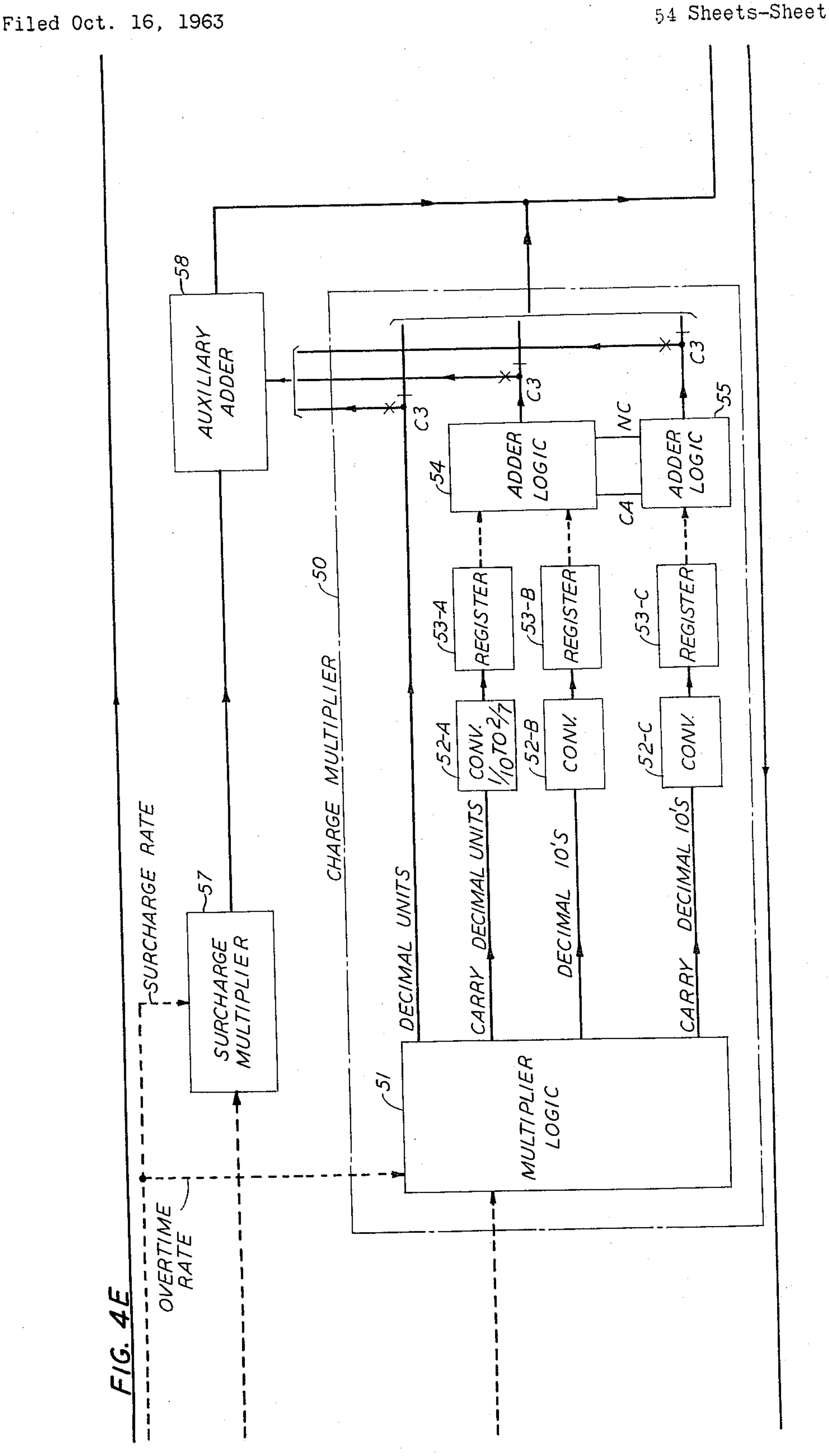
Figure 4F:
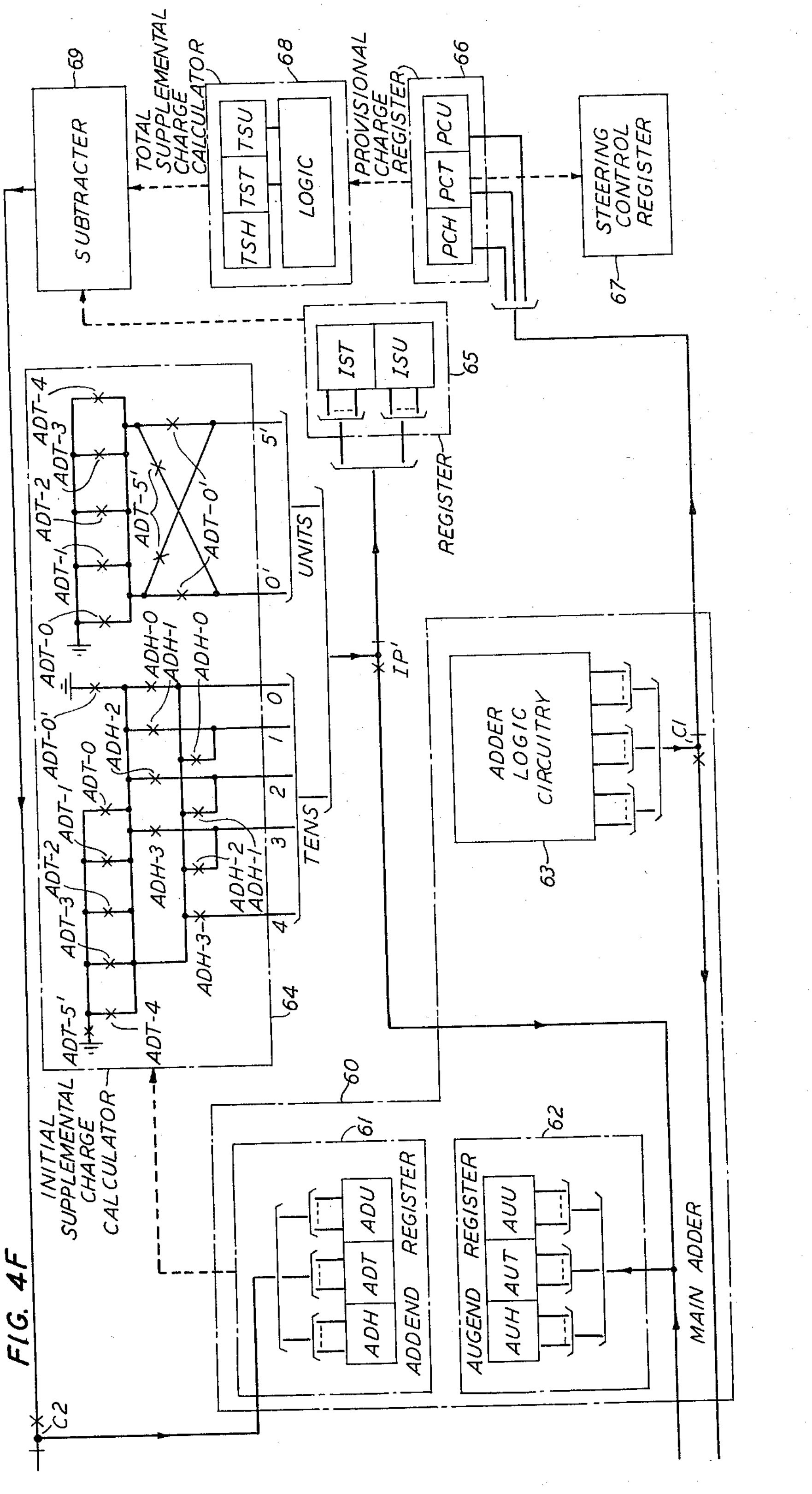

The biquinary output from the translator 11 is entered into the addend register 61 of the adder 60 in FIG. 4F. The addend register contains three distinctive sets of relays designated ADdend Hundreds ADH, ADdend Tens ADT and ADdend Units ADU, for the hundreds, tens and units digits.

The addend register relays are responsible for the operation of contacts in the initial supplemental charge calculator 64 by which a preassigned fraction, typically a tax of ten percent, is taken of the addend indication.

In addition, because the collection box of a pay station does not ordinarily provide for the lowest monetary unit of exchange, namely the penny, the ten percent charge is rounded to the nearest nickel. The tax calculator 64 has a separate set of output leads for each digit of the tax. In determining the tax units digit of the tax, the tens and units registration of the addend register 61 are considered as being in one of four quadrants. For the first quadrant, ranging through twenty cents, there is no tax; while for the second quadrant, ranging from twenty-five through forty-five cents there is a units digit tax of five cents. Indications to this effect appear on respective units output leads 0′ and 5′ of the tax calculator 64.

Each of the units output leads of the tax calculator 64 is connected through a binary tens contact ADT–0′ to one extremity of a bridge containing quinary tens contacts ADT–1 through 4. The intermediate contact ADT–2 of the bridge is flanked by binary units contacts ADU–0′ and 5′.

For the third and fourth quadrants the units indications are the reverse of the first two, there being a five cent tax indication for third quadrant amounts ranging from fifty through seventy cents and no tax indication for fourth quadrant amounts ranging from seventy-five through ninety-five cents. The desired indications are achieved by cross connecting the units output leads of the tax calculator 64 with paths that each contain a binary tens contact ADT–5′.

Although the fourth quadrant does not produce a units indication, it has a carry-like effect upon the tens output of the tax calculator 64. To that end, a second bridge of contacts, similar to the first, is included for exercising supervisory control over the tens output leads 0 through 4. When the ten-units registration is in the fourth quadrant, the tens output indication is at the next higher level by virtue of the closure of one of the ADdend Hundreds contacts ADH–0 through 4 to the operative left-hand portion of the second bridge. Otherwise when the units-tens registration is in the first three quadrant, the appropriate tens output is provided directly either from the operative right-hand portion of the bridge or from the binary tens contact ADT–0′ by the closure of one of the ADdend Hundreds contacts ADH–0 through 3.

Thus where the registered amount corresponds to an initial charge of $1.95, the corersponding biquinary representation, without regard to the decimal point, is 0′,1; 5′,4; 5′,–. This representation is associated with the closure of ADdend Hundred contacts ADH–0′ and ADH–1 for the first digit pair 0′,1; ADdend Tens contacts ADT–5′ and ADT–4 for the second digit pair 5′,4; and ADdend Units contacts ADU–5′ for the third digit pair 5′,–. There is no quinary representation at the units level since the units indication is limited to being either five or zero.

For an initial charge of $1.95, the tens-units indication is in the fourth quadrant, resulting in a closed path that extends to the units output lead 0′ from the ground point of the right-hand bridge through ADdend Tens contacts ADT–4 and ADT–5′. Since the tens-units registration is well beyond the demarcation between tax and no-tax, the operation of the ADdend Units contacts ADU–5′ is of no significance for this particular example.

In the tens portion of the calculator a closed path extends to the tens output lead 2 from a ground point of the second bridge through ADdend Tens contacts ADT–5′ and ADT–4 and ADdend Hundreds contacts ADH–1. Hence the output of the tax calculator indicates that the rounded tax due on an initial period charge of $1.95 is twenty cents. It is to be noted that the tax calculator does not operate upon amounts beyond $3.95. Nevertheless, the principles of operation are applicable to other situations as, for example, the total supplemental charge calculator shown in detail in FIG. 18.

The output of the tax calculator 64 is sent to the augend register 62 of the adder 60 through a set of transfer contacts IP′ that are operated indirectly from the Initial Period relay IP of the input register by way of the steering control register 67 shown in detail in FIG. 19. Like the addend register, the augend register 62 contains three sets of relays, one of the hundreds digit designated the AUgend Hundreds AUH, another for the tens digit designated AUgend tens AUT, and a third for the units designated AUgend Unit AUU.

In response to information in both the addend and augend registers, the adder logic circuitry 63 establishes the summation of the initial charge with the calculated tax. The adder logic circuitry 63 is detailed in FIGS. 15C through 15F. Its organization parallels that described by Keister, Ritchie and Washburn, The Design of Switching Circuits, Van Nostrand, New York, 1951.

The output of the adder logic circuitry 63 is dispatched to the charge converter 40 of FIG. 4D through another set of transfer contacts C1, also operated from the steering control register. At the charge converter 40, any retained deposit is subtracted from the amount calculated as provisionally due. By and large this entails rerouting the monetary indication. For example, when the retained deposit is ten cents, a tens indication of two is rerouted to become an indication of one. However the subtraction may carry the result into another numerical range either within a biquinary digit pair or from one biquinary level to another. Thus a subtraction carrying a biquinary tens indication below 0′, 0 or 5′, 0 will require altering both digits of the digit pair as well as affecting, in the case of the first pair, the values of adjoining digit pairs.

Figure 11A:
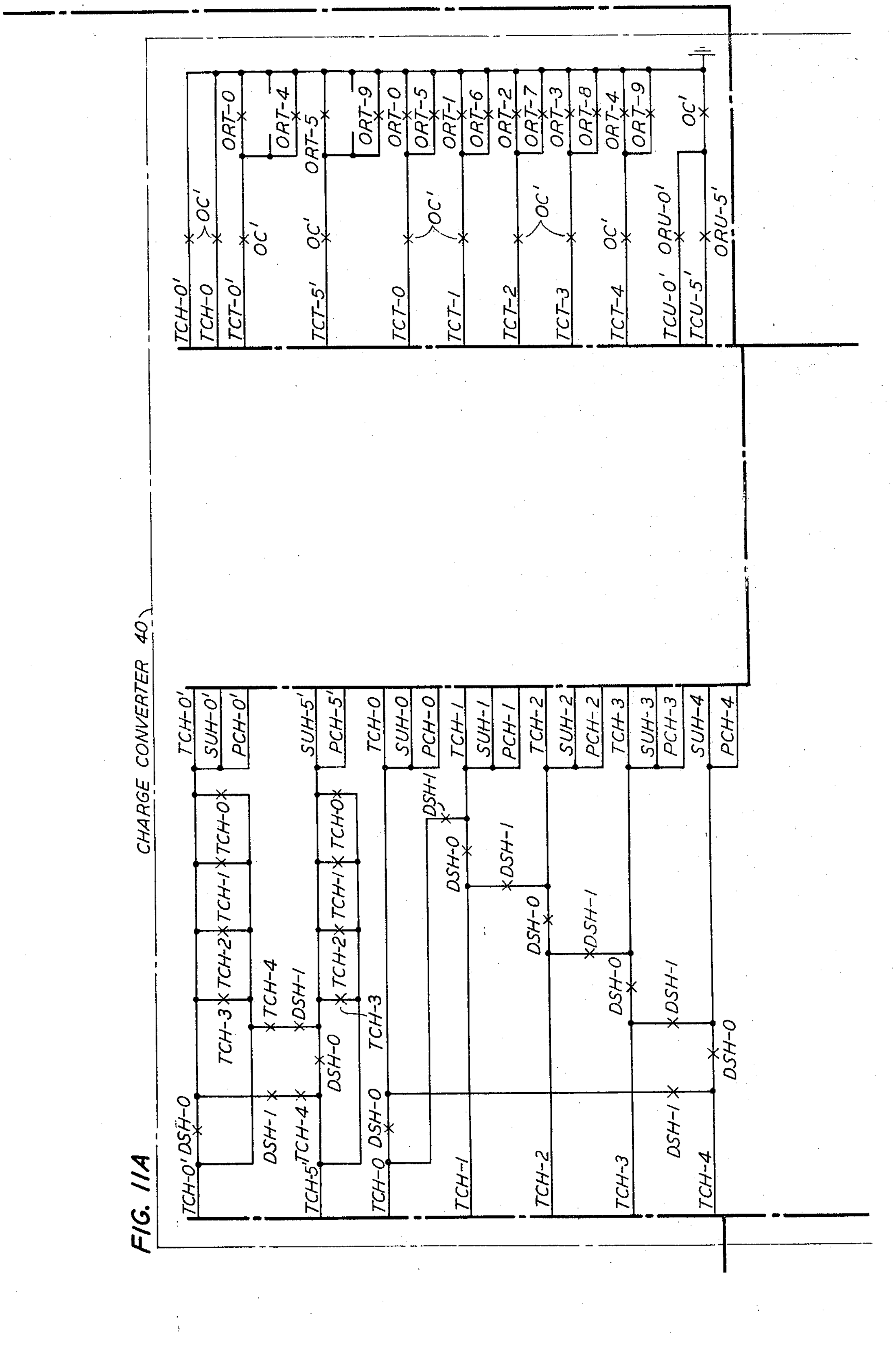
Figure 11B:
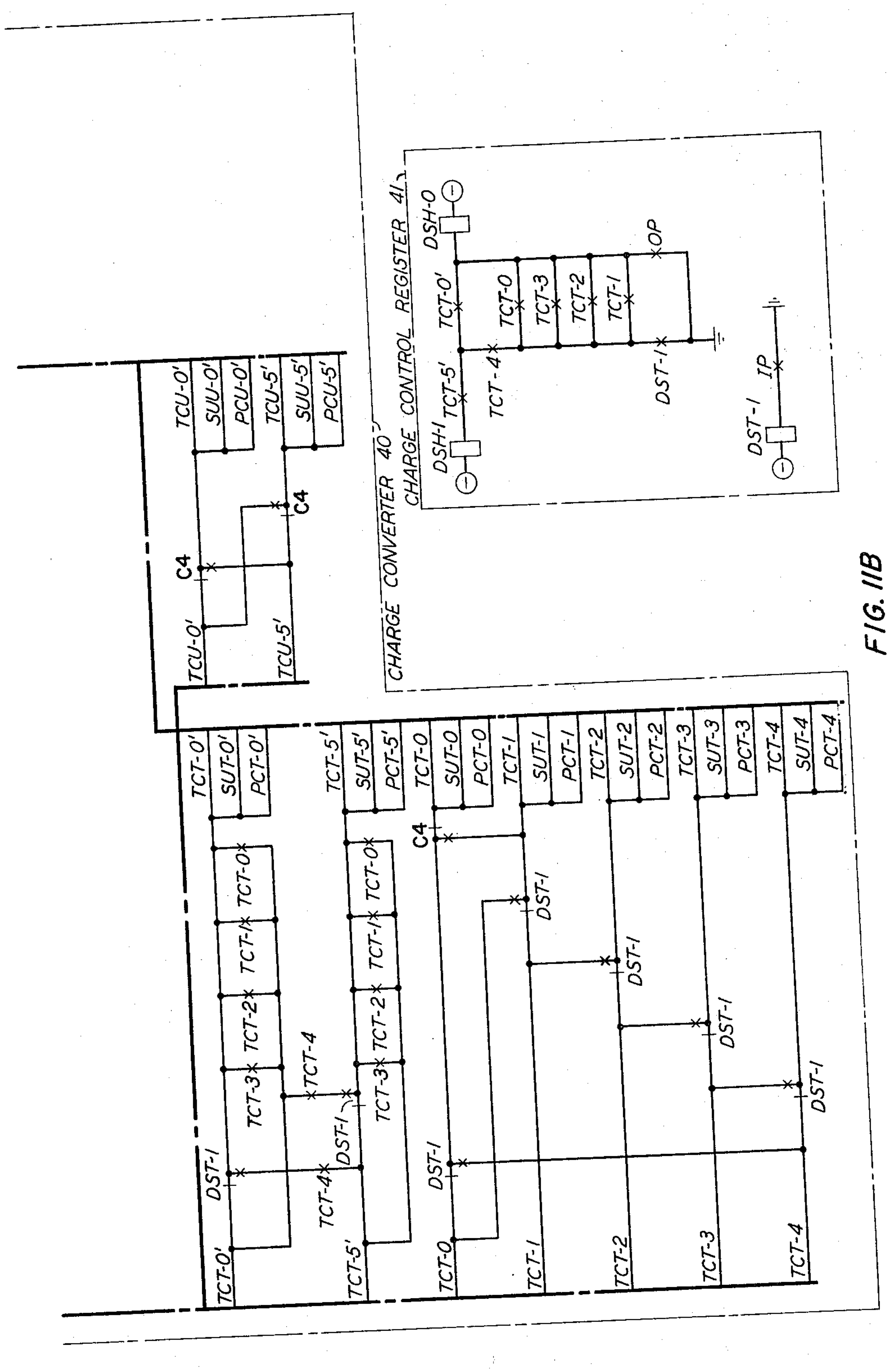
Figure 12A:
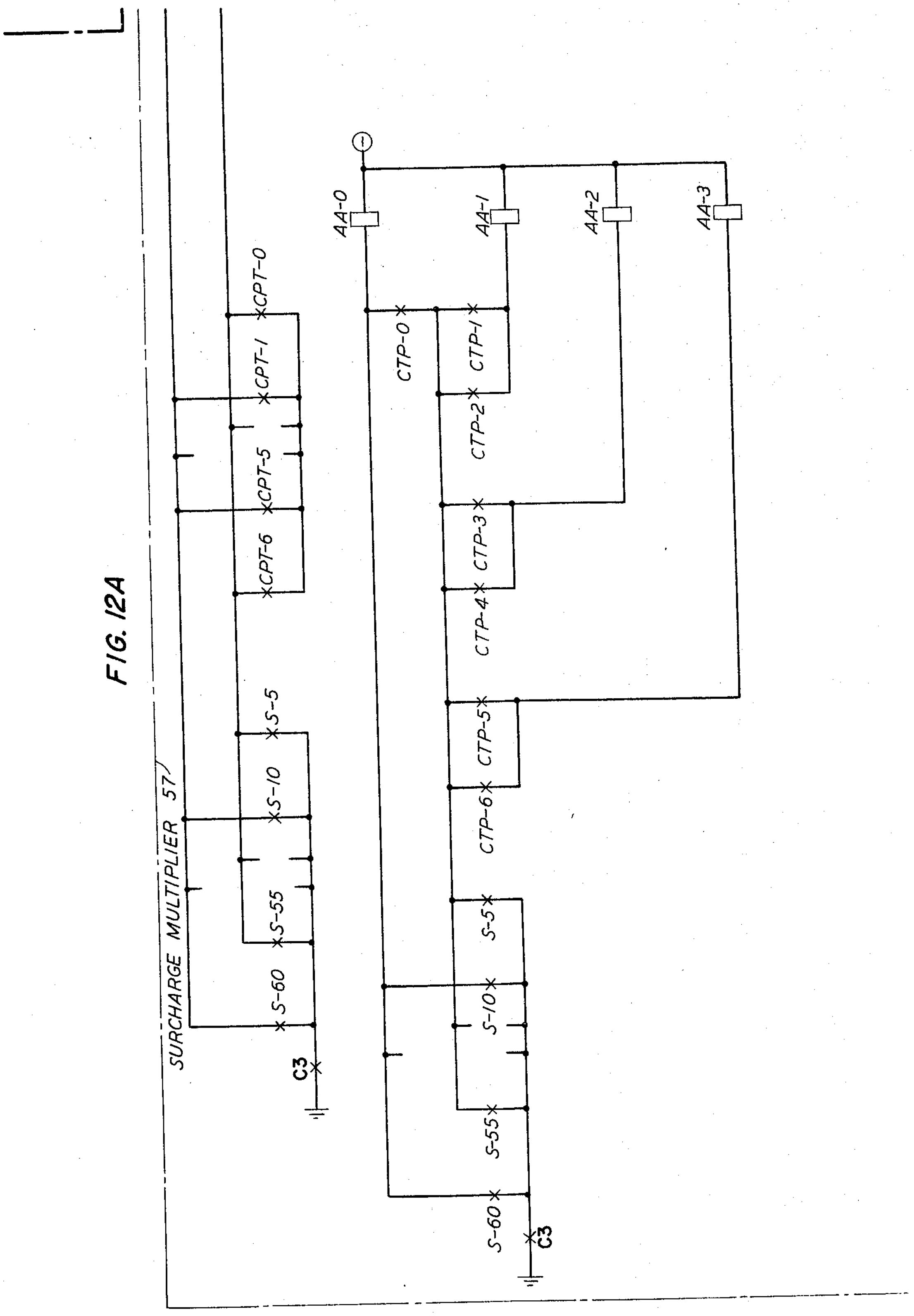
Figure 12B:
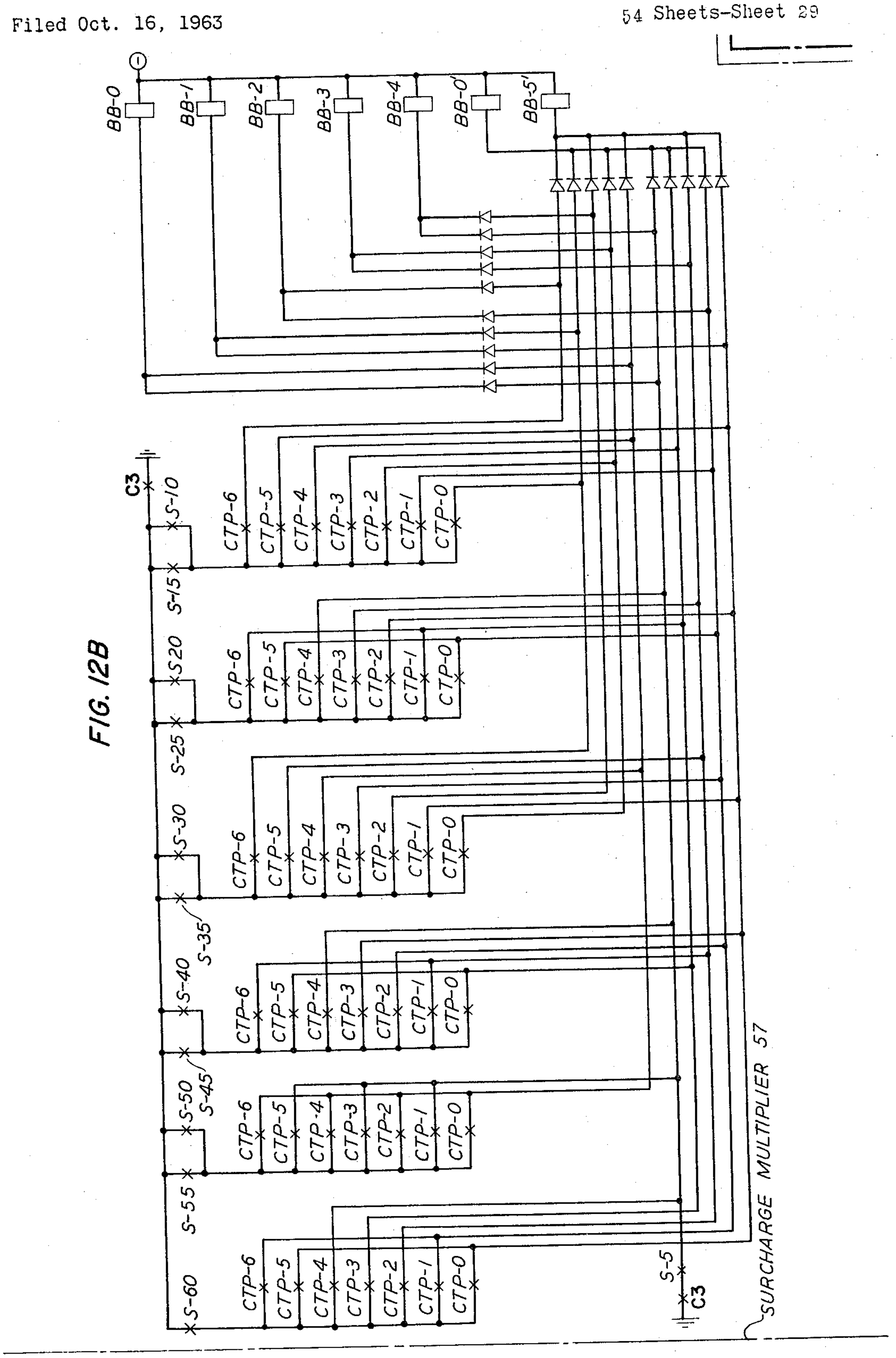
Figure 12C:
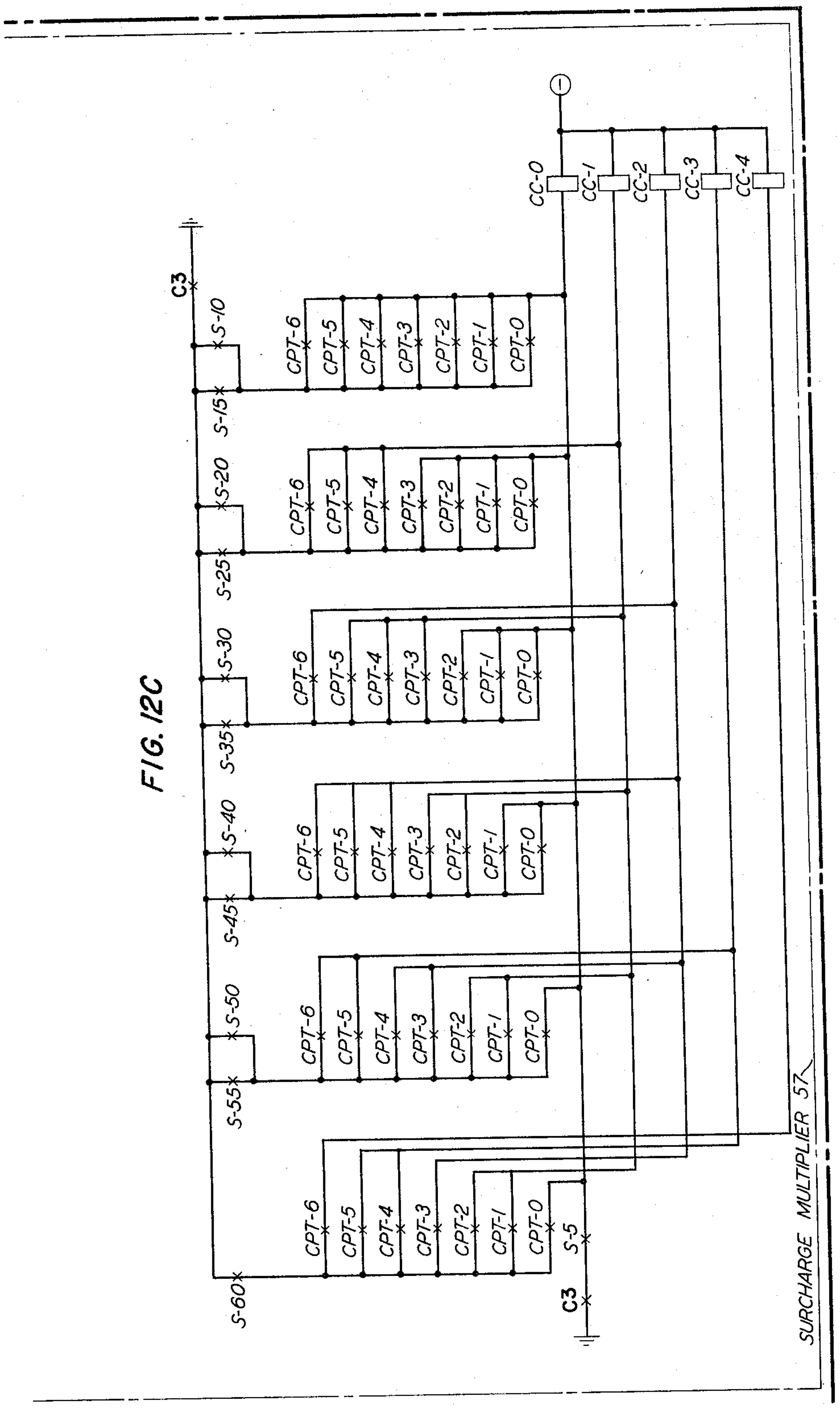
Figure 12D:
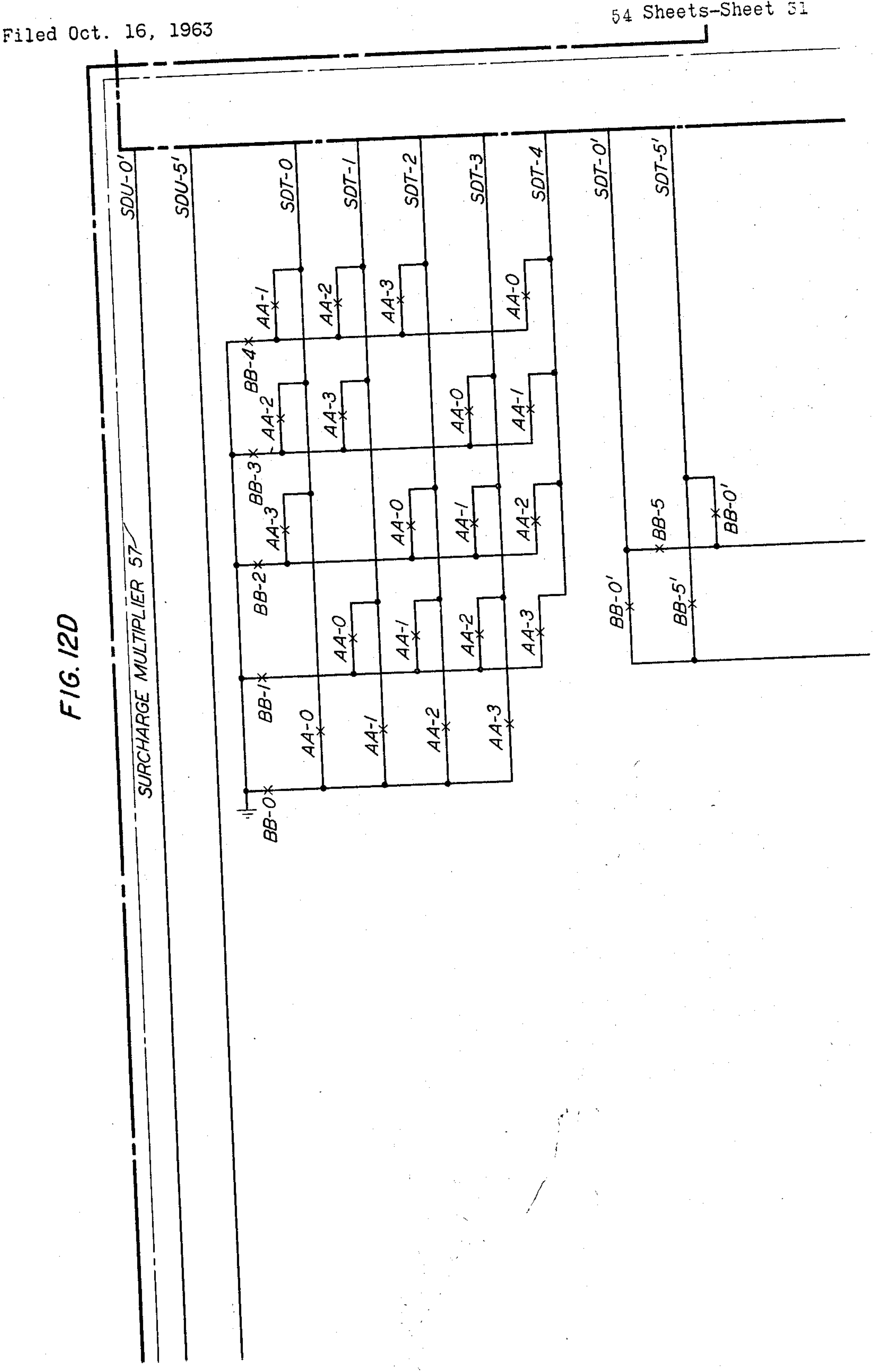
Figure 12E:
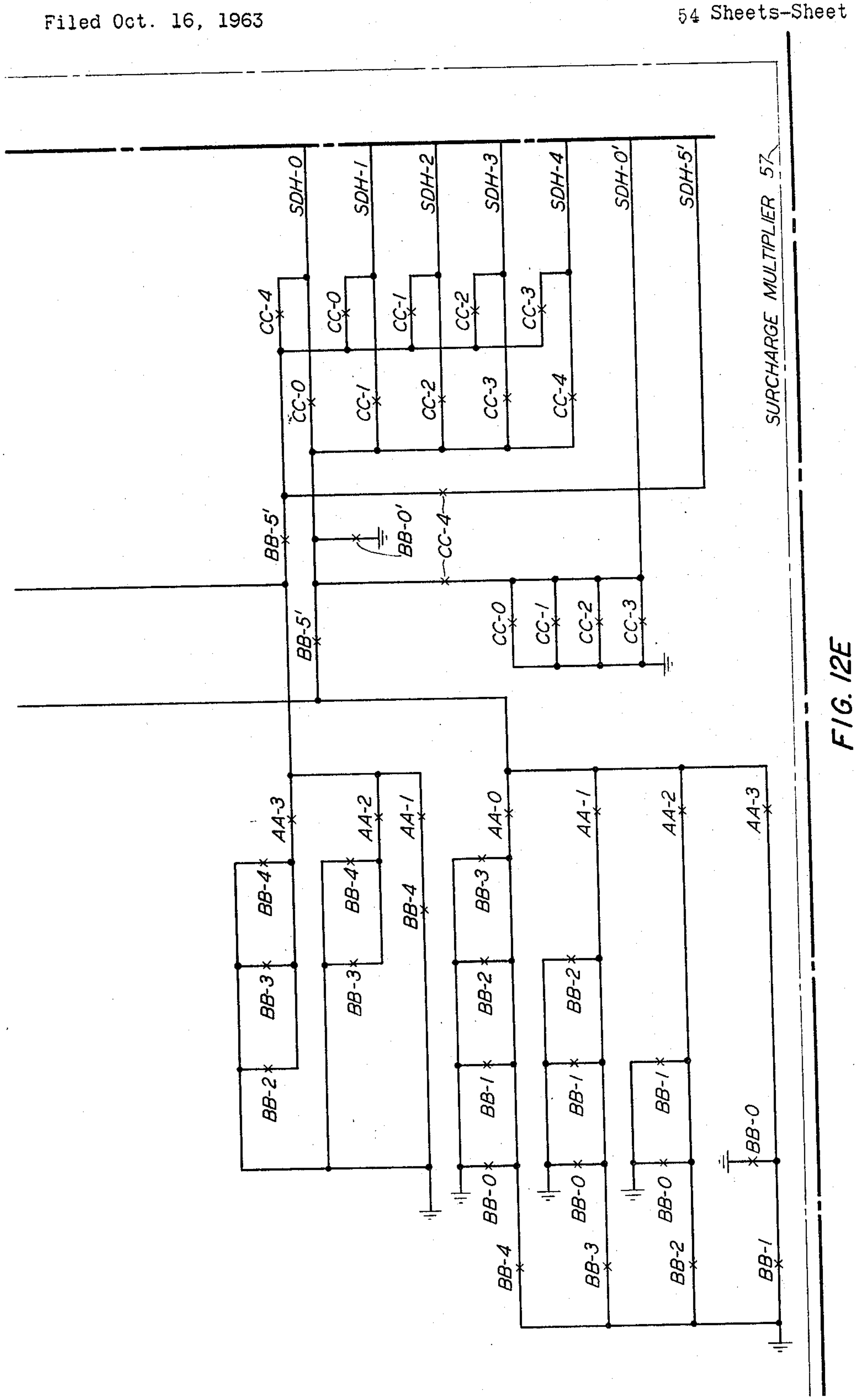

This is accomplished in detail by the charge converter of FIGS. 11A and 11B. As outlined in FIG. 4D, a Deposit Subtract Tens relay DST–1 is energized through the operation of the Initial Period relay IP to reroute all quinary indications according to the amount being subtracted. Thus a tens quinary 1 input from the adder becomes a quinary 0 output to the Total Charge Tens relays TCT of the output register 30 in FIG. 4C, and a tens quinary 0 input becomes a quinary 4 output. In addition, activation in the register 30 of the Total Charge Tens relay TCT–4 associated with a quinary 4 operates to interchange the associated pre-existing tens binary 0′ and 5′ leads. Similarly, the combined operation of 4 and 5′ control a similar sequence in adjoining circuits. Where the deposit subtraction results in a biquinary tens pair 5′, 4, indicated by corresponding Total Charge Tens relays TCT–5 and TCT–4, an adjustment is required in the indication of the Total Charge Hundreds relays TCH.

The Total Charge Tens relays close contacts TCT–5′ and TCT–4 in the charge control register 41 of FIG. 4D to energize a Deposit Subtract Hundreds relay DSH–1 through the Initial Period relay contacts IP. This brings about, as detailed in FIGS. 11A and 11B, the same kind of rerouting in the hundreds path of the charge converter that took place on activation of the Deposit Subtraction Tens relay DST–1. For any other condition, a Deposit Subtraction Hundreds relay DSH–0 is operated to prevent any change in the hundreds portion of the charge converter.

After charge conversion, the indications registered by the Total Charge Hundreds, Tens and Units relays TCH, TCT and TCU are acted upon by another converter 34 of FIG. 4C preparatory to outward transmission in two-out-of-five code.

When a call extends into overtime, the calculator is again brought into operation by activation of the appropriate rate code and call classification relays and the substitution of the Overtime Period relay OP for the Initial Period relay IP. In addition, the time control relays are operated during the course of the overtime interval.

As before, the rate code and call classification relays result in the extension of a ground connection to one of a plurality of station to station-or-person-to-person code points in the decoder 12. Further, because of the Overtime Period relay OP there is also a ground connection to a code point in the overtime field OTOO-199. The latter is connected to the encoder 13 to activate Overtime Rate Hundreds, Tens and Units relays ORH, ORT and ORU, along with Overtime Minutes relays OM. These relays and their associated circuitry are shown in detail in FIG. 7E.

In the case of prepaid overtime, for which the call is not permitted to extend into the overtime period until a supplemental deposit has been made, the relays responsible for the overtime rate indications in the translator 11 close contacts in the charge converter 40 to register the overtime charge information in the total charge relays of the output register 30. In addition, the overtime controller 14 of FIG. 4A, shown in greater detail in FIGS. 7F and 7G, closes contacts C4 in the charge converter 40 which are responsible for incrementing the indicated charge by a nickel according to the schedule of Table V.

In the case of postpaid overtime the charge is not collected until the termination of the call. The overtime rate indication in decimal form is applied to the multiplier logic 51 of the charge multiplier 50 in FIG. 4E, along with a record of the number of overtime periods that elapsed during the call. The latter is supplied from the transfer network 2 of FIG. 1 by energizing the appropriate Number of Overtime Periods relays NOP of the input register 10. Since the charge multiplier operates on a decimal basis, a converter 21 in the time control network 20 of FIG. 4B changes the indication from two-out-of-five to one-out-of-ten form before temporary storage in an "A" Time Period register 22A longitudinal of ATP relays. The time control network 20 is presented in detail in FIGS. 8A and 8B.

The charge multiplier 50 of FIG. 4E is of conventional design, encompassing circuitry shown in detail in FIGS. 13A through 13G and patterned after that of Keister, Ritchie and Washburn in The Design of Switching Circuits, Van Nostrand, New York, 1951. From the first logic stage 51 of the multiplier, the outputs indications are decimal units, carries from the decimal units, decimal tens, and carries from the decimal tens. The decimal units and carries are respectively the units and tens portions of the product of two units digits; while the decimal tens and carries are respectively the units and tens portion of the product of a unit by a tens digit. For example, if the number 9 is to be multiplied by 45, the decimal units digit is 5 which is the units portion of the product of 9 and 5, while the carry is 4 from the tens portion of that product. Similarly the decimal tens digit is 6, obtained by multiplying the tens digit 5 by the units digit 9 and the carry from the decimal tens is 3. The tens digit of the ultimate product is obtained by summing the carry from the decimal units with the decimal tens in a first multiplier adder logic stage 54 after processing in respective converters 53A and 53B. To obtain the hundreds digit of the ultimate product a carry from the adder logic stage 54 is summed in a second multiplier logic stage 55 with the carry from the decimal tens after processing in a converter 52C and a register 53C.

The output from the charge multiplier 50 is sent directly to the augend register 62 of FIG. 4F combined with the addend contents to produce an output indication of the entire charge due for both the initial and the overtime periods. This information enters a provisional charge register 66 constituted of separate sets of Provisional Charge Hundreds, Tens and Units relays PCH, PCT, PCU.

Figure 18:
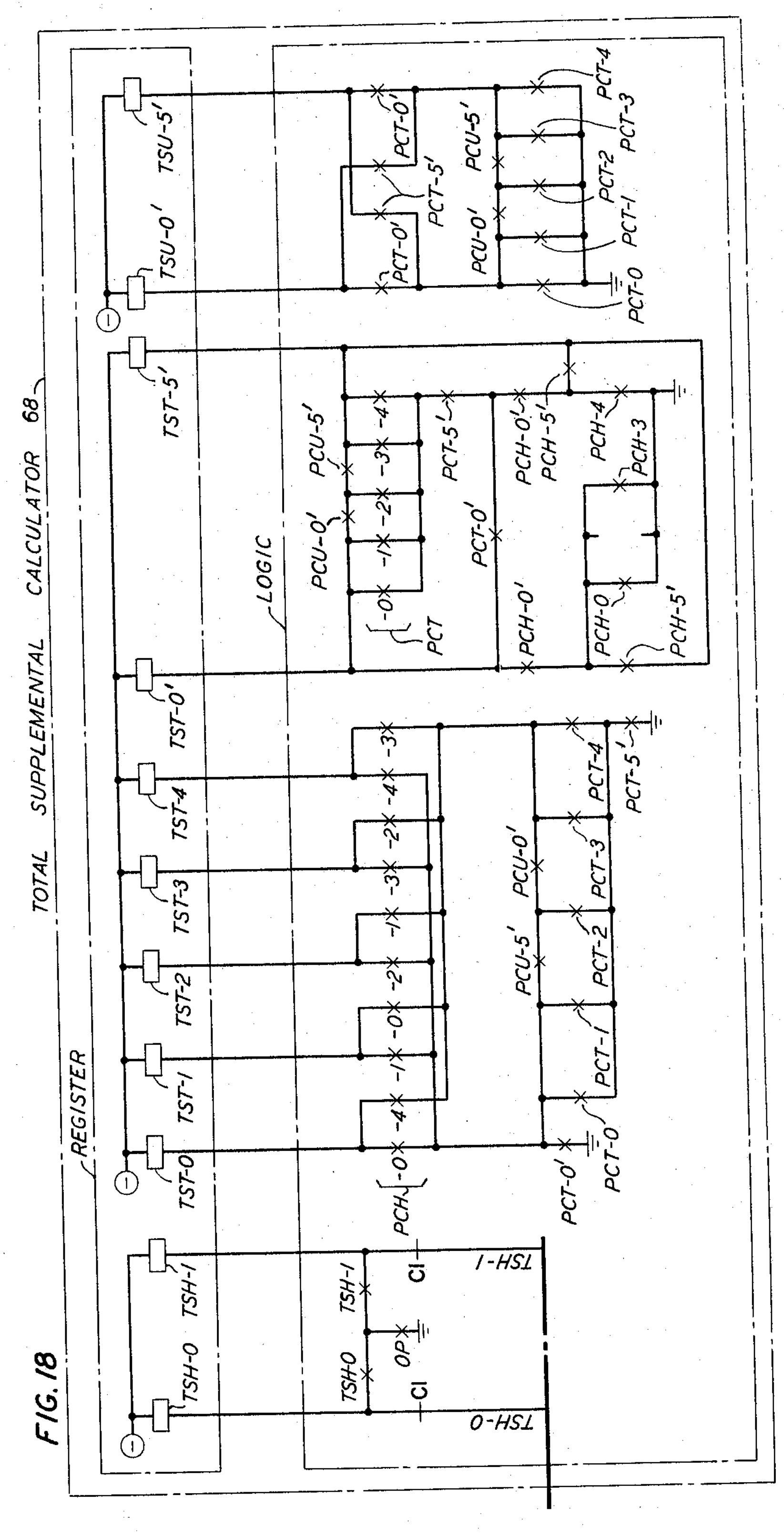

The provisional charge register 66, in turn, operates contacts in a total supplemental charge calculator 68. The latter, shown in greater detail in FIG. 18 is similar to the initial tax calculator except that it determines a preassigned fraction of the total provisional charge, typically ten percent.

In the interim, the initial tax calculation, instead of being sent to the augend register, goes to an initial supplemental charge register 65, containing Initial Supplemental charge Tens and Units relays IST and ISU. The Initial Supplemental charge Tens and Units relays IST and ISU, in conjunction with the Total Supplemental charge Tens and Units relays TST and TSU, act upon a subtractor 69 whose output is the difference between the total tax applicable to the call and that initially paid. From the subtractor, detailed in FIGS. 17A and 17B, the output is routed to the addend register 61 by the closure of transfer contacts C2 from the steering control register 67 at the time the provisional charge was entered in its register 66. Now contained in the adder are a compensated tax in the addend register and the overtime charge in the augend register. Thus, the output of the adder logic circuitry 63 represents the total charge, including tax, remaining to be paid on a call that has extended into postpaid overtime. As before, the adder output is sent to the charge converter 40 of FIG. 4D but it is unaffected by the charge control register 41 since the Overtime Period relay OP, rather than the Initial Period relay IP, is operative.

Also required from the calculator is an indication of the total overtime interval. This interval is determined in the time control network 20 of FIG. 4B (and FIGS. 8A through 8C) by the concerted effects of a "B" time period register 22B and the translator 11 upon a time multiplier circuit 23. The output of the time multiplier circuit 23 is stored in a provisional time register 24 whose Provisional Minutes Tens and Units relays PMT and PMU activate the time converter 38 of FIG. 4C.

The provisional time indication will not accurately reflect the total overtime interval if the last overtime period is not fully used. Appropriate supplementation is made in the time converter 38 (detailed in FIG. 10) by the action of Minutes in Last Overtime period contacts MLO–0 through 2. For the quinary units, the indications 0 through 4 are rerouted according to the number of minutes remaining in the last overtime period. And, for the binary units, the indications 0′ and 5′ are associated with various PMU and MLO combinations whose summations respectively fall below and exceed five. Thus if the number of minutes in the last overtime period is two, so that MLO–2 operates, a provisional indication of four minutes associated with PMU–4 becomes, instead, a final indication of one minute. In addition, the combination of PMU–4, MLO–2 and PMU–0′ give a 5′ binary units indication. As a result, the Total Minutes Units relays TMU register a units digit pair output of 5′, 1.

Under some circumstances a surcharge is collected for the postpaid overtime interval. In that event a surcharge rate indication from the overtime controller 14 and a surcharge time interval from the "C" time period register 22C of FIG. 4B are multiplied in the surcharge multiplier 57 of FIG. 4E. The controller 14 also diverts the output of the charge multiplier 50 to an auxiliary adder 58 by operating transfer contacts C3. Thence the surcharge and regular overtime charge are combined and sent to the augend register 62 as in the case of regular overtime. Details of the overtime controller are presented in FIGS. 7F and 7G; those of surcharge multiplier are in FIGS. 12A through 12E, while the auxiliary adder is in FIGS. 14A through 14C.

Turning now to the detailed calculator of FIGS. 6 through 19, two hundred different rate codes are allotted to it. The first hundred of those can represent various day and night charges for station-to-station and person-to-person interstate calls; the second hundred can apply to intrastate calls.

Typical ranges of charges per period for the rate codes, generally in five cent increments, are given in Table I.

TABLE I

| Initial Period | Overtime Period | Range |
|---|---|---|
| 1 and 4 minutes | 1, 2 and 3 minutes | $0.05 to $0.95. |
| 2 minutes | | $0.05 to $1.95. |
| 3 minutes | | $0.05 to $3.95. |
| 5 minutes | | 6 from $0.05 to $3.95. |

Besides the codes allotted to the charges of Table I, there are additional codes for four and five minute zone interval overtime periods up to a maximum of eight each. Where the local rate structure imposes a surcharge on one or more overtime intervals, additional codes are allocated for the purpose of adding a five to sixty cent surcharge per overtime period on person-to-person calls. For overtime generally, the calculator is able to indicate total charges, including tax, up to $9.95.

With the calculator of FIGS. 6 through 19, the functional designations employed earlier are applicable. For convenience these are summarized in Table II, as supplemented by new designations required for a complete description of calculator operation.

TABLE II

| Designation | Meaning |
|---|---|
| A | Addend Hundreds, Tens and Units. |
| AA | First Surcharge Register. |
| AD | Advance Deposit. |
| ADH, ADT & ADU | Addend Hundreds, Tens and Units. |
| ATP | "A" Time Period. |
| AUH, AUT & AUU | Augend Hundreds, Tens and Units. |
| B | Second Multiplier Register. |
| BB | Second Surcharge Register. |
| BC, BC′, BC″ | Battery Control. |
| BTP | "B" Time Period. |
| C | Third Multiplier Register. |
| CC | Third Surcharge Register. |
| C1, C2, C3, C4 | Control Switches. |
| CO & CO′ | Carry One. |
| CTP | "C" Time Period. |
| DSH & DST | Deposit Subtract Hundreds and Tens. |
| EC | End of Cycle. |
| ET | Extend Time. |
| FC | Final Check. |
| IM | Initial Minutes. |
| IOP | Initial Overtime Period. |
| IP & IP′ | Initial Period. |
| IRH, IRT & IRU | Initial Rate Hundreds, Tens, Units. |
| IST & ISU | Initial Supplemental Charge Tens and Units. |
| IT | Interval Termination. |
| MLO | Minutes in Last Overtime. |
| NC & NC′ | No Carry. |
| NOP | Number of Overtime Periods. |
| NP | Notify Position. |
| NT | No Tax. |
| NZ | No Zone. |
| OC, OC′ | Overtime Control. |
| OM | Overtime Minutes. |
| OP & OP′ | Overtime Period. |
| ORH, ORT & ORU | Overtime Rate Hundreds, Tens and Units. |
| OT | Overtime. |
| PC | Position Control. |
| PCH, PCT & PCU | Provisional Charge Hundreds, Tens and Units. |
| PMT & PMU | Provisional Minutes Tens and Units. |
| PP | Person to Person. |
| RCH, RCT & RCU | Rate Code Hundreds, Tens and Units. |
| S | Surcharge. |
| SS | Station to Station. |
| ST | Start Timing. |
| SU | Surcharge Switch. |
| T | Tax. |
| TCH, TCT & TCU | Total Charge Hundreds, Tens and Units. |
| TMT & TMU | Total Minutes Tens and Units. |
| TSH, TST & TSU | Total Supplemental Charge Hundreds, Tens Units. |
| UNA & UNA′ | Units Auxiliary. |
| Z, ZA & ZB | Zone. |

When the calculator is initially "seized" by the transfer network of FIG. 1, to determine an initial period charge, grounds are received at various RCH, RCT, RCU relays (FIG. 6) according to the transmitted rate code indication. There is an additional ground at either the SS or PP relay according to whether the call is station-to-station or person-to-person, as well as a ground at the IP relay signifying that an initial period determination is to be made.

To decode the rate code indication, two of five RCU relays operate in conjunction with either the RCH–0 relay or the RCH–1 relay to convert the received units indication of the code into a decimal indication on either a UNA′ or a UNA relay of the decoder (FIG. 7A). The UNA relay is associated with points of the various code fields (FIGS. 7A and 7B) ranging from 00 to 99; while the UNA′ relay is similarly associated with code points ranging from 100 to 199. Consequently, operation of either a UNA relay or UNA′ relay partially closes a ground path to a particular code point in one of the code fields.

The partially closed path is subjected to further closure by the action of two RCT relays according to the tens digit of the incoming rate code. Final closure of the path is accomplished by either the SS relay or the PP relay.

From the decoder, the various code points are cross-connected with those of the encoder (FIGS. 7C through 7E). For the initial period a ground path is extended from the decoder into the encoder to operate one of the IRT–0 through 9 or IRT′–0 through 9 relays (FIGS. 7C and 7D). Once operated through one of its normally closed contacts, the IRT or IRT′ relay extends the ground path to one of the IRH–0 through 4 relays. In addition it locks through a preliminary make contact that is in series with a Battery Control relay BC. The latter prevents any bunching of IRT or IRT′ contacts from causing multiple operation of the IRH relays.

After the appropriate IRH relay is energized, it is locked through a series BC′ relay and the ground path is further extended to operate one of the IRU–0 through 5 relays, along with one of the IM–1 through 4 relays. Because of the BC′ relay, multiple operation of the IRU and IM relays is prevented.

The initial period rate and time assignments for the encoder code points are set forth in Tables III and IV. Each row in Table III is associated with a successive IRT′ relay and, in Table IV, with an IRT relay. The columns of the two tables identify the encoder code points to which the entries apply in terms of cents per minute. For example, in Table III, the entry "05/1" under column B in the IRT–0 row indicates that a ground path which extends through the decoder to the code point B of relay IRT–0 will ultimately activate the IRU–5′ relay and the IM–1 relay to give an encoder output indication that the initial period charge is five cents for the first minute.

TABLE III.—ENCODER CODE POINT

| Relay | A | B | C | D | E | F | G | H |
|---|---|---|---|---|---|---|---|---|
| IRT′-0 | (*) | 05/1 | (*) | 05/4 | (*) | 05/2 | 100/2 | 105/2 |
| IRT′-1 | 10/1 | 15/1 | 10/4 | 15/4 | 10/2 | 15/2 | 110/2 | 115/2 |
| IRT′-2 | 20/1 | 25/1 | 20/4 | 25/4 | 20/2 | 25/2 | 120/2 | 125/2 |
| IRT′-3 | 30/1 | 35/1 | 30/4 | 35/4 | 30/2 | 35/2 | 130/2 | 135/2 |
| IRT′_4 | 40/1 | 45/1 | 40/4 | 45/4 | 40/2 | 45/2 | 140/2 | 145/2 |
| IRT′-5 | 50/1 | 55/1 | 50/4 | 55/4 | 50/2 | 55/2 | 150/2 | 155/2 |
| IRT′-6 | 60/1 | 65/1 | 60/4 | 65/4 | 60/2 | 65/2 | 160/2 | 165/2 |
| IRT′-7 | 70/1 | 75/1 | 70/4 | 75/4 | 70/2 | 75/2 | 170/2 | 175/2 |
| IRT′-8 | 80/1 | 85/1 | 80/4 | 85/4 | 80/2 | 85/2 | 180/2 | 185/2 |
| IRT′-9 | 90/1 | 95/1 | 90/4 | 95/4 | 90/2 | 95/2 | 190/2 | 195/2 |

TABLE IV.—ENCODER CODE POINT

| Relay | I | J | K | L | M | N | O | P |
|---|---|---|---|---|---|---|---|---|
| IRT-0 | (*) | 05/3 | 100/3 | 105/3 | 200/3 | 205/3 | 300/3 | 305/3 |
| IRT-1 | 10/3 | 15/3 | 110/3 | 115/3 | 210/3 | 215/3 | 310/3 | 315/3 |
| IRT-2 | 20/3 | 25/3 | 120/3 | 125/3 | 220/3 | 225/3 | 320/3 | 325/3 |
| IRT-3 | 30/3 | 35/3 | 130/3 | 135/3 | 230/3 | 235/3 | 330/3 | 335/3 |
| IRT-4 | 40/3 | 45/3 | 140/3 | 145/3 | 240/3 | 245/3 | 340/3 | 345/3 |
| IRT-5 | 50/3 | 55/3 | 150/3 | 155/3 | 250/3 | 255/3 | 350/3 | 355/3 |
| IRT-6 | 60/3 | 65/3 | 160/3 | 165/3 | 260/3 | 265/3 | 360/3 | 365/3 |
| IRT-7 | 70/3 | 75/3 | 170/3 | 175/3 | 270/3 | 275/3 | 370/3 | 375/3 |
| IRT-8 | 80/3 | 85/3 | 180/3 | 185/3 | 280/3 | 285/3 | 380/3 | 385/3 |
| IRT-9 | 90/3 | 95/3 | 190/3 | 195/3 | 290/3 | 295/3 | 390/3 | 395/3 |

*Available for additional entries.

The specific interconnections between the decoder and the encoder code points depend upon prior assignments made to the various rate code members that are received by the calculator. These are arbitrarily assigned and, for the example discussed, where the initial period charge is five cents for the first minute, the rate code number may take on any value between 00 and 199. On the assumption that the rate code 77 has been so assigned for person-to-person calls, code point B associated with the IRT–0 relay in the encoder is connected to code point PP77 of the encoder. It is to be noted that a multiplicity of code points in the encoder may be connected with a single code point of the decoder. Thus the initial rate previously discussed may be identified with separate code points for person-to-person and station-to-station calls, having respective code numbers of 77 and 64, in which case an additional connection is made from the decoder to code point SS64 of the encoder.

For convenience in calculation, the initial rate indication of the IRH, IRT and IRU relays is converted (FIG. 7H) to two-out-of-seven form. As such it operates TCH, TCT and TCU relays (FIG. 9B), preparatory to transmission of the initial period charges to the control network of FIG. 1 in two-out-of-five form.

Figure 15A:
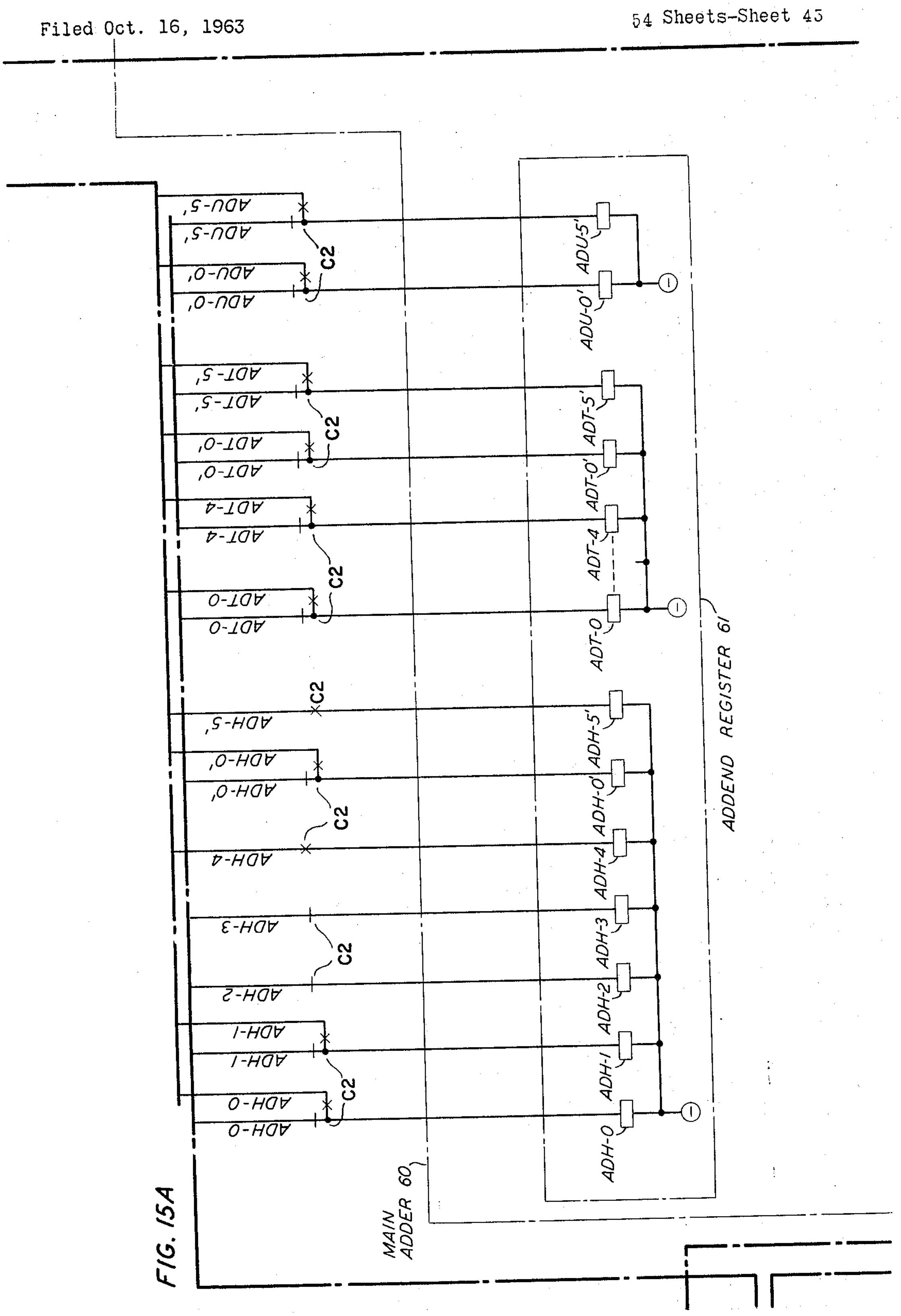

The initial two-out-of-seven rate indication also operates the ADH, ADT and ADU relays of the main adder (FIG. 15A). As a result, the ADH, ADT and ADU relays close contacts in the initial supplemental charge calculator (FIG. 16) as well as in the adder logic circuitry (FIGS. 15C through 15F).

Figure 15B:
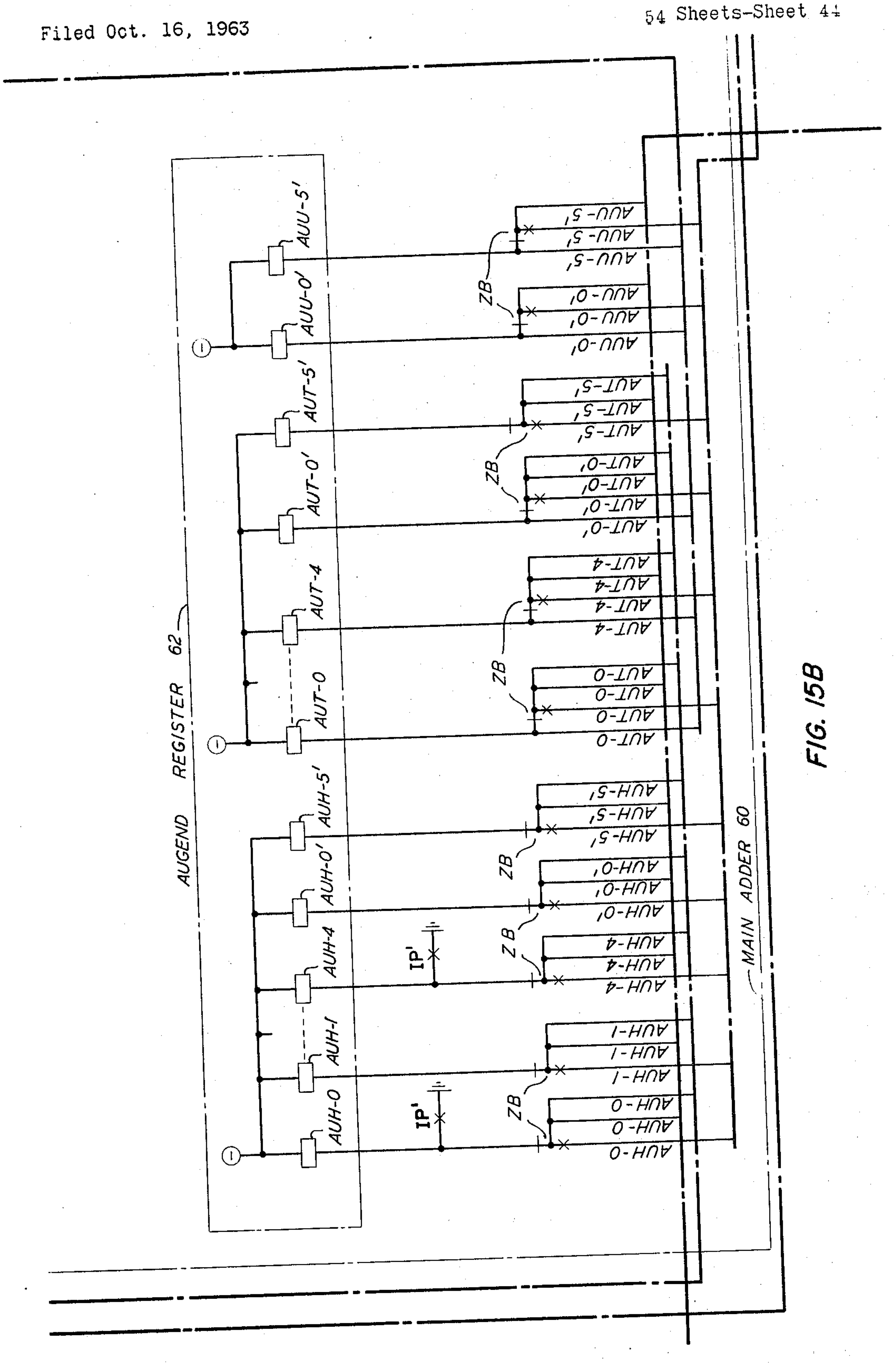

Because of the initial period operation of the IP′ relay (FIG. 19B) from the IP relay (FIG. 6), ten percent of the initial charge stored on the ADH, ADT and ADU relays is registered on respective pairs of AUH and AUT relays and one of the AUU relays (FIG. 15B). The IP′ relay forces the operation of the AUH–0, AUH–0′ and AUT–0′ relays.

Figure 9A:
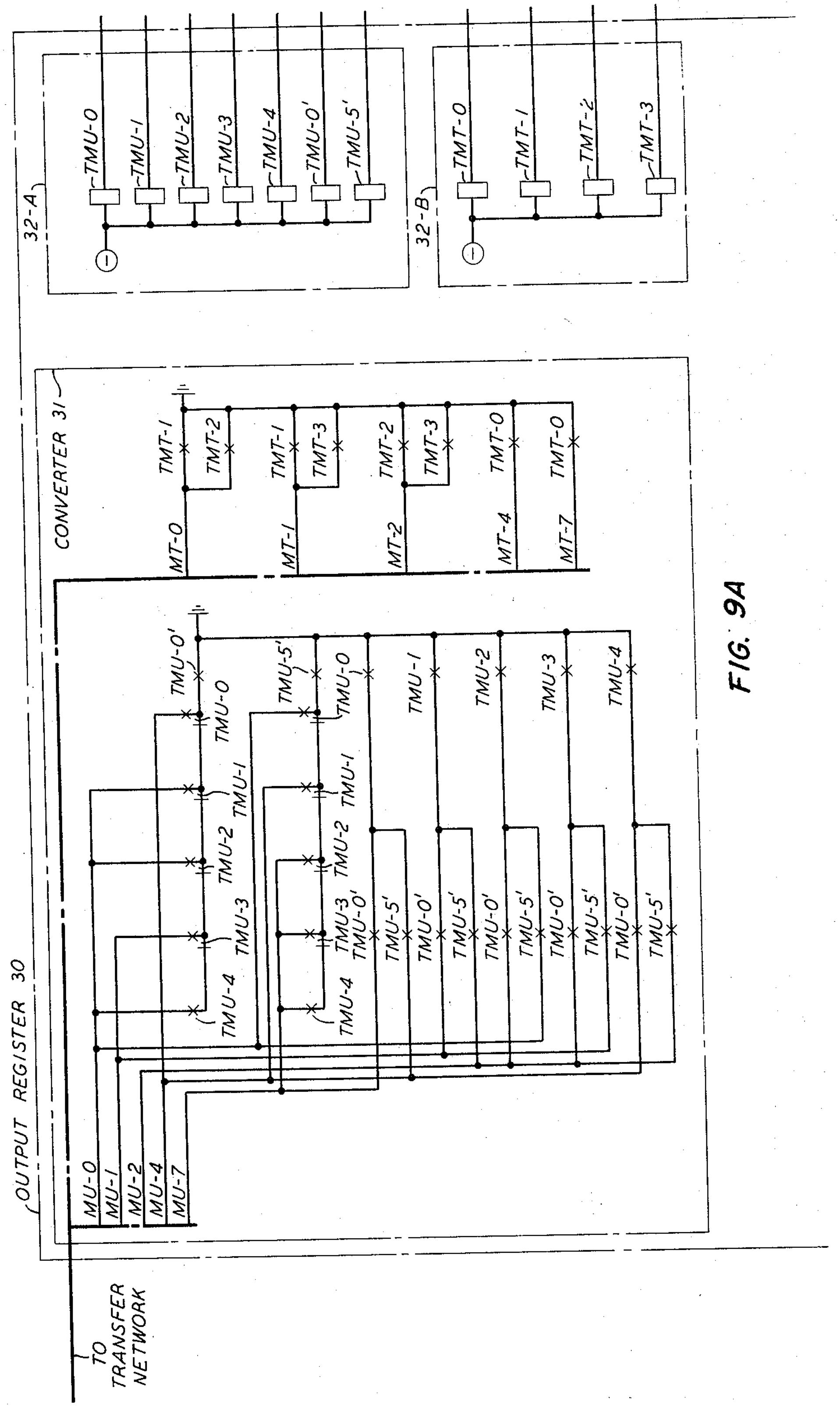
Figure 9B:
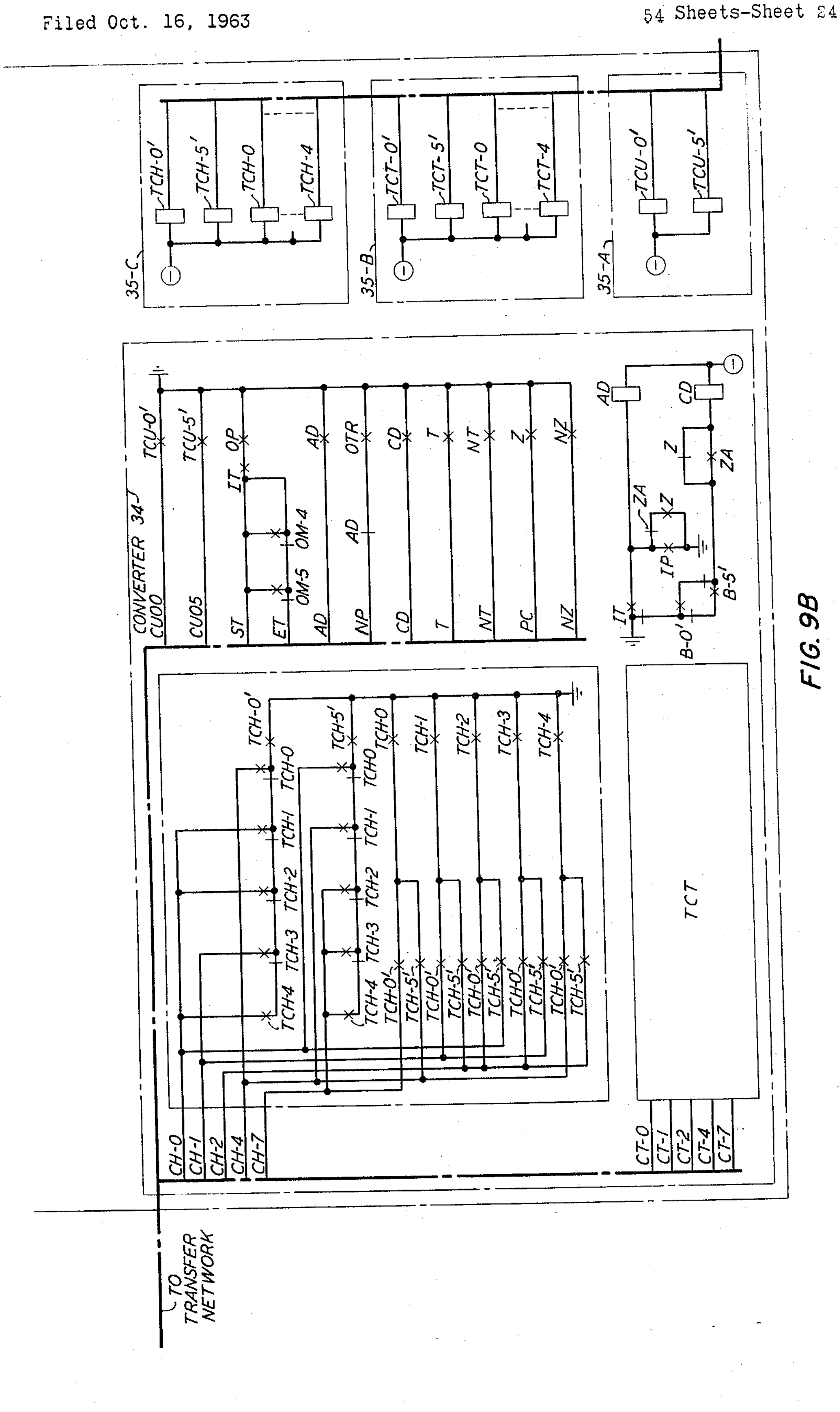

In the output register the units sum of the initial charge and the tax is registered on one of two TCU relays (FIG. 9B) and the tens sum is registered on two of seven TCT relays (FIG. 9B). Hundreds registration takes place at the TCH relays, subject to modification dictated by the forced operation of AUH–0, AUH–0′ and AUT–0′ relays. The hundreds charge is increased by unity when a carry one relay CO operates within associated logic circuitry (FIG. 15E) for a summation of over 95 cents. Otherwise a No Carry relay NC operates and there is no change.

Figure 10:
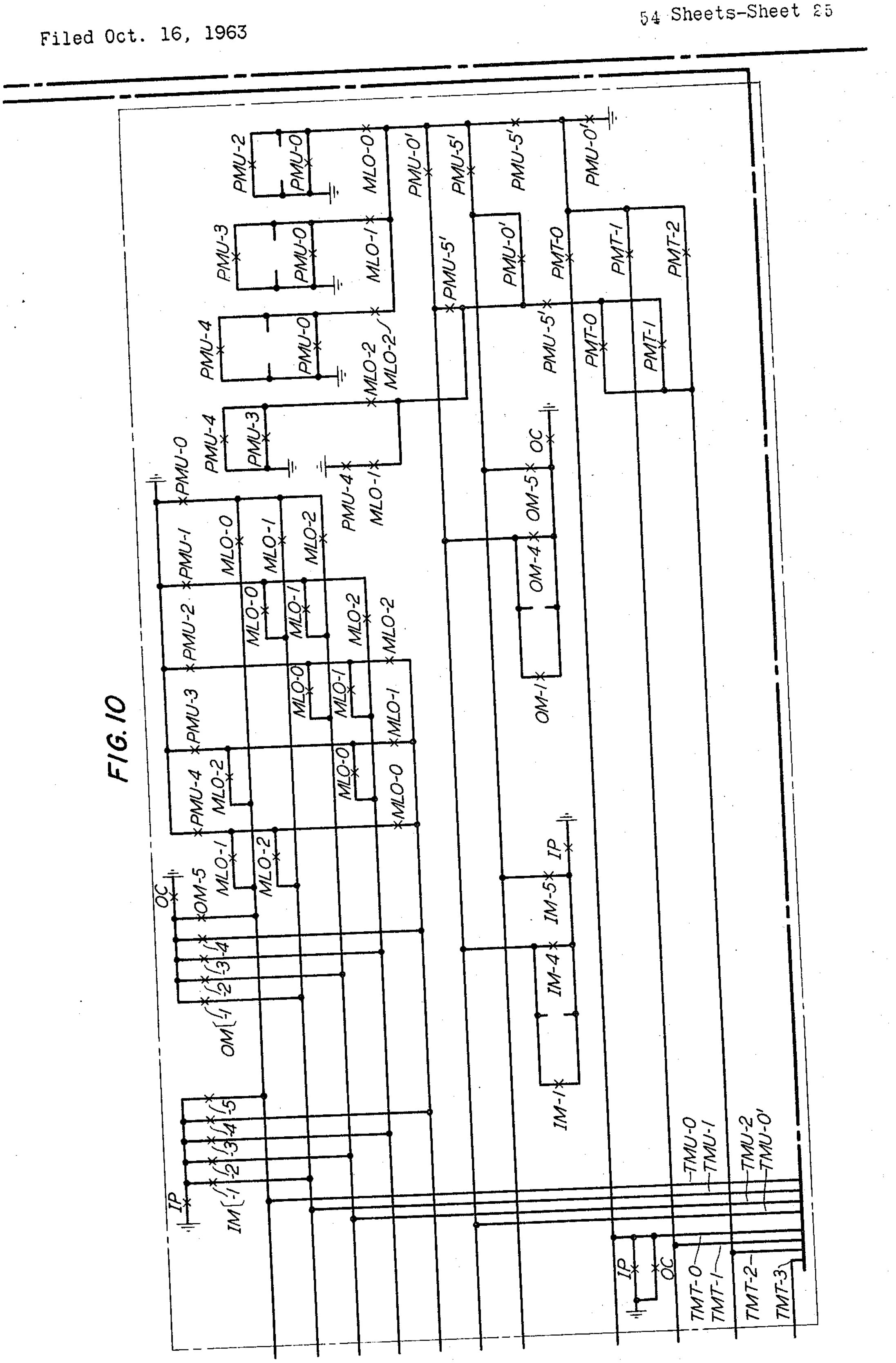

The allocated duration of the initial period is indicated by the IM–1 through 5 relays (FIG. 7C). A ground connection that is extended through closed IP and IM contacts (FIG. 10) brings about activation of two TMU relays (FIG. 9A). The units digit of the initial time period is converted (FIG. 9A) for the customary two-out-of-five transmission. But the tens digit of the initial period is always zero. Hence the IP relay forces the operation of the TMT–0 relay (FIG. 10).

Figure 6:
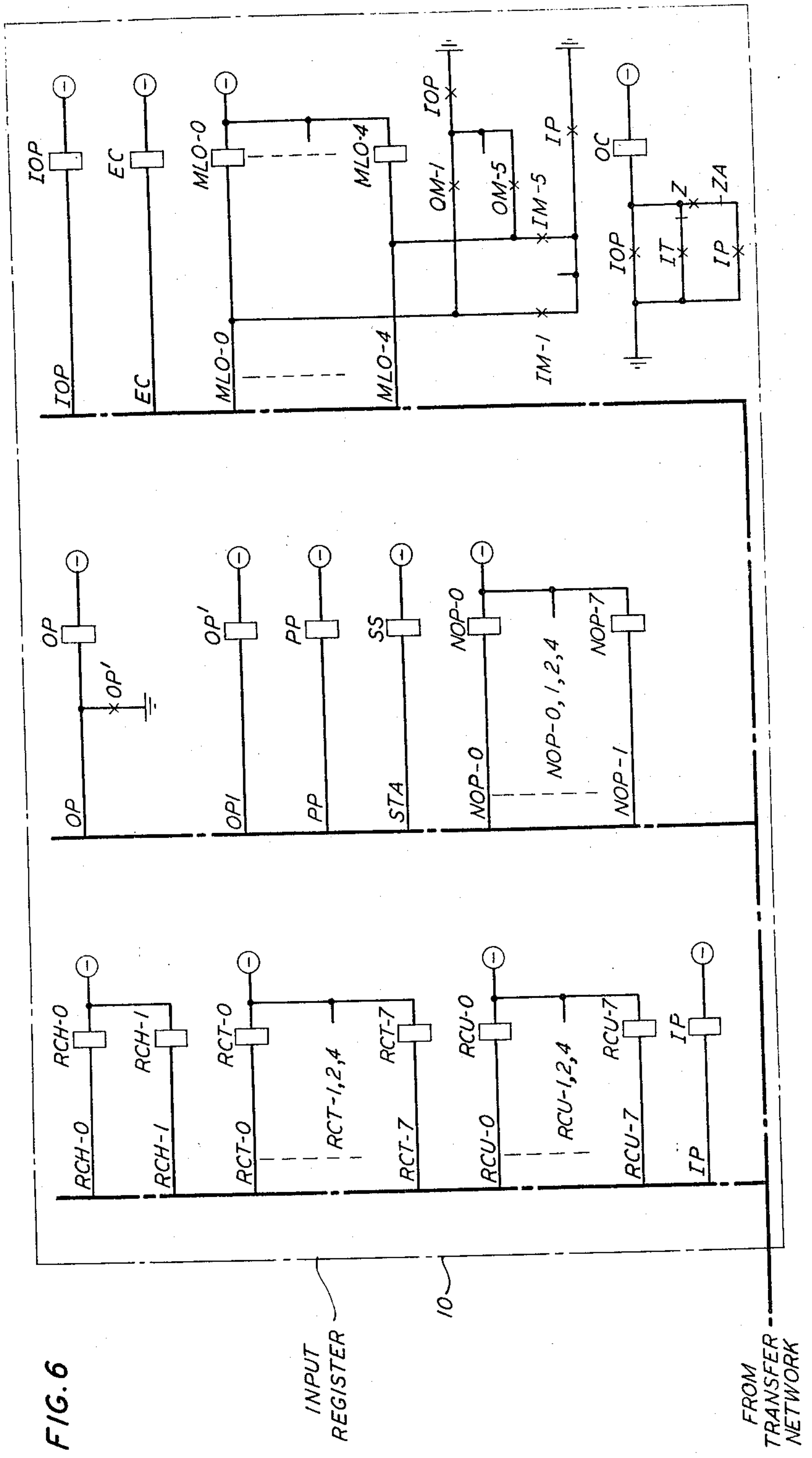

Besides acting upon the output register, the IM relays also prime a timer in the trunk network of FIG. 1 for timing the initial period by grounding appropriate MLO–0 through 4 leads (FIG. 6).

On zone calls, i.e., those which are not taxed, the IP′ relay grounds leads extending to the AUH–0 and 0′ relays (FIG. 15B) and, together with the Z relay applies grounds from the charge calculator to the AUT–0, AUT–0′ and AUU–0′ relays to produce a zero tax registration.

For those situations where the initial dial tone deposit is retained, the calculator is arranged to subtract 10 cents from the initial charge. The DST–1 relay (FIG. 11B) rearranges the leads of the charge converter (FIG. 11B) to effect a tens digit reduction in the TCT relays (FIG. 9B). With the DST–1 relay operated, a ground condition on the TCT–0 and 0′ relays, representing a zero in the tens digit, is transferred to the TCT–4 and 5′ relays. The latter bring about the operation of the DSH–1 relay to reduce the hundreds digit of the charge by one. Any other combination of TCT relays with the operated DST–1 relay will activate the DSH–0 relay and prevent any change in the TCH relays, in effect subtracting zero from them.

To adapt the calculator for calls where the initial dial tone deposit is returned, the charge control register of FIG. 11B is altered so that the DSH–0 relay is operated directly from the IP relay and the DST–1 relay is rendered inoperative. In that event the TCH and TCT relays are grounded directly and there is no 10 cent subtraction.

At the end of the initial period, the calculator is seized to determine the charge and duration of each overtime period. This seizure is similar to that described earlier except for the substitution of the OP relay for the IP relay and the energizing of Initial Overtime Period IOP relay (FIG. 6). The OP relay operates during all overtime seizures and activates the overtime period code field (FIG. 7B). The IOP relay is activated only at the end of initial period seizures. Among other things, it disables the initial period code fields. (FIG. 7A).

With the encoder code points OT cross connected to decoder code points OTR (FIG. 7E), according to the duration and charge associated with the various received code numbers, the operation of the OP relay extends ground to operate one of the ORT–0 through 9 relays. The ORT relay locking path operates a BC relay which advances the ground to one of the OM–1 through 3 relays and one of the ORU–0′ and 5′ relays.

To prevent premature overtime multiplication, the IOP relay operates an Overtime Control relay OC (FIG. 6). Besides disabling the multiplier (FIGS. 13B through 13E), the OC relay operates an auxiliary OC′ relay (FIG. 13C) to route the overtime charge output leads (FIG. 11A) to the TCH, TCT and TCU relays (FIG. 9B). The TCH-0 and 0′ relays (FIG. 11A) are grounded directly by the OT′ relay for a hundreds digit indication of zero.

The OT relay directly operates (FIG. 11A) the TMT-0 relay and two of seven TMU relays through operated contacts of one of the OM-1 through 5 relays to indicate the number of minutes allowed per overtime period.

Figure 7F:
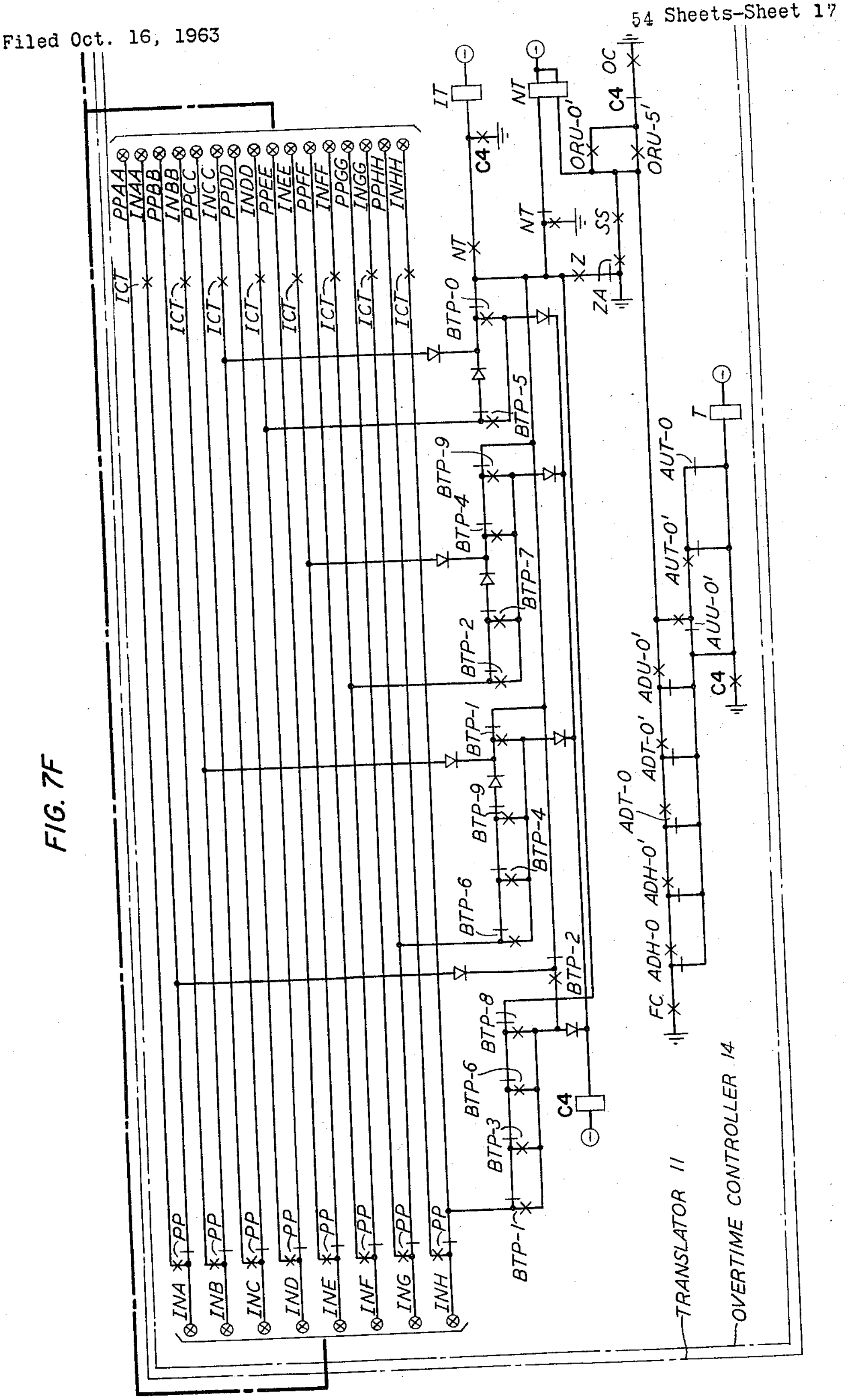
Figure 7G:
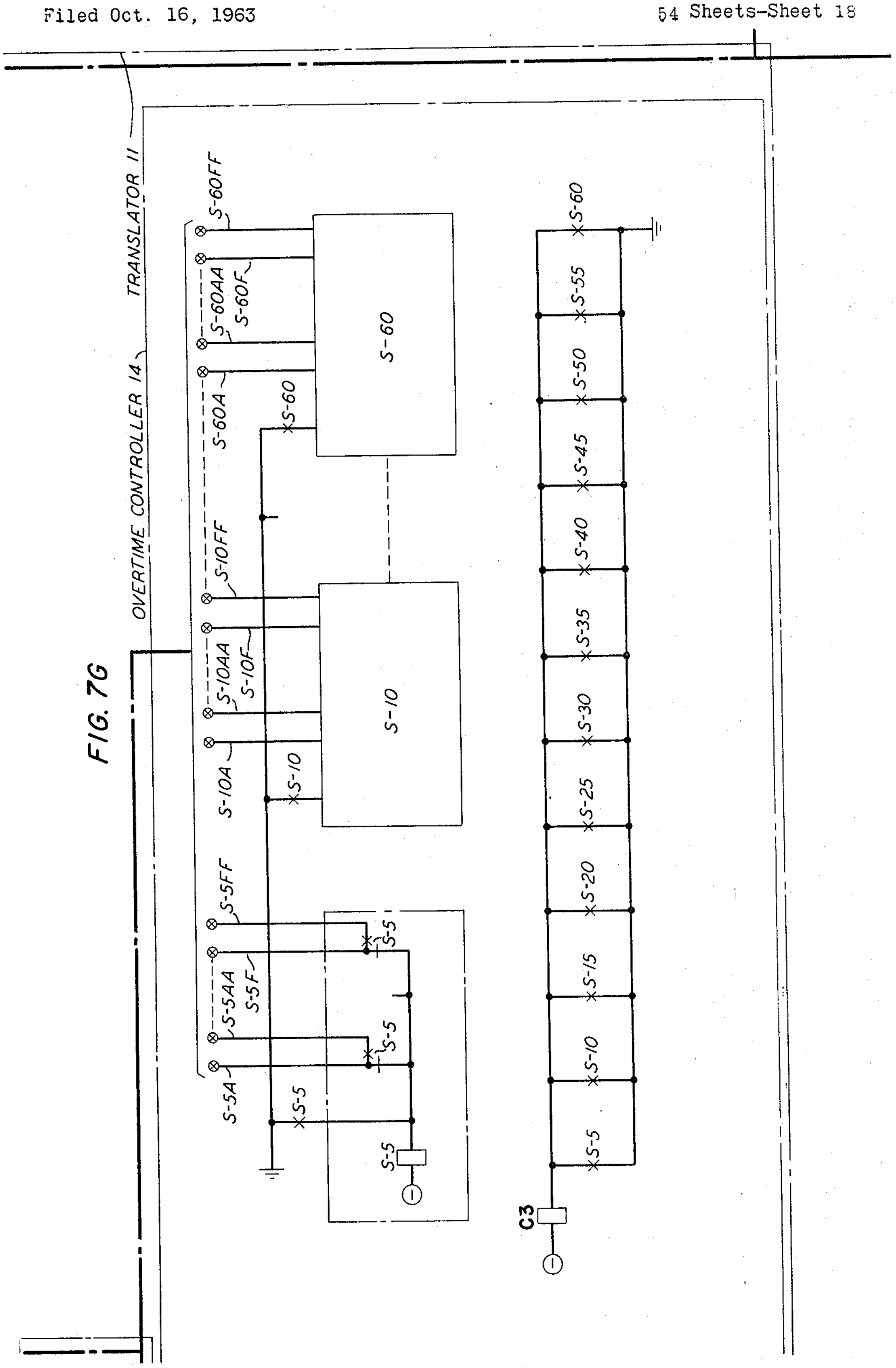
Figure 7H:
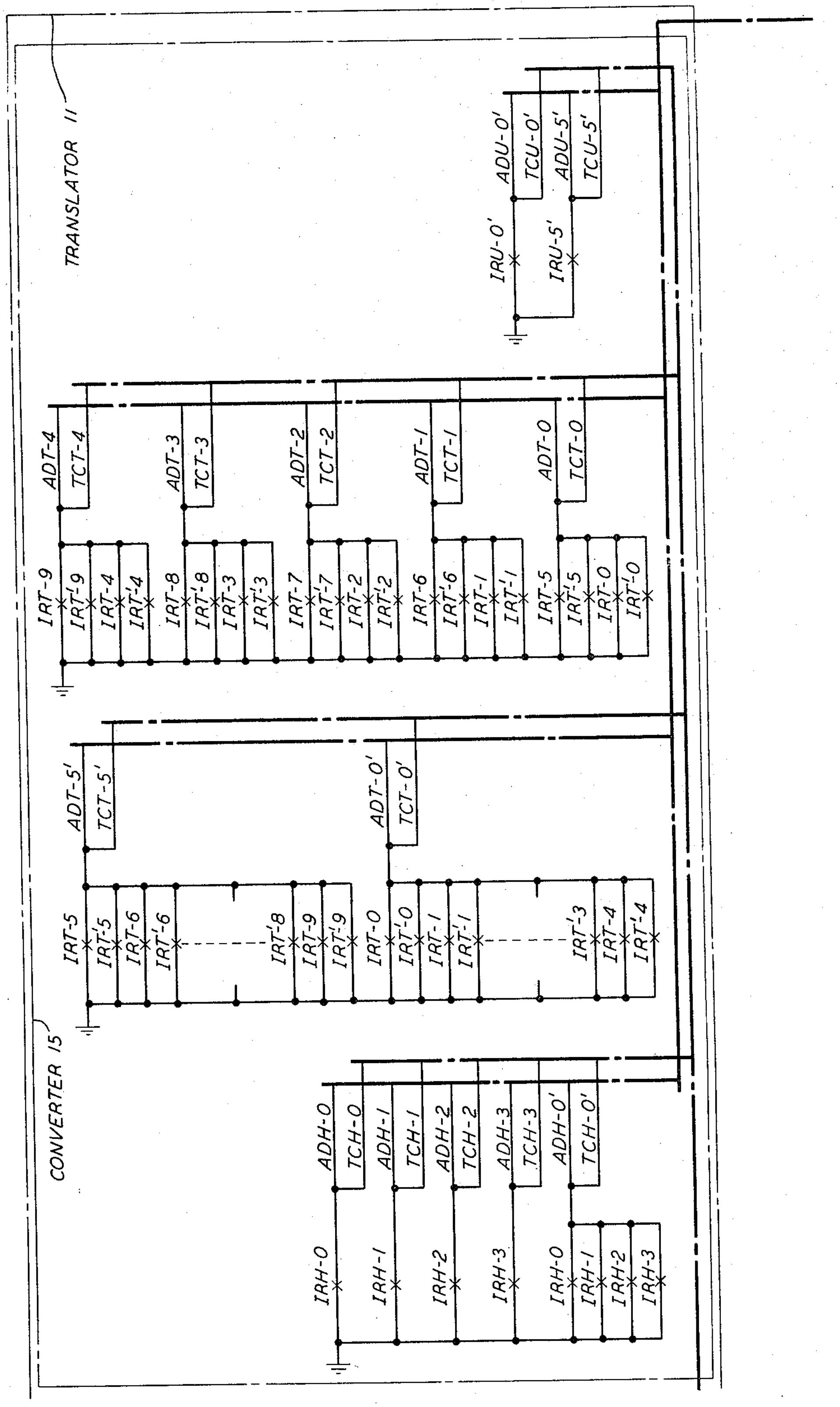

For calls extending beyond one overtime period, an elapsed time condition is indicated by nonoperation of the Interval Termination relay IT (FIG. 7F). On one, two and three minute overtime intervals, the Extend Timing lead ET (FIG. 9B) and one of the MLO–0 through 2 leads (FIG. 6) are closed to the trunk network of FIG. 1 for the purpose of timing the overtime periods on a postpaid basis.

To accommodate zone calls that extend into postpaid overtime, a zone code point Z1 or Z2 (FIG. 19B) is cross connected to a subsidiary zone relay ZA. Once operated, the ZA relay activates a No Tax relay NT (FIG. 7F). In addition, it closes a ground path to a Position Control lead PC (FIG. 9B) and opens the operate path of the Advance Deposit relay AD (FIG. 9B) and the IT relay (FIG. 7F). Release of the AD relay establishes a ground path on a Notify Position Lead NP (FIG. 9B) that extends to the transfer network of FIG. 1. Release of the IT relay on one, two and three minute overtime periods grounds the ET lead (FIG. 9B). Four and five minute overtime periods are handled only on an interval timed basis.

For prepaid zone calls with overtime periods of three minutes or less, the zone code points Z1 and Z2 (FIG. 19B) are cross connected to the Z relay. The latter closes paths to the NT, AD, CD and OC relays (FIGS. 7F, 9B and 6) and to the Position Control lead PC. The NT relay closes a path to the NT lead and operates the IT relay. Ground on the PC lead directs cancellation of any initial automatic message accounting entry on zone calls.

Although rate code numbers 0–19 are reserved for zone calls, they may be used for nonzone calls by cross connecting the Z1 or Z2 code point (FIG 19) to the No Zone relay NZ. The NZ relay closes a path (FIG. 9B) to the transfer network of FIG. 1 and the calculator functions as for a regular nonzone call.

Where the prepaid overtime on a zone call is of four or five minutes duration per period, the decoder code points OT (FIG. 7B) are cross connected to input code points associated with the OM–4 and 5 relays (FIG. 7E). The output OM code points are cross connected to the OTR code points corresponding to the monetary rates for three minute overtime periods. The OM–4, OM–5 relays open the operate path of the OM–3 relay.

The trunk network is primed for interval timing by grounding a Start Timing lead ST (FIG. 9B) with the IT, and OP relays operated. The minutes allowed in each overtime period is indicated to the trunk by a ground (FIG. 6) on one of the MLO–1 through 4 leads from the operated OM–2 through OM–5 and IOP relays.

In the case of short haul toll calls for which overtime is prepaid, there is a five cent tax in various overtime intervals depending on the initial and overtime period rate. For this purpose the OT code points (FIG. 7B) are cross connected to the INA–INH code points of FIG. 7F according to Table V.

TABLE V

| Initial Rate, cents | Overtime Period Rate, cents | Code Point | Tax Collection Intervals |
|---|---|---|---|
| 10 | 5 | INA | Third Overtime. |
| 15 | 5 | INB | Second Overtime. |
| 20 | 5 | INC | First Overtime. |
| 20 | 10 | IND | First and Sixth Overtime. |
| 25 | 10 | INE | Fifth and Tenth Overtime. |
| 30 | 20 | INF | Third, Fifth, Eighth and Tenth O. |
| 35<br>40 | 20 | ING | Second, Fifth, Seventh and Tenth O. |
| 45<br>50 | 20 | INH | Second, Fourth, Seventh and Ninth O. |

The output INAA–INHH code points (FIG. 7F) are cross connected to the OTR code points for the base overtime rate.

At the end of an initial period seizure, the IOP relay operates the BTP–0 relay of the first overtime period.

Each rate code requiring a five cent tax for the first overtime period is associated with a cross connection that extends from an OT code point (FIG 7B) to either an INC or an IND code point (FIG 7F), and the C4 relay becomes operated by a ground path that extends beyond the cross connection through BTP–0 contacts. Rate codes not requiring tax in the first overtime interval operate the NT relay.

Either the C4 or the NT relay operates the IT relay which, in turn, (1) operates the AD and OC relays, (2) completes a path to the trunk by way of the ST lead (FIG 9B) and (3) extends the ground path to the appropriate encoder code point (FIGS. 7F and 7E). When operated, the C4 relay causes a five cent tax increment to be added to the charges due by rearranging leads of the TCT and TCU relays (FIG. 11B). The C4 relay also operates the tax relay T to complete a corresponding path (FIG. 9B) to the transfer network. If there is no tax, the NT relay closes a path to the transfer network.

On postpaid overtime period seizures the calculator operation is similar to that which occurs at the end of an initial period, except that no IOP indication is received.

To indicate the duration of the overtime interval the trunk provides ground on two of five NOP relays (FIG. 6). With the OP and NOP relays operated, a BTP relay (FIG. 8A) converts the overtime interval into a one-out-of-ten indication. Either the NT or C4 relay operates depending on the rate treatment and overtime interval.

At the trunk, an ST indication is received that previously stored at the end of the initial period seizure, along with an overtime minutes indication.

Based upon the rate code, the calculator registers the initial charge and time on IRH, IRT, IRU and IM relays (FIGS. 7C and 7D) and the overtime charge and time on ORT, ORU and OM relays (FIG. 7E).

Figure 16:
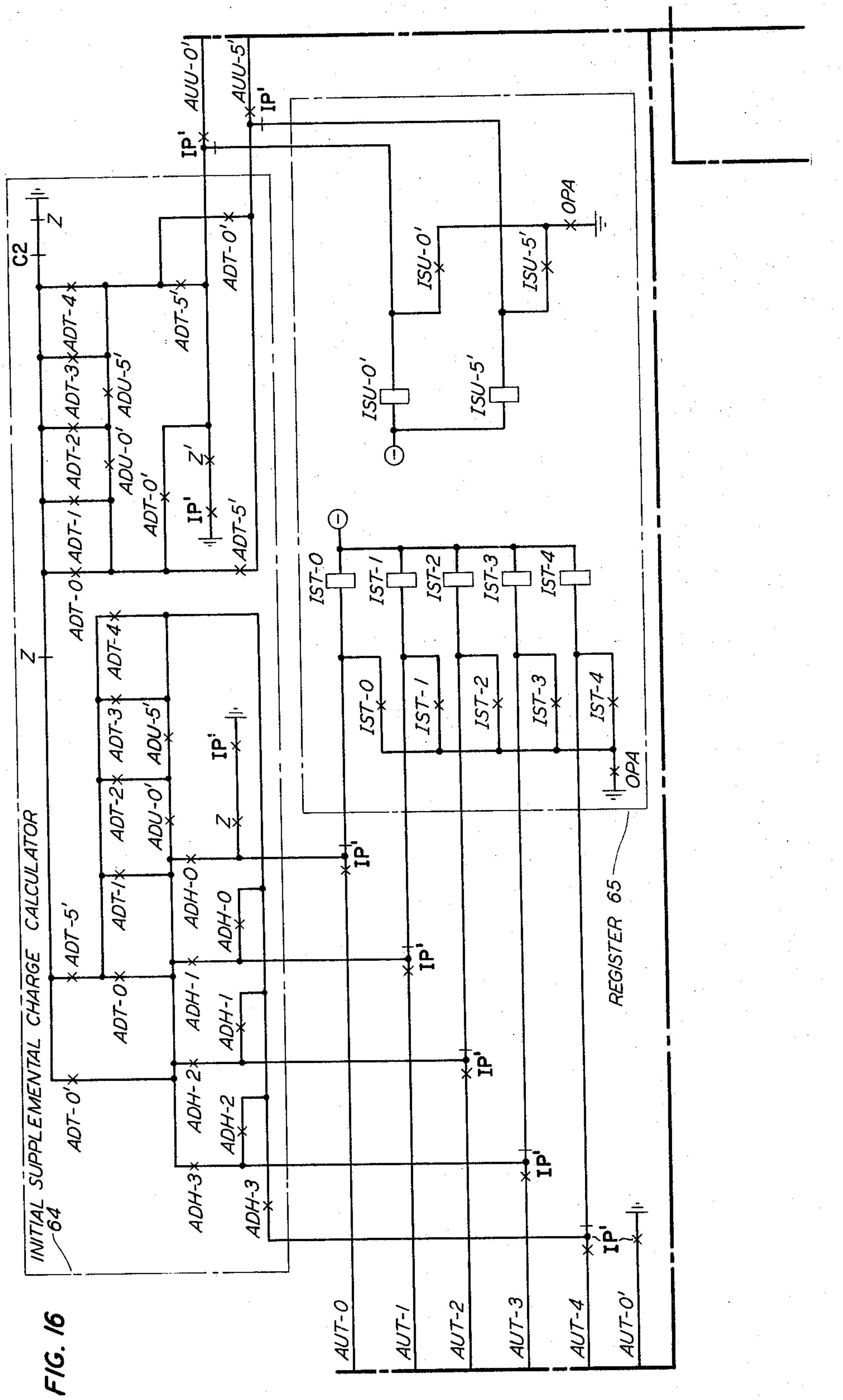
Figure 17A:
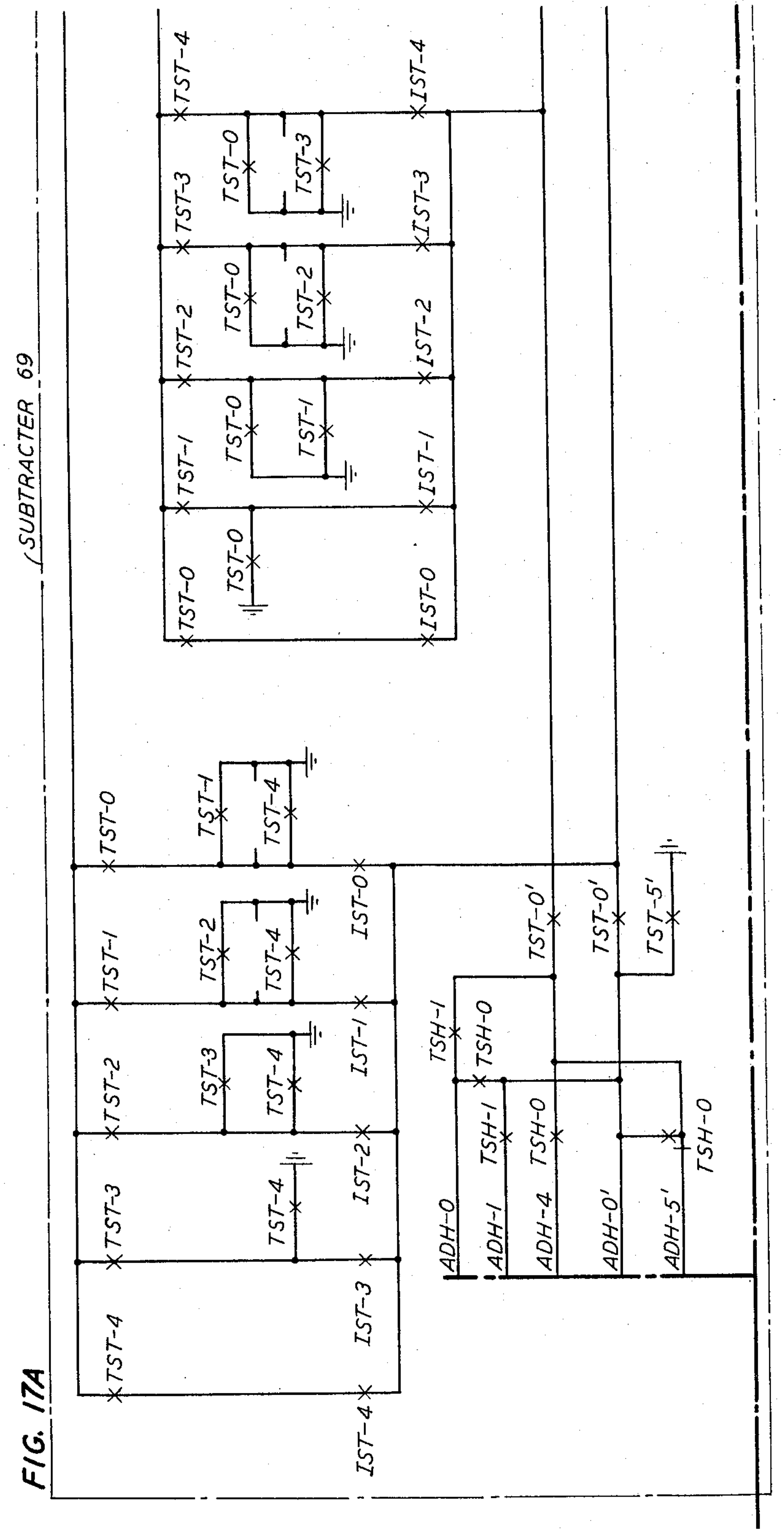
Figure 17B:
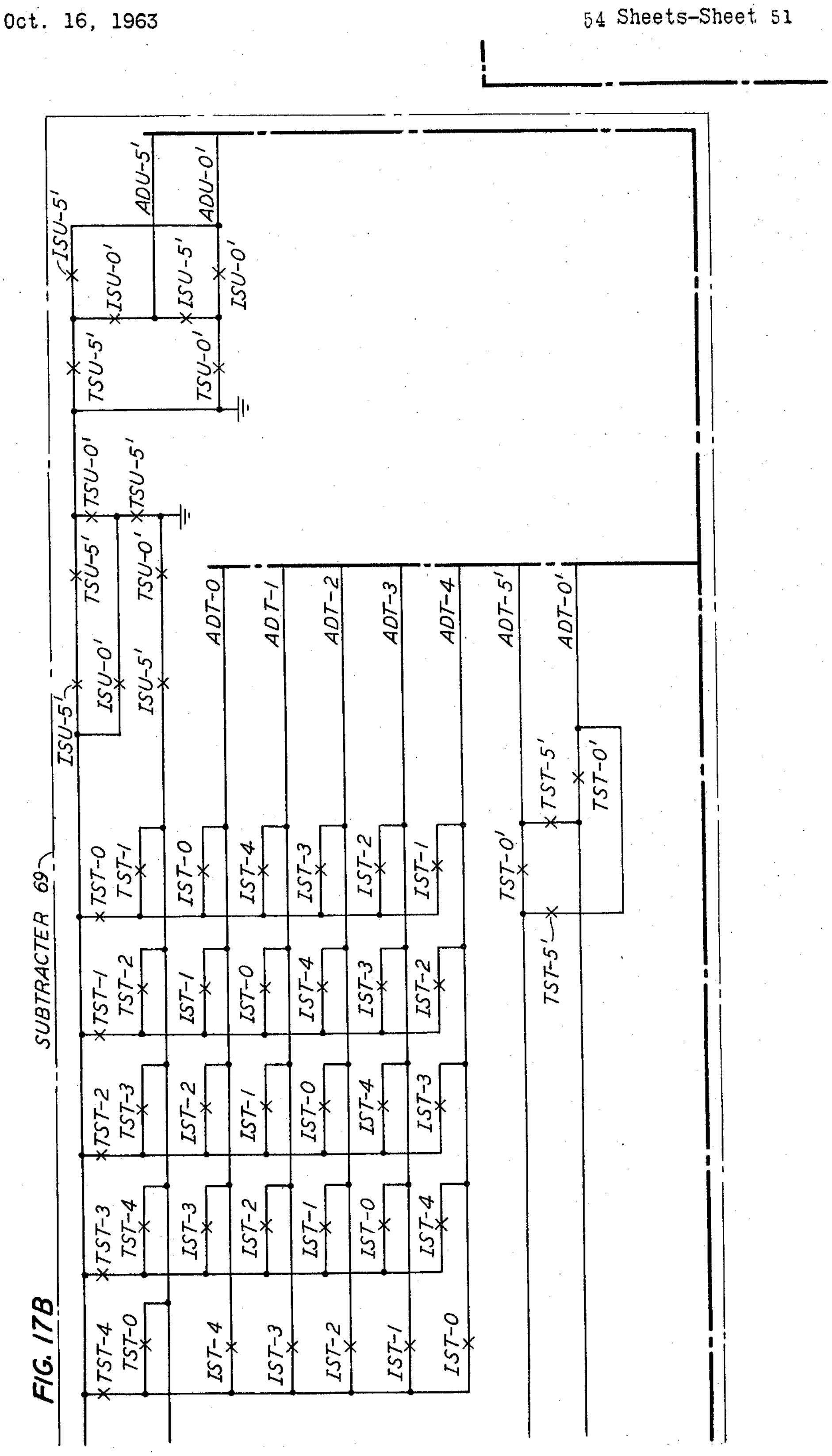

The initial charge acts upon IRU, ADH, ADT and ADU relays (FIG. 15A). A ten percent tax computation of the initial charge is registered on the IST and ISU relays (FIG. 16).

From the overtime period indication a BTP relay (FIG. 8A) operates to indicate one of ten overtime intervals. In addition, an ATP relay (FIG. 8H) operates under control of the MLO-0, 1, or 2 relays to indicate the number of minutes that have elapsed in the last overtime period.

If the trunk seizes the calculator prior to the lapse of six seconds in a succeeding overtime period, the MLO-0 relay (FIG. 6) is grounded. This causes the operate leads of the ATP relays (FIG. 8A) to regress by one count to avoid charging for the period.

The total overtime is computed by multiplying (FIGS. 8B and 8C) the overtime minutes on the OM relays by the number of overtime periods registered on the BTP relays. With the OC relay normal and the OP, OM and BTP relays operated, a path is closed to the PMT and PMU relays. The output of the PMT and PMU relays is modified (FIG. 10) by the MLO relay to include the minutes of the final overtime period. Registration of the total overtime interval is made on one of four TMT relays and two of seven TMU relays (FIG. 9A).

Figure 13A:
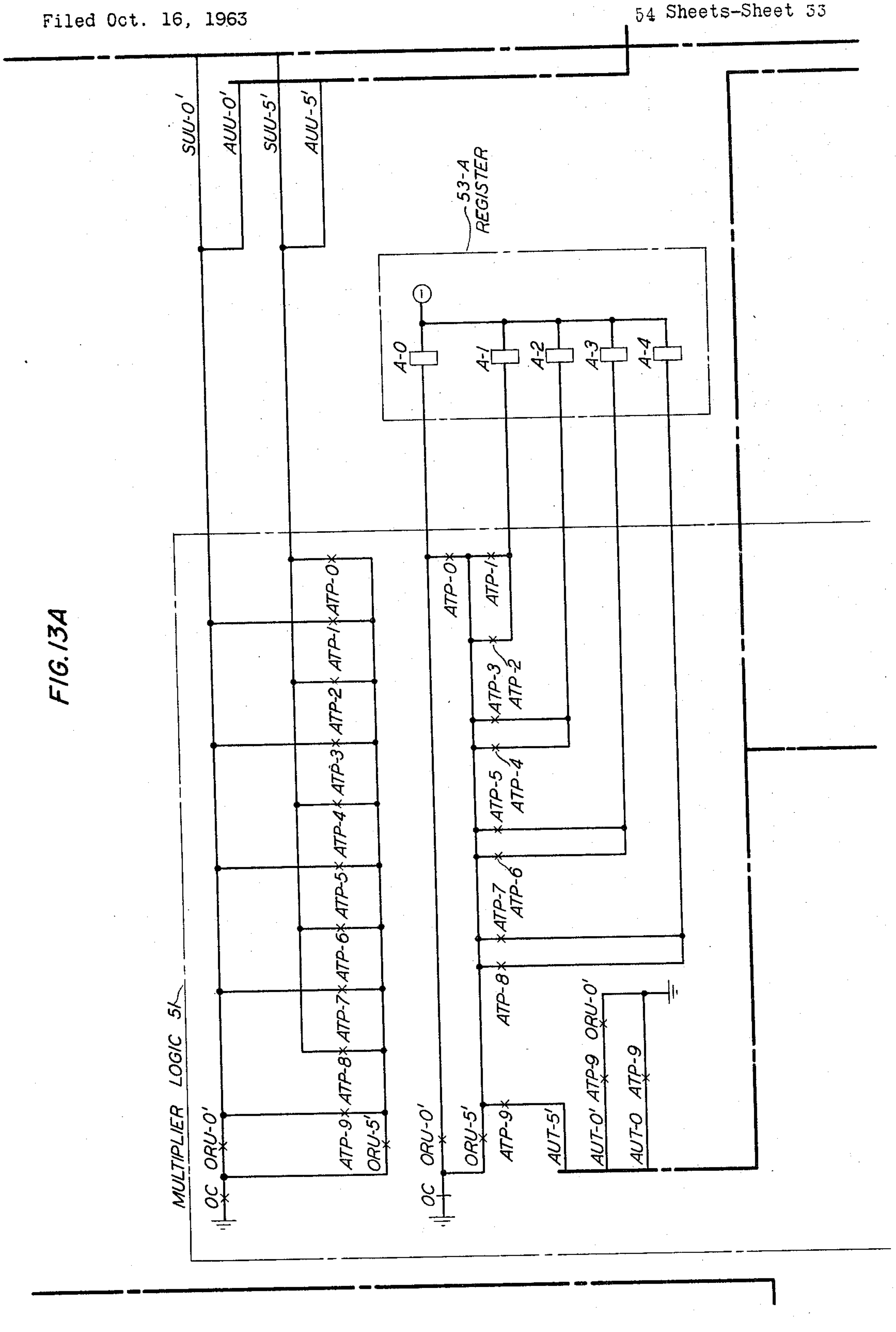
Figure 13B:
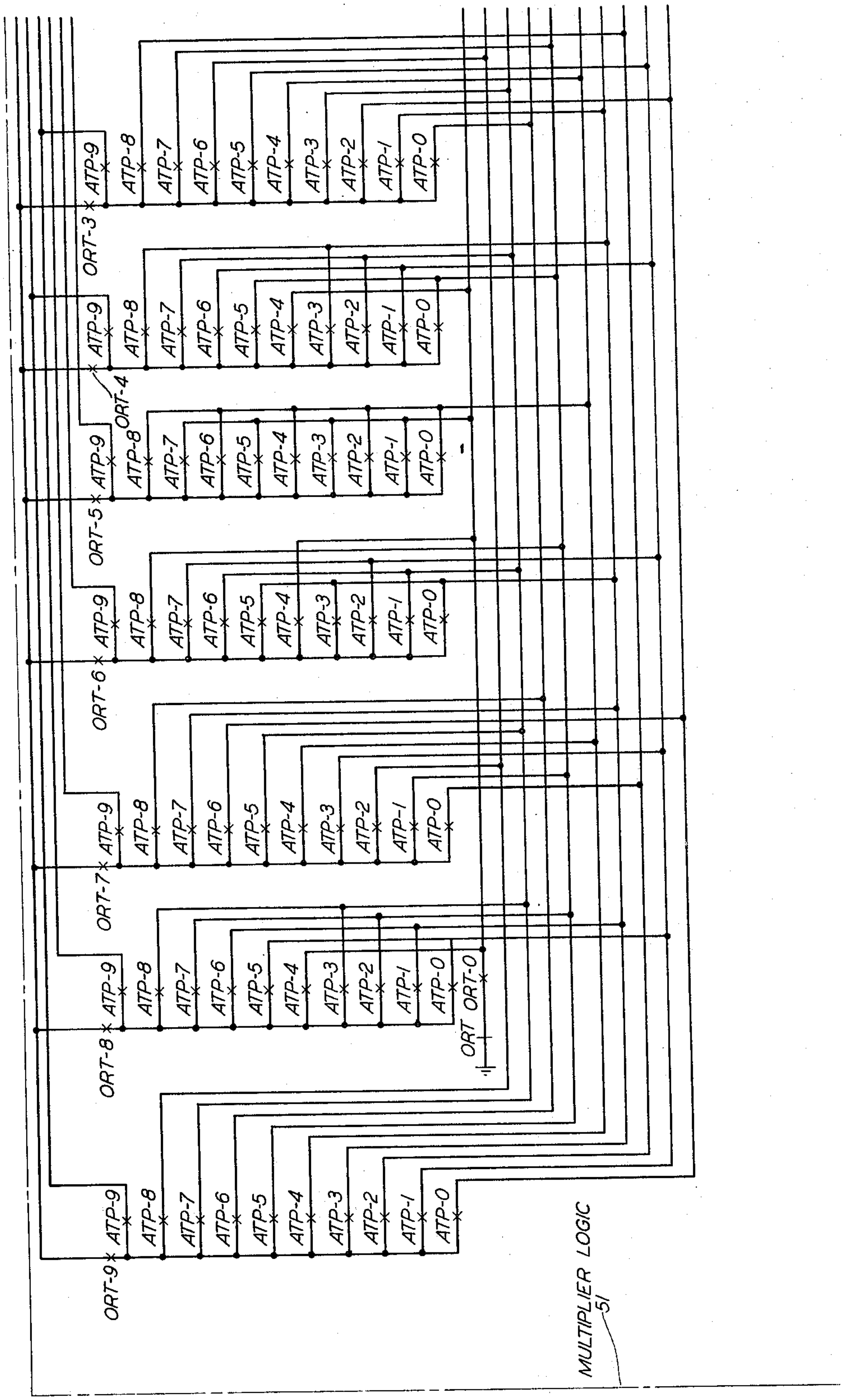
Figure 13C:
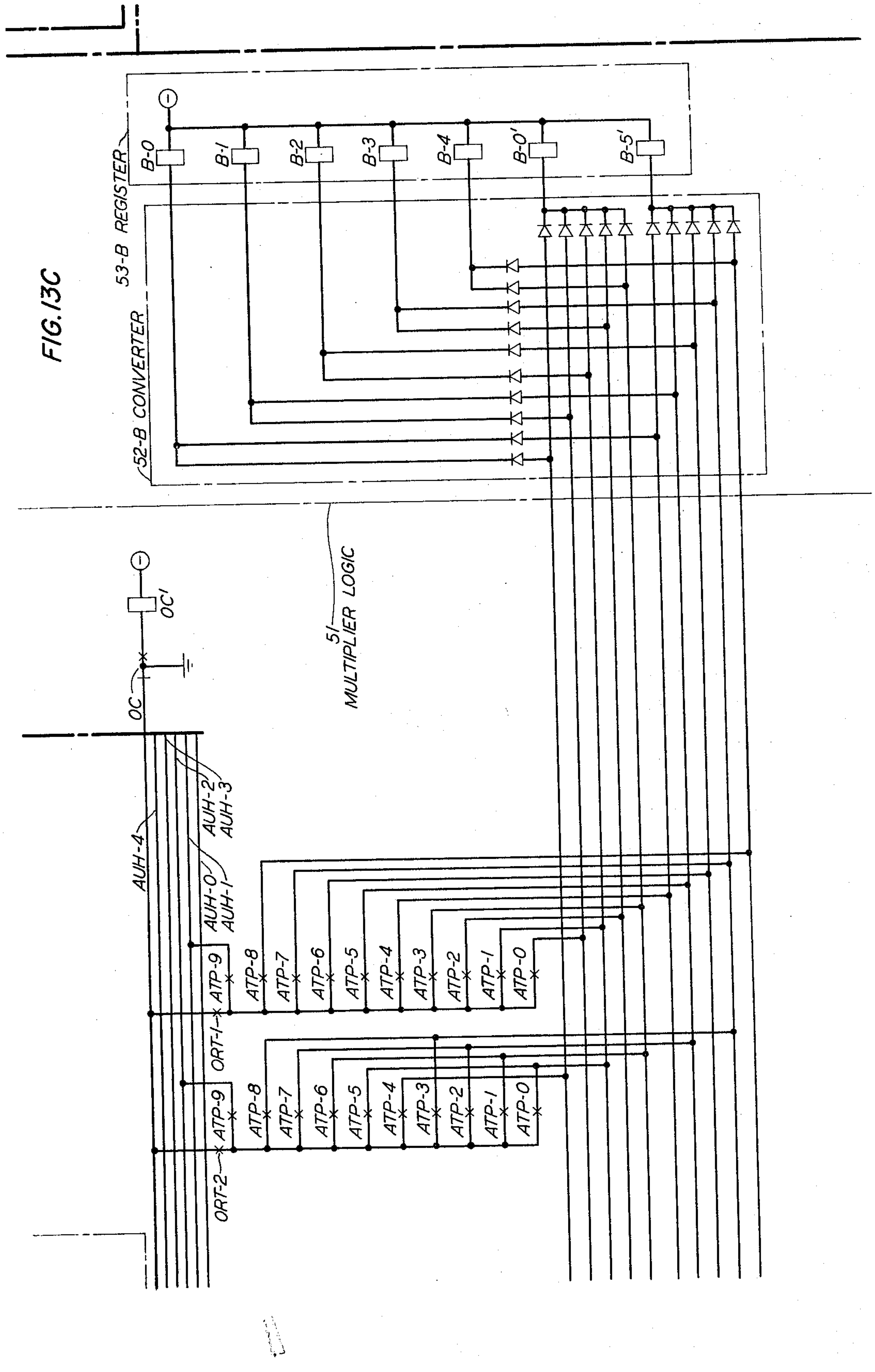
Figure 13D:
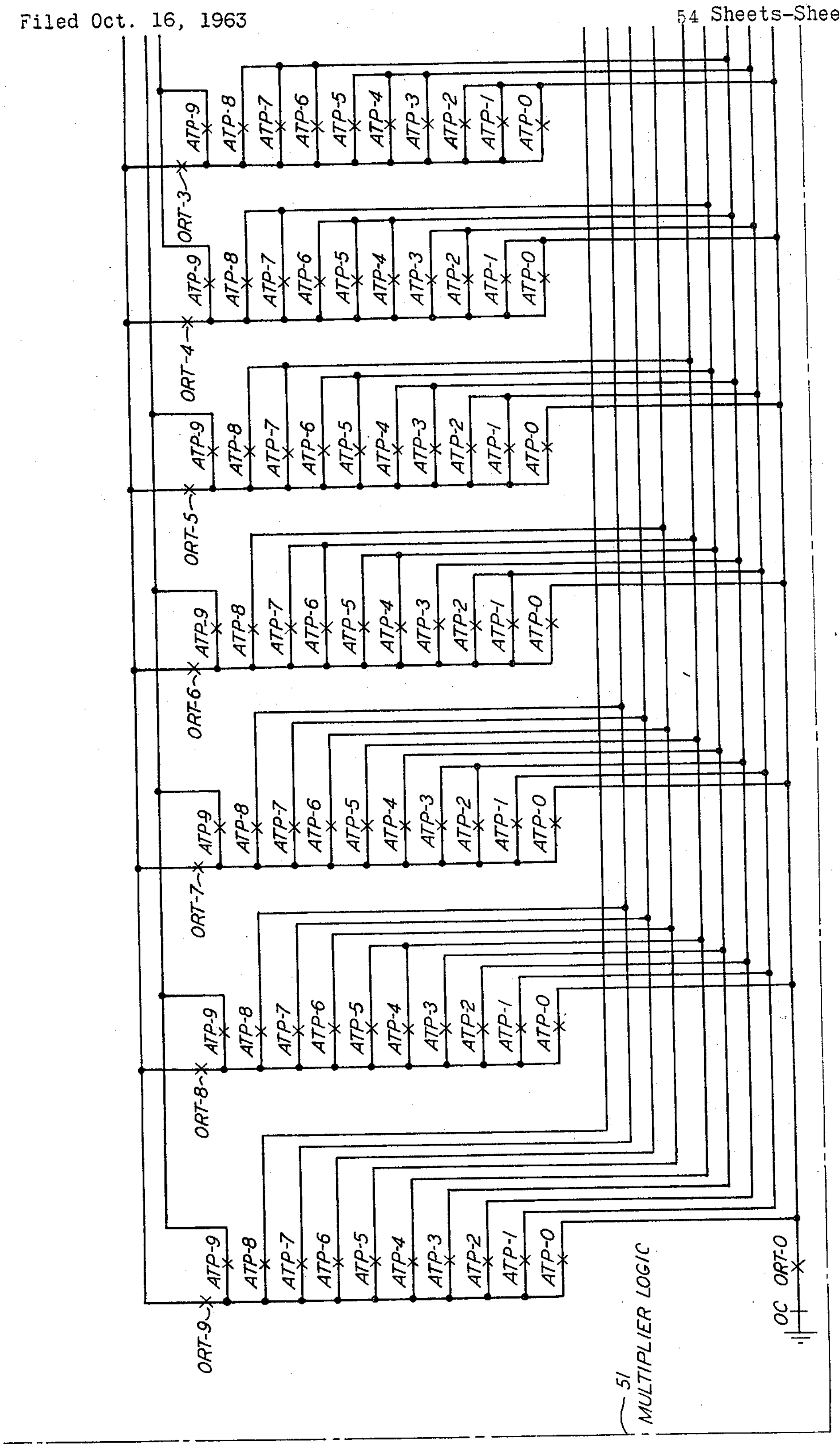
Figure 13E:
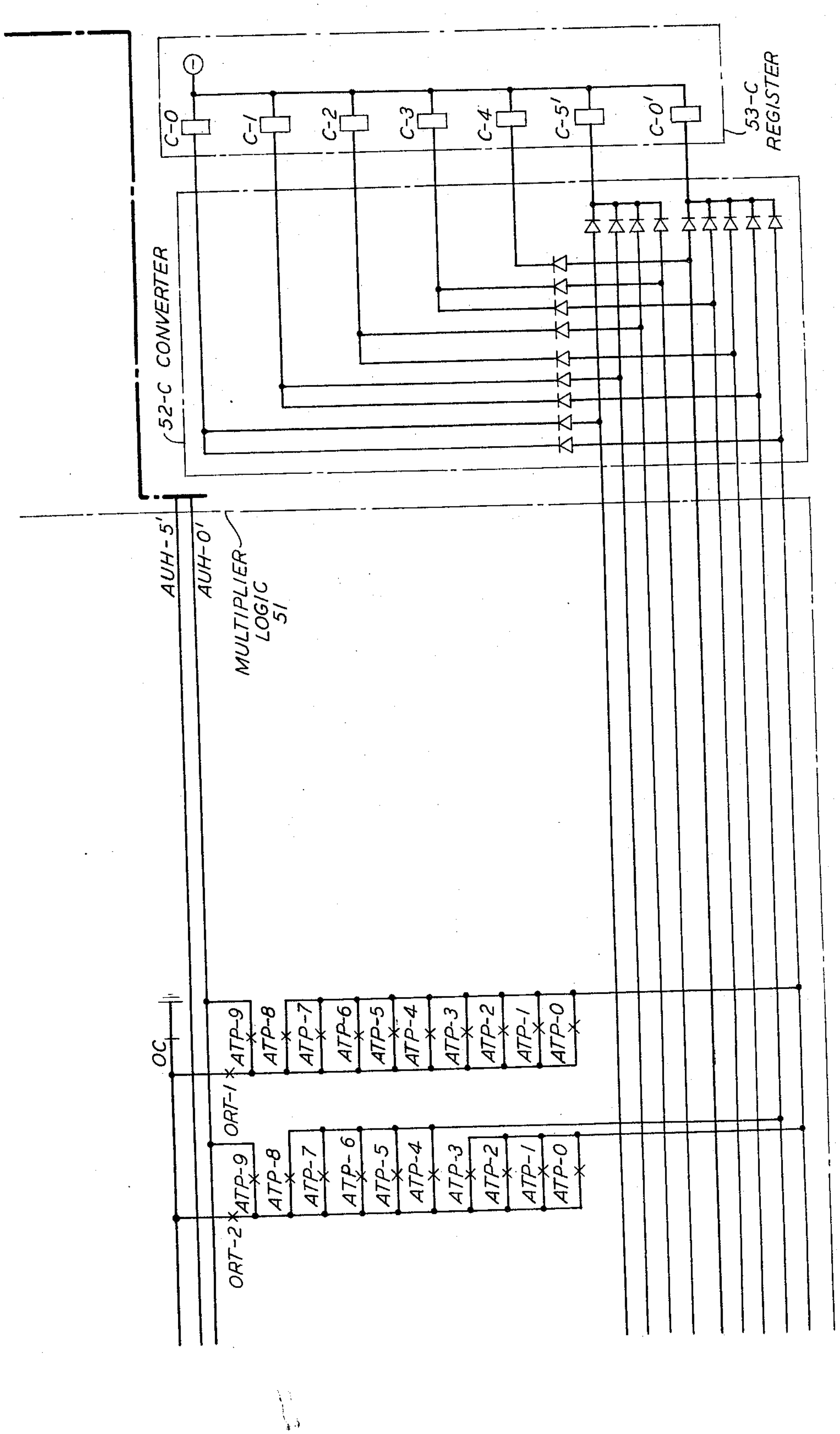
Figure 13F:
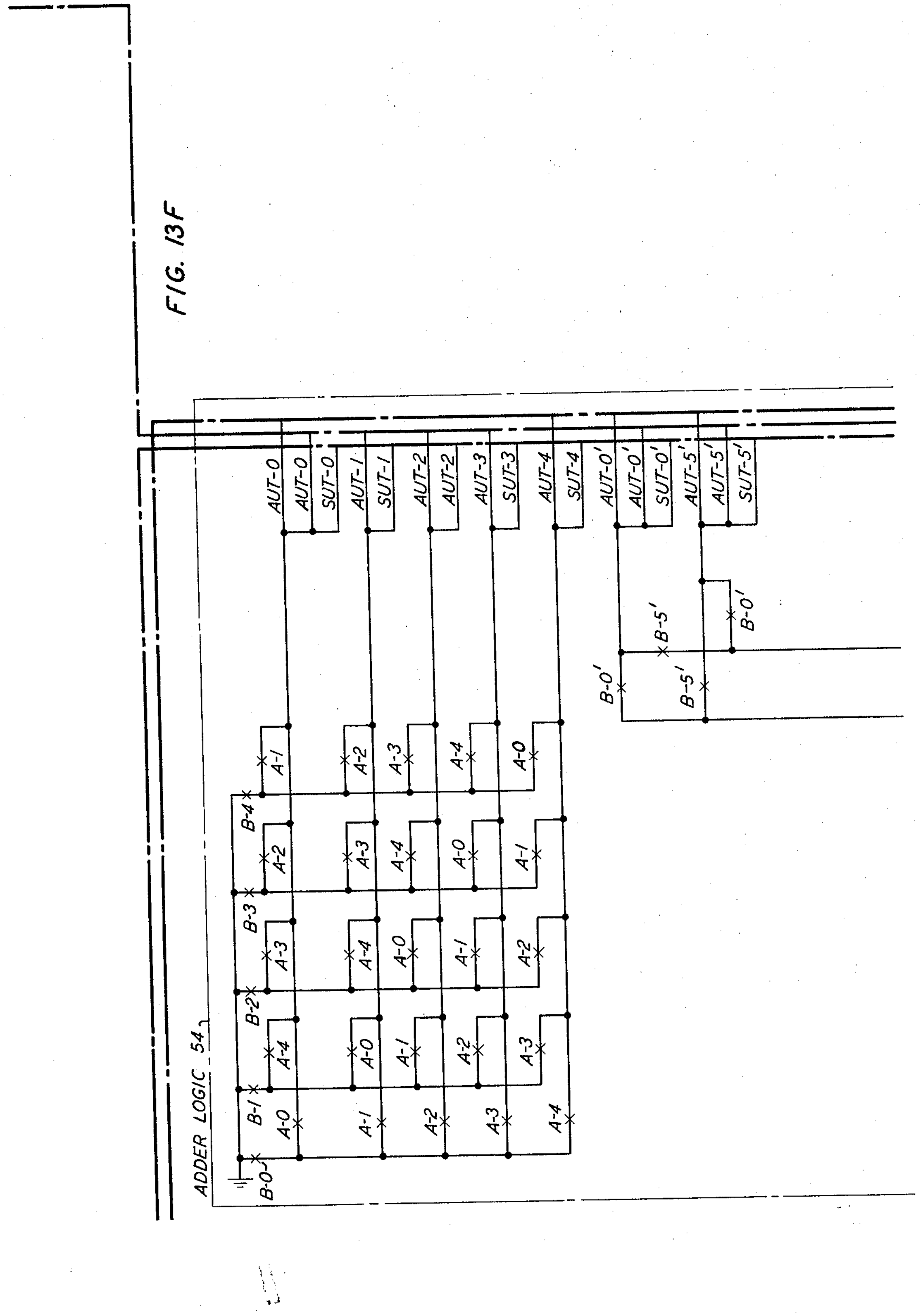
Figure 13G:
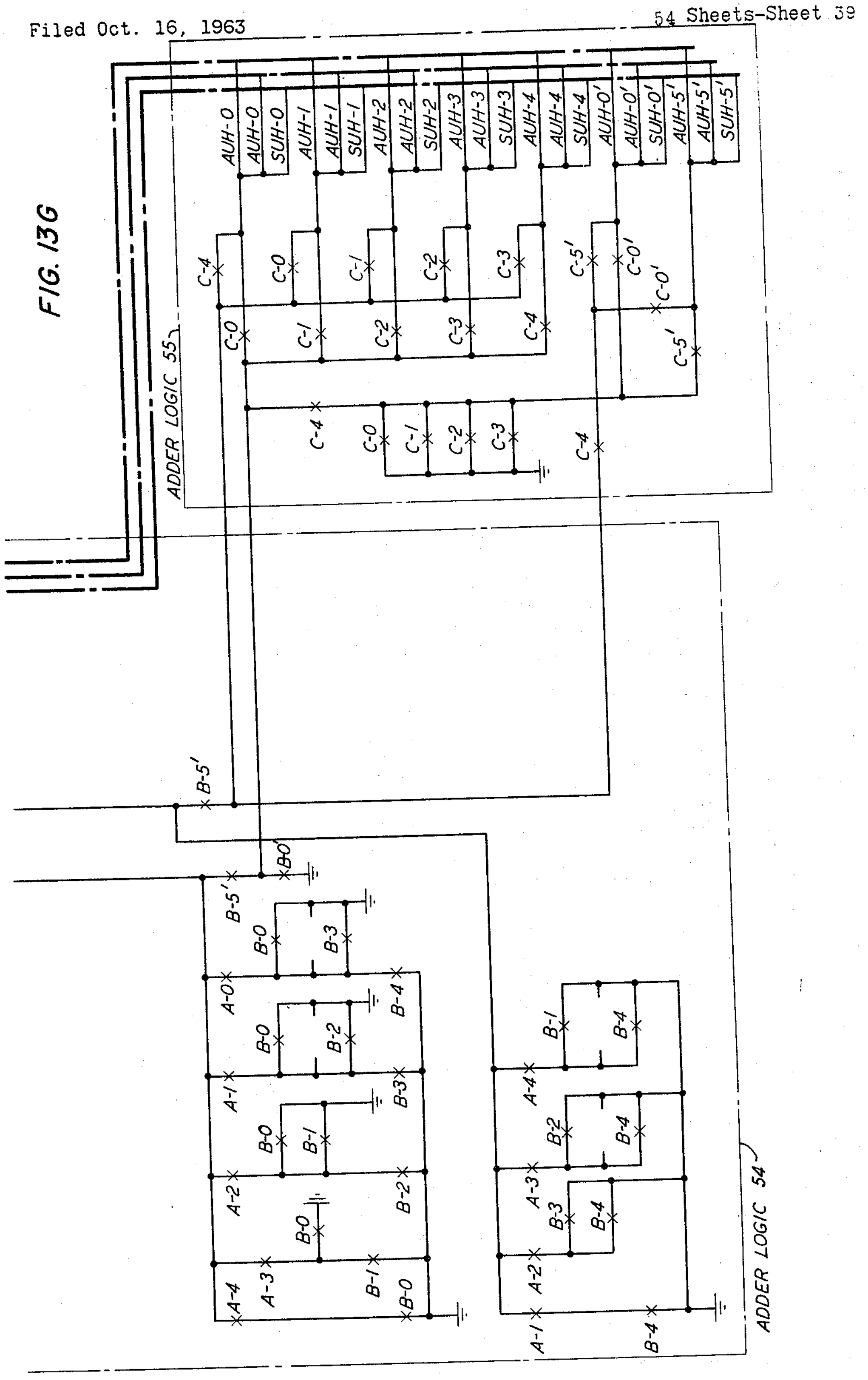

In determining the overtime charge, the output of the ORT relays is multiplied (FIGS. 13B through 13E) by that of the ATP relays to operate the B and C relays (FIGS. 13C and 13E). Simultaneously, with the OC relays normal, ORU and ATP relays interact (FIG. 13A) to operate an A relay. With the A, B and C relays operated, two of seven AUT relays and two of seven AUH relays are energized in the main adder (FIG. 15B). In addition one of two AUU relays is energized directly as a result of the interaction of the ORU and ATP relays. Since determination of the overtime charge requires operation of either the B-0′ or the B-5′ relay, one of these, with the IT and Z relays normal, operates the CD relay (FIG. 9B) to provide an output indication that charges are to be collected.

Figure 19A:
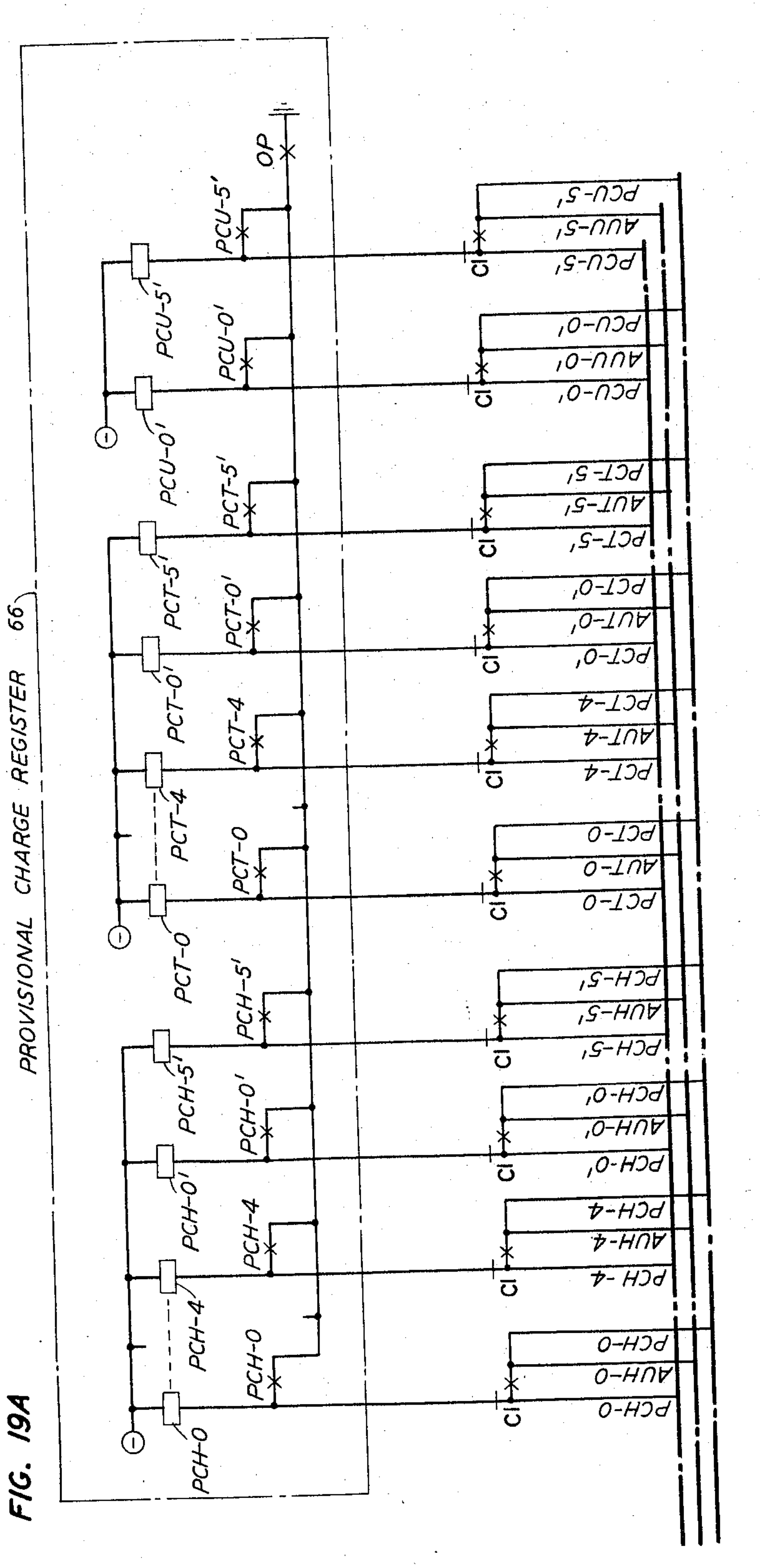
Figure 19B:
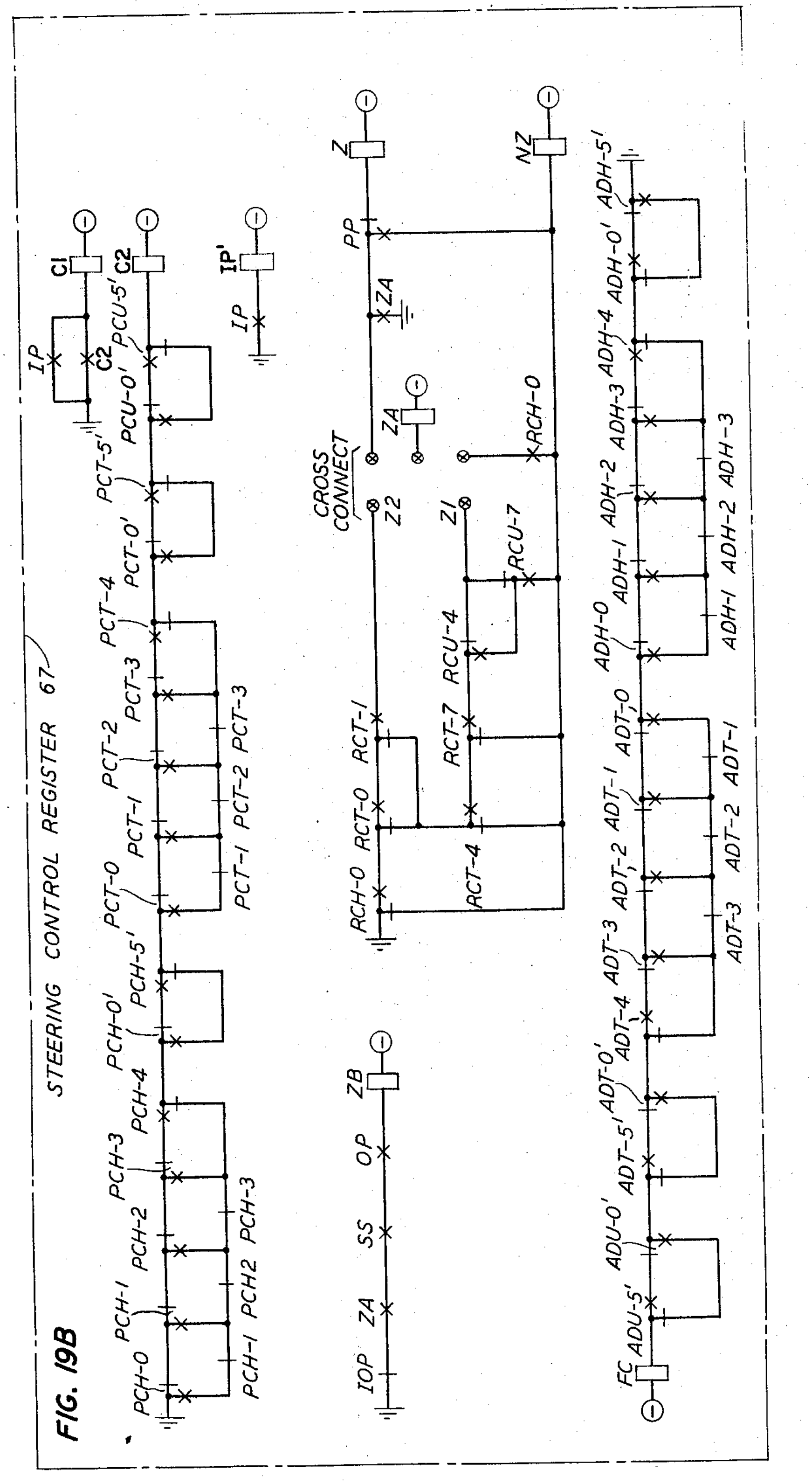

The overtime charge registered by the AUH, AUT and AUU relays is supplemented by the initial charge of the ADH, ADT and ADU relays. A partial sum is registered on two of seven PCT relays and one of PCU relays (FIG. 19A). The sum is completed by two of seven PCH relays whose settings depend upon whether the AUT relay operates the NC relay or the ADT relay operates the CO relay. In the latter case one digit is added to the PCH indication.

After the total charge is registered on the PCH, PCT and PCU relays, the C2 relay is energized to release the ADH, ADT and ADU relays (FIG. 15A). With the ADT relay in its released condition, the earlier operated CO or the NC relay (FIG. 15E) is also released.

Figure 15C:
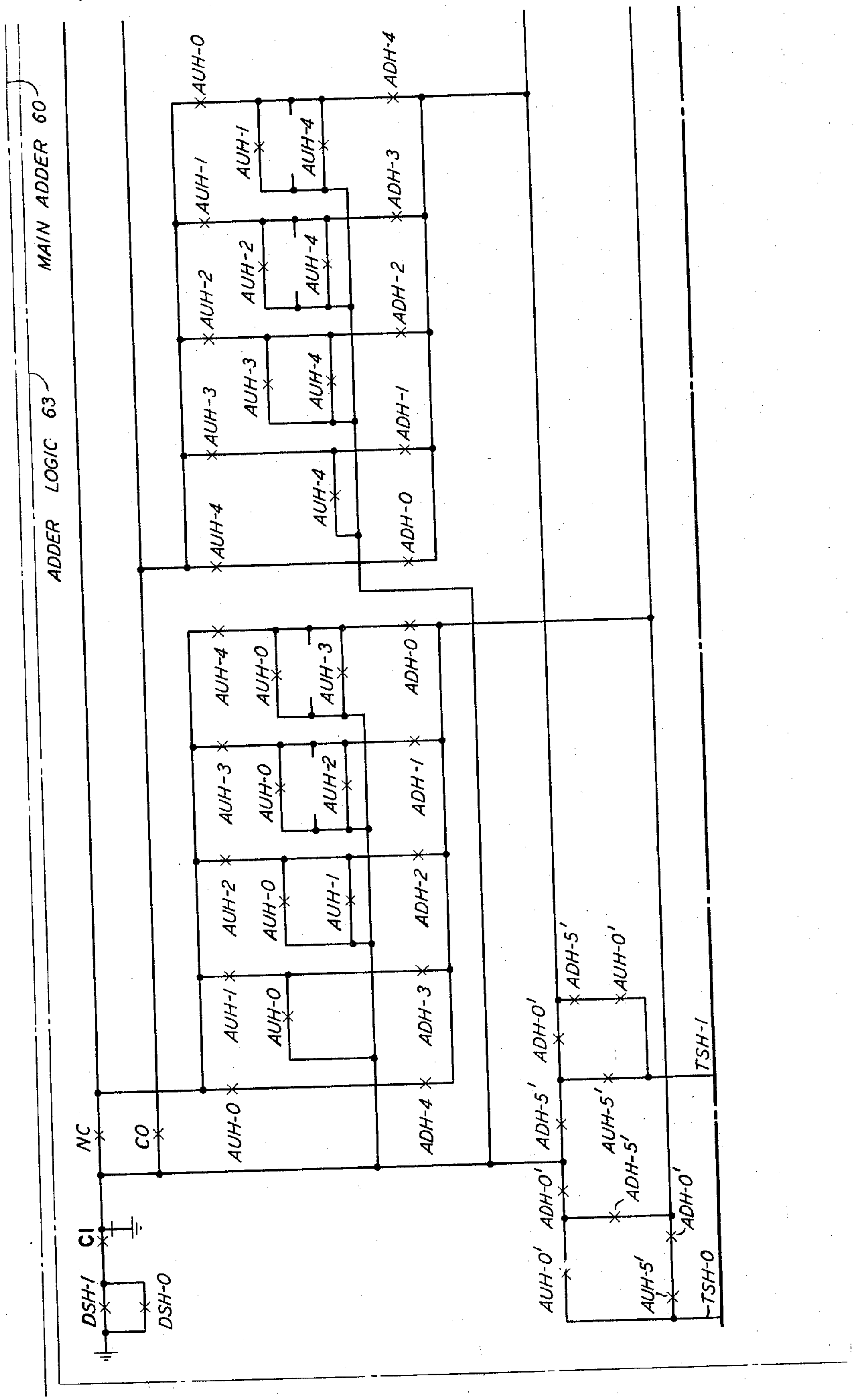
Figure 15D:
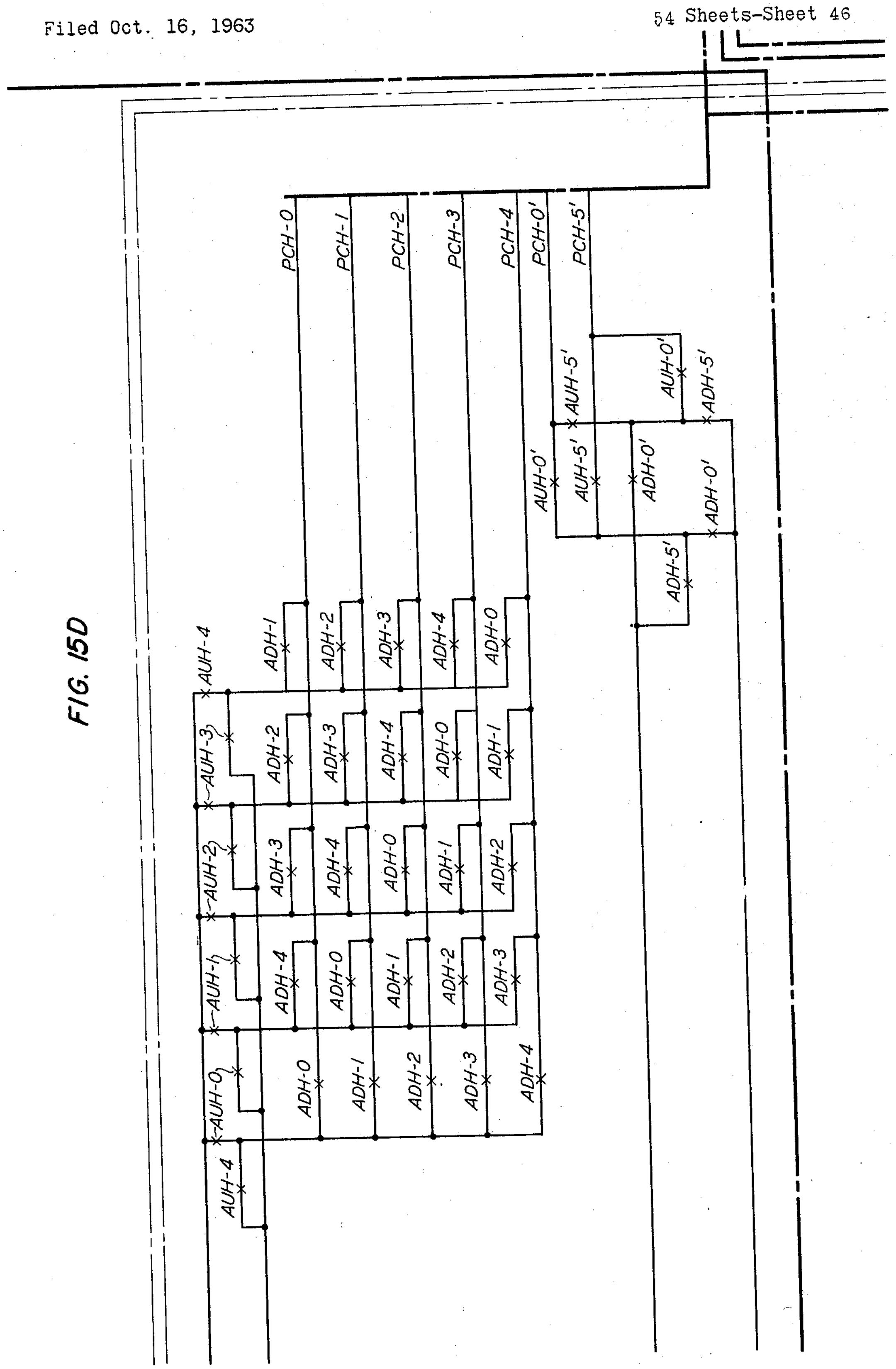
Figure 15E:
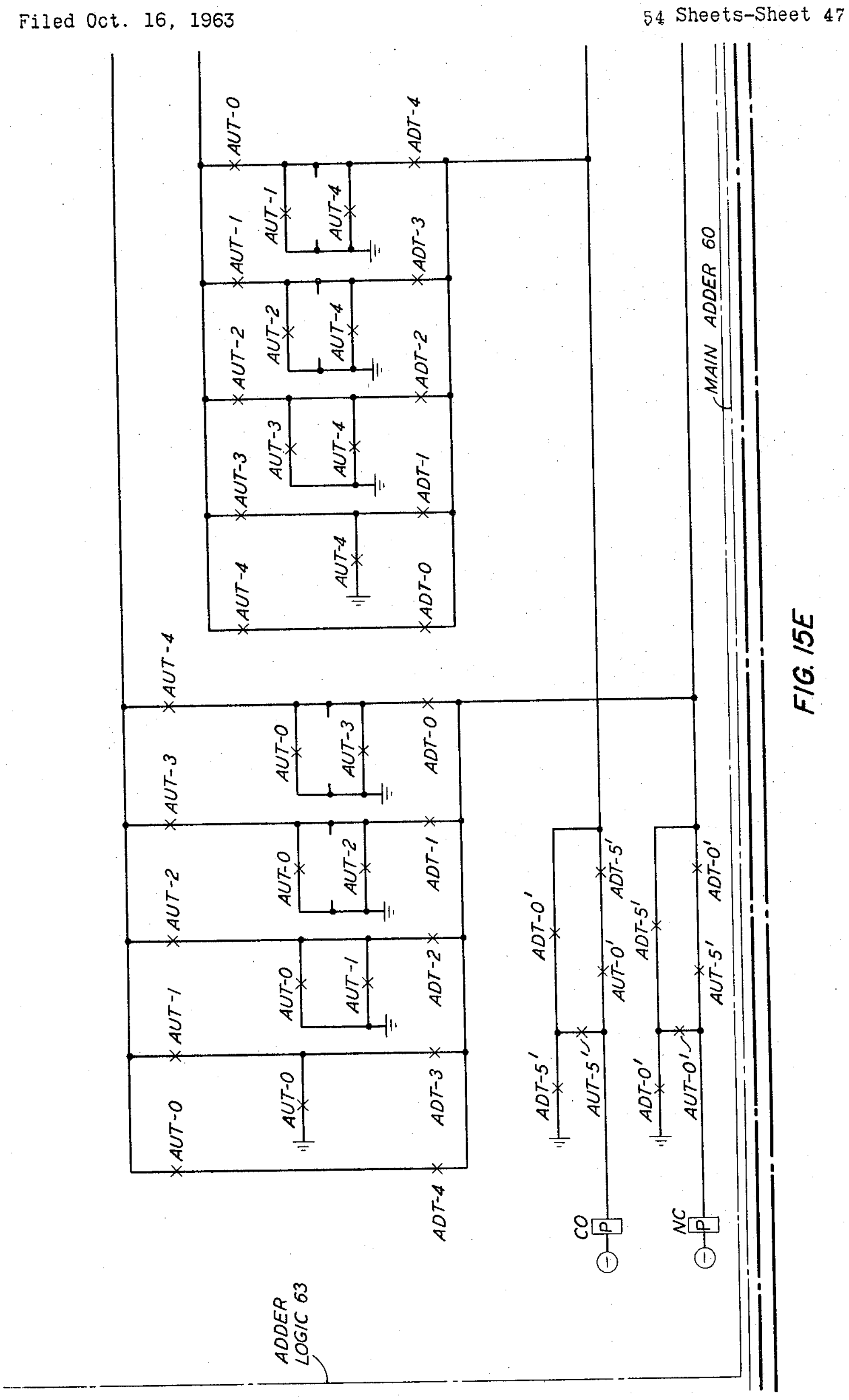
Figure 15F:
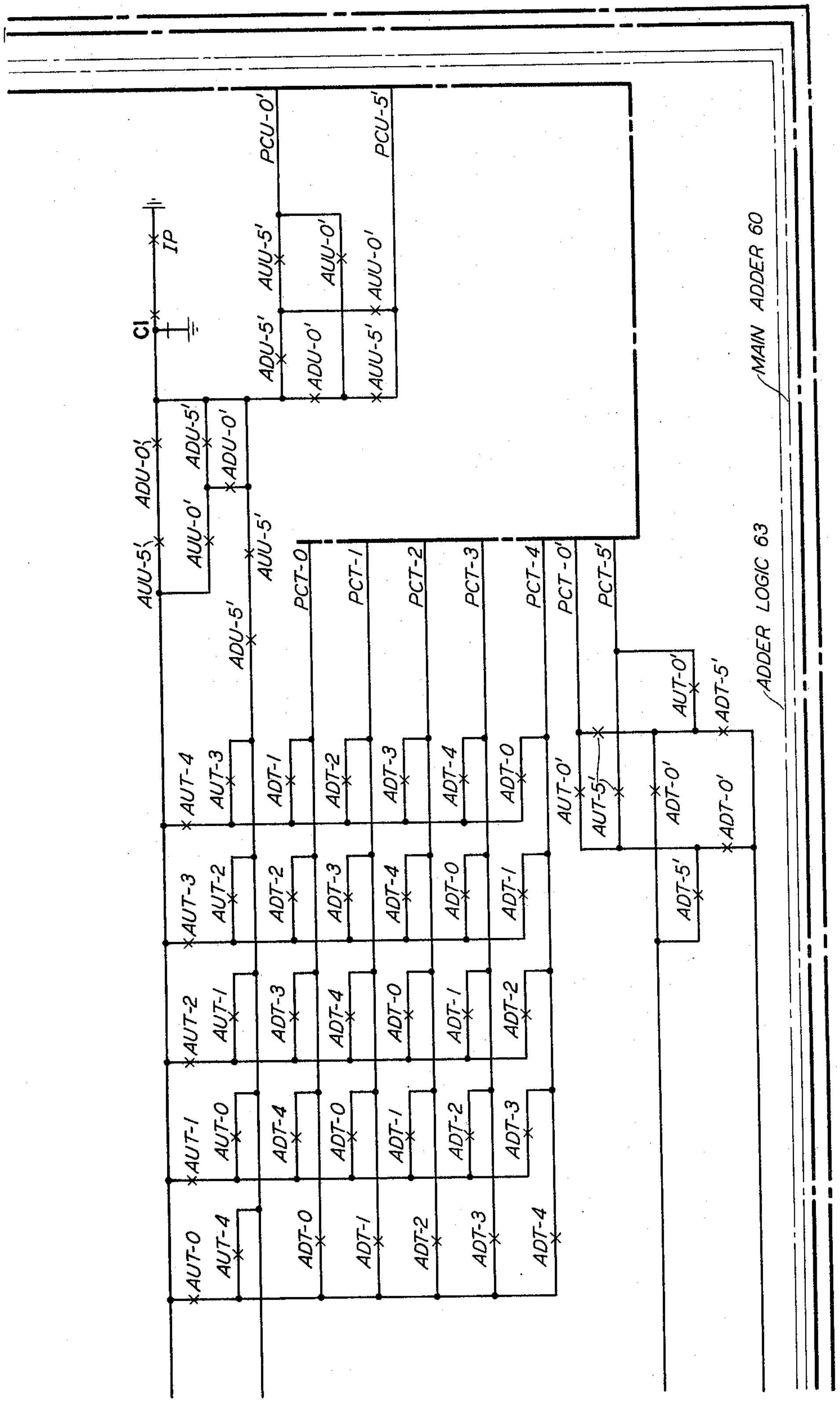

Next, ten percent of the PCH, PCT and PCU total appears on two of seven TST relays and one of two TSU relays (FIG. 18). This indicates the tax applicable to both the initial period and the overtime interval. Since the calculator is designed for a total computer tax of less than a dollar, the "zero" hundreds relay TSH-0 is grounded and locked through associated adder logic (FIG. 15C).

From the total tax on the TST and TSU relays, a subtraction (FIGS. 17A and 17B) is made of the initial tax on the IST and ISU relays. Ground paths extend from the subtracter through closed transfer contacts of the C2 relay to operate the ADH, ADT and ADU relays. In response to the ADT relays, either the NC or the CO relay operates according to the net tax to be collected and a Final Check FC (FIG. 19B) grounds either the T or the NT relay.

The net tax registered on the ADH, ADT and ADU relays is added to the total overtime charge registered on the AUH, AUT and AUU relays, with the C1 relay, operated earlier by the C2 relay, ground paths are extended to TCH, TCT and TCU relays (FIG. 9B). Operation of the latter supplies grounds to the control network of FIG. 1 by way of the transfer network, for displaying total overtime charges, including tax. The TMT and TMU relays indicate the duration in minutes of the time interval. Also received are CD and T or NT indication.

For overtime rate codes calling for a surcharge, OT code points (FIG. 7B) are cross connected to input code points S-5A through S-60F of the S-5 through S-60 relays (FIG. 7G) according to th surcharge to be imposed. The output code points of the S-5 through S-60 relays are cross connected to the OTR code points of the basic overtime rates. When activated, one of the S-5 through S-60 relays indicates the amount of the surcharge corresponding to the additional charge over and above the basic station-to-station overtime rate. The C3 relay which controls the switching of the surcharge units responds to the operation of any one of the S relays.

Figure 8A:
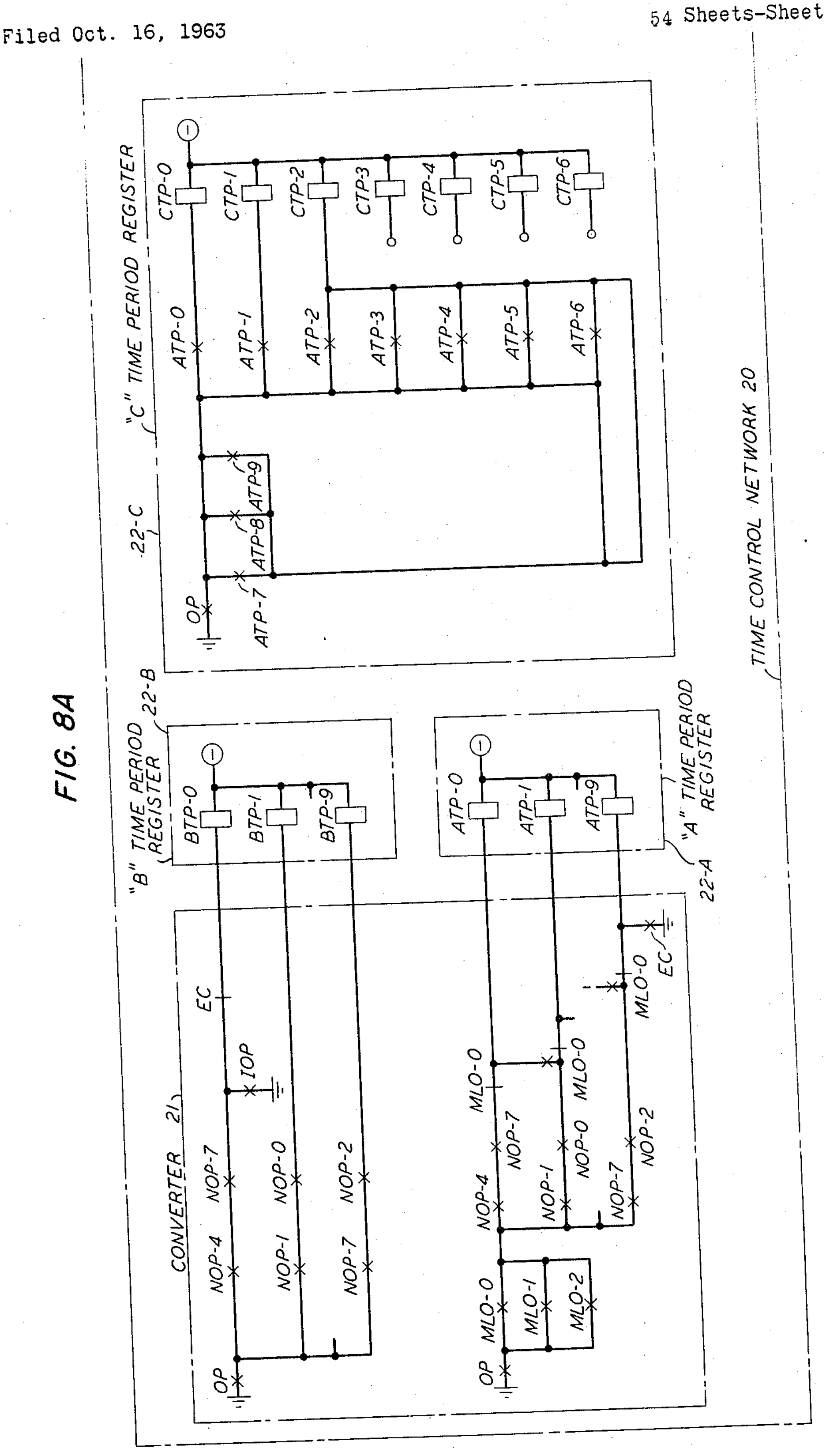

The number of surchargeable overtime periods, up to seven, is established through prewiring in the "C" time period register (FIG. 8A). Illustratively, only the first three periods have been made subject to a surcharge so that only the CTP-0 through 2 relays are connected. When one of the ATP relays operates, a CTP relay is energized to indicate the number of overtime periods subject to the surcharge.

Figure 14A:
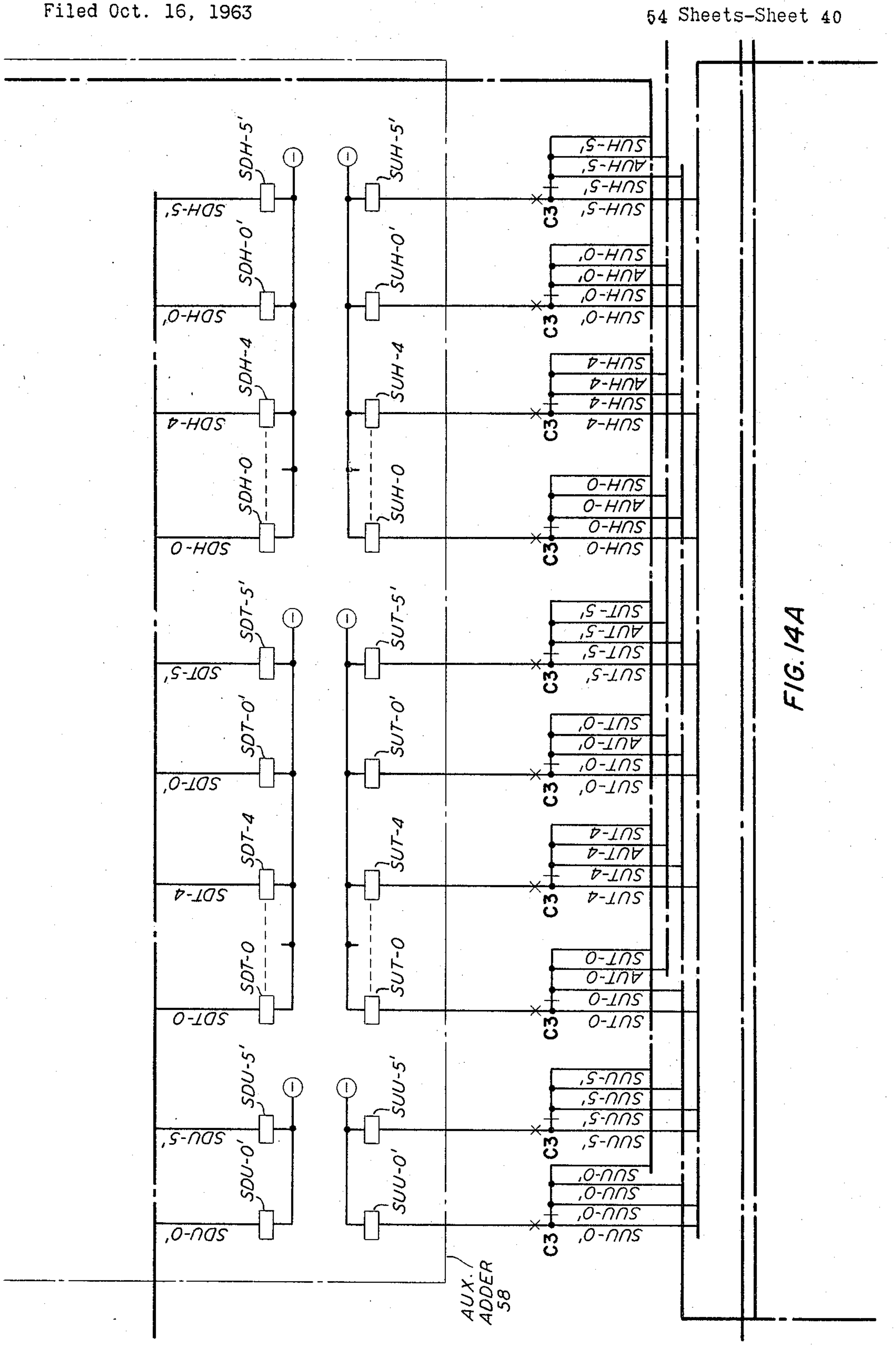
Figure 14B:
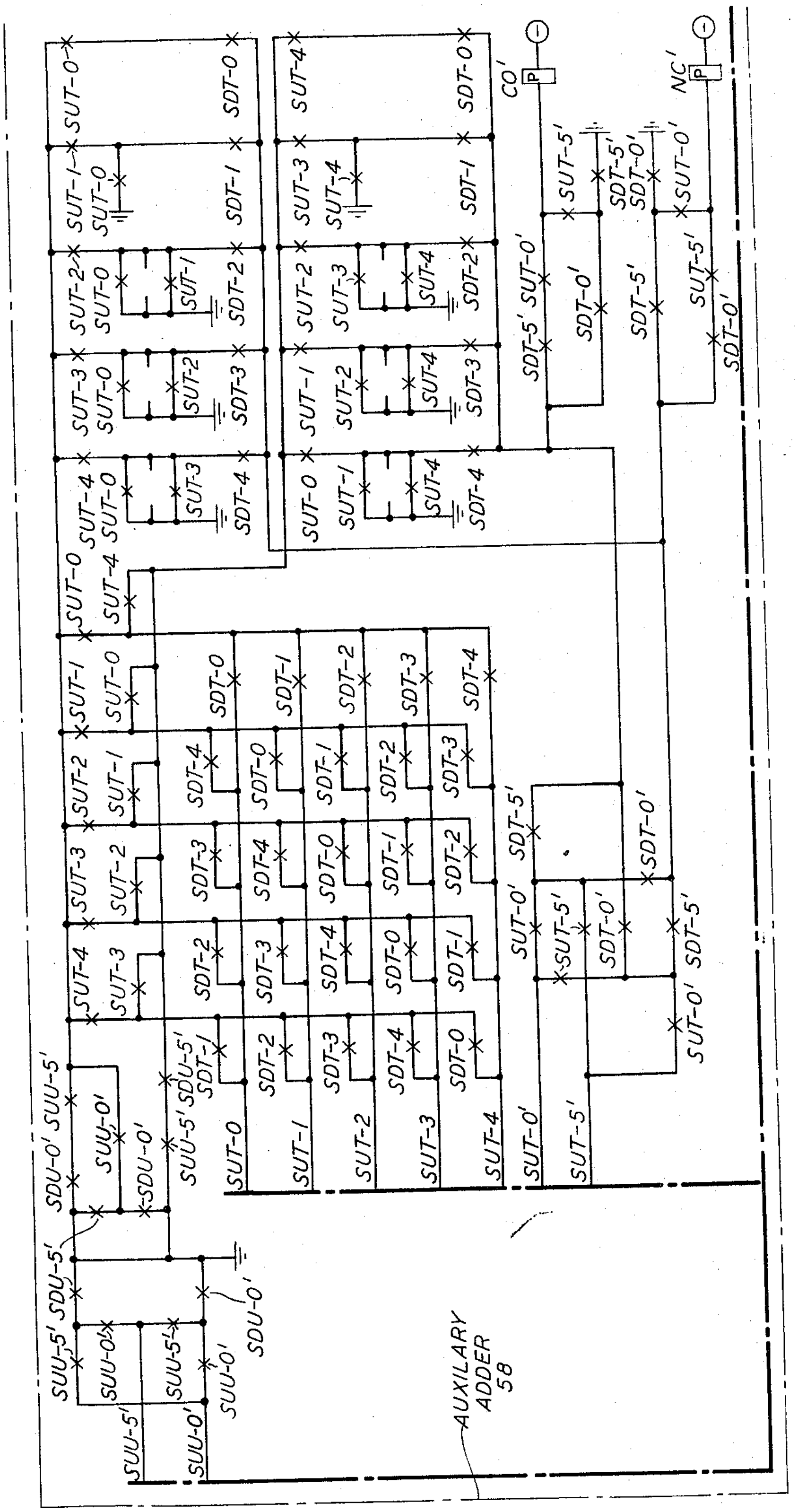
Figure 14C:
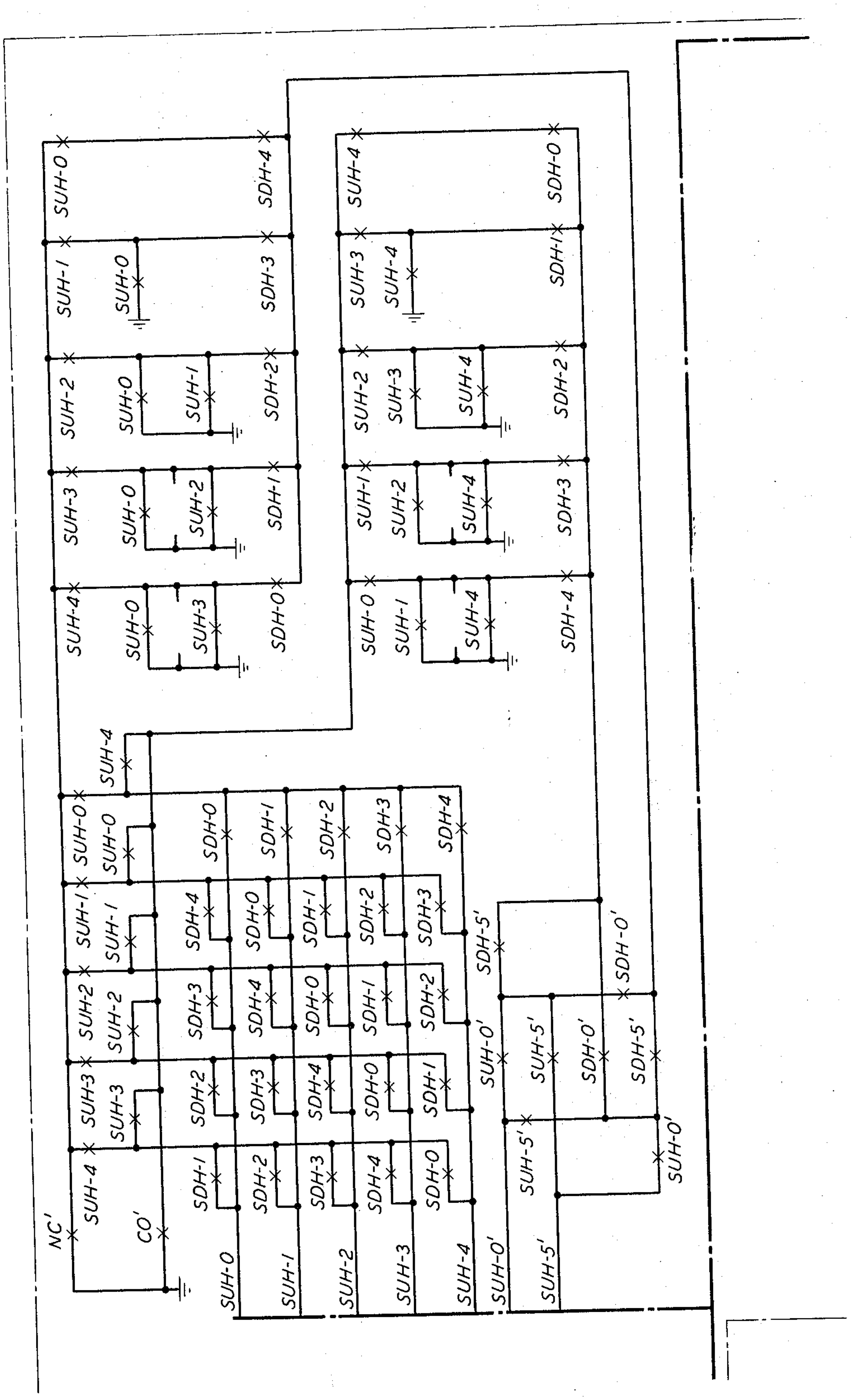

In carrying out the multiplication of the surcharge rate by the surcharge period, the C3 relay establishes ground paths for the AA, BB and CC relays (FIGS. 12A through 12C) whose settings are determined by the interaction of the CTP and S relays. Upon completion of the surcharge multiplication, one of two SDU relays is operated directly; while two of seven SDT relays operate (FIG. 12B) from the AA and BB relays and two of seven SDH relays operate (FIG. 12E) from the BB and CC relays. As a result, the total surcharge appears at SDH, SDT and SDU relays (FIG. 14A). Concurrently, because of the C3 relay, the output of the charge multiplier appears on the SUH, SUT and SUU relays.

The surcharge is added to the basic overtime charge in the auxiliary adder by the logic circuitry (FIGS. 14B and 14C) of the auxiliary adder. A ground connection is extended to either the CO′ relay or the NC′ relay by various responses of the SUT, SUU and SDT and SDU relays. Subsequently either the NC′ or the CO′ relay provides ground connections which allow the operation of two of seven AUH relays, two of seven AUT, and one of two AUU relays to register the total of the basic charge and its associated surcharge. The total charge thus registered is supplemented by the appropriate tax registered on the ADH, ADT and ADU relays in a fashion similar to that previously described.

Surcharges are not ordinarily imposed on calls exceeding ten overtime periods. For such calls, the surcharge section of the calculator is deactivated by an OP' relay (FIG. 6) which operates in place of the OP relay. This results in opening the operate path of the C3 relay which controls the surcharge section.

Figure 8B:
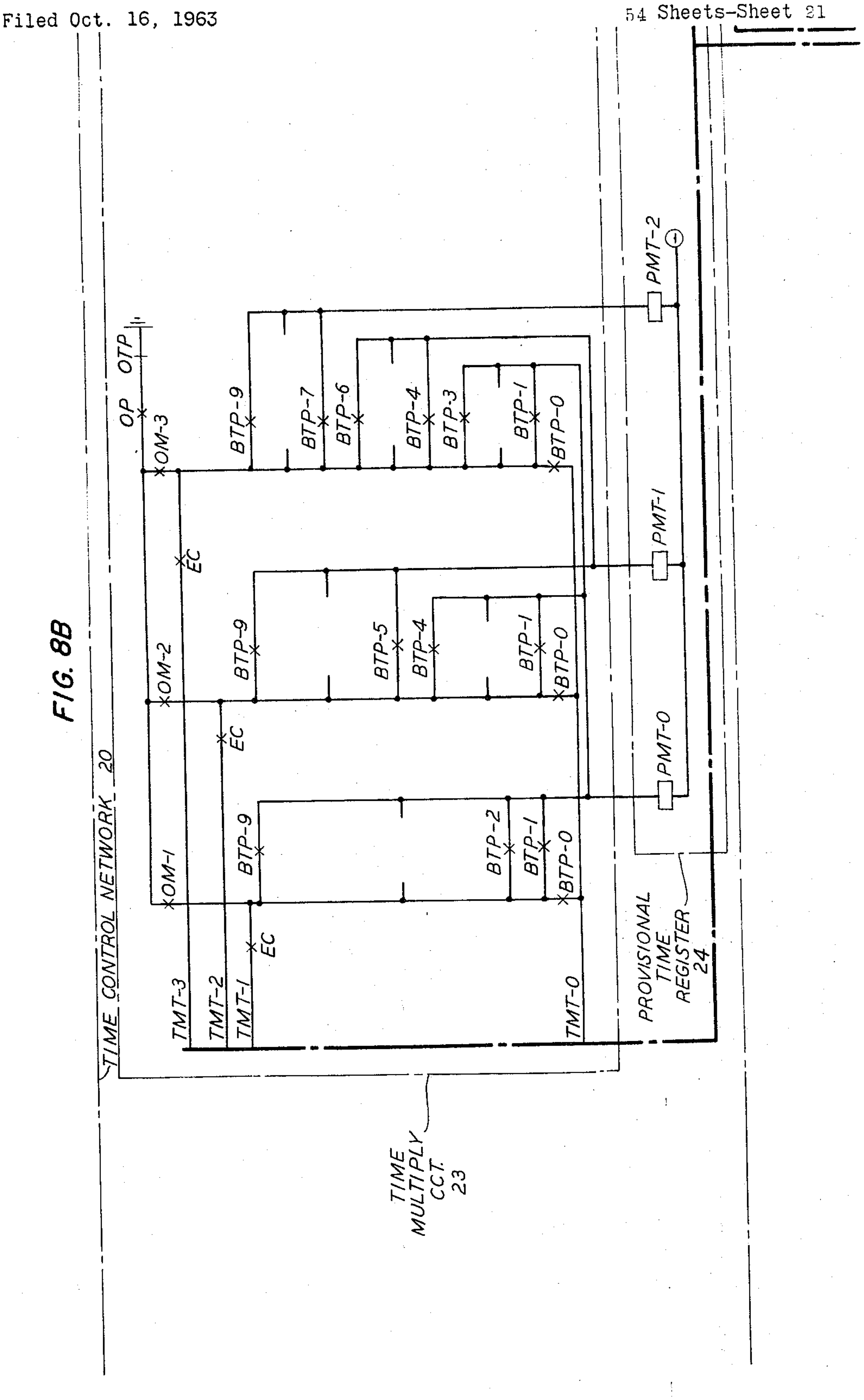
Figure 8C:
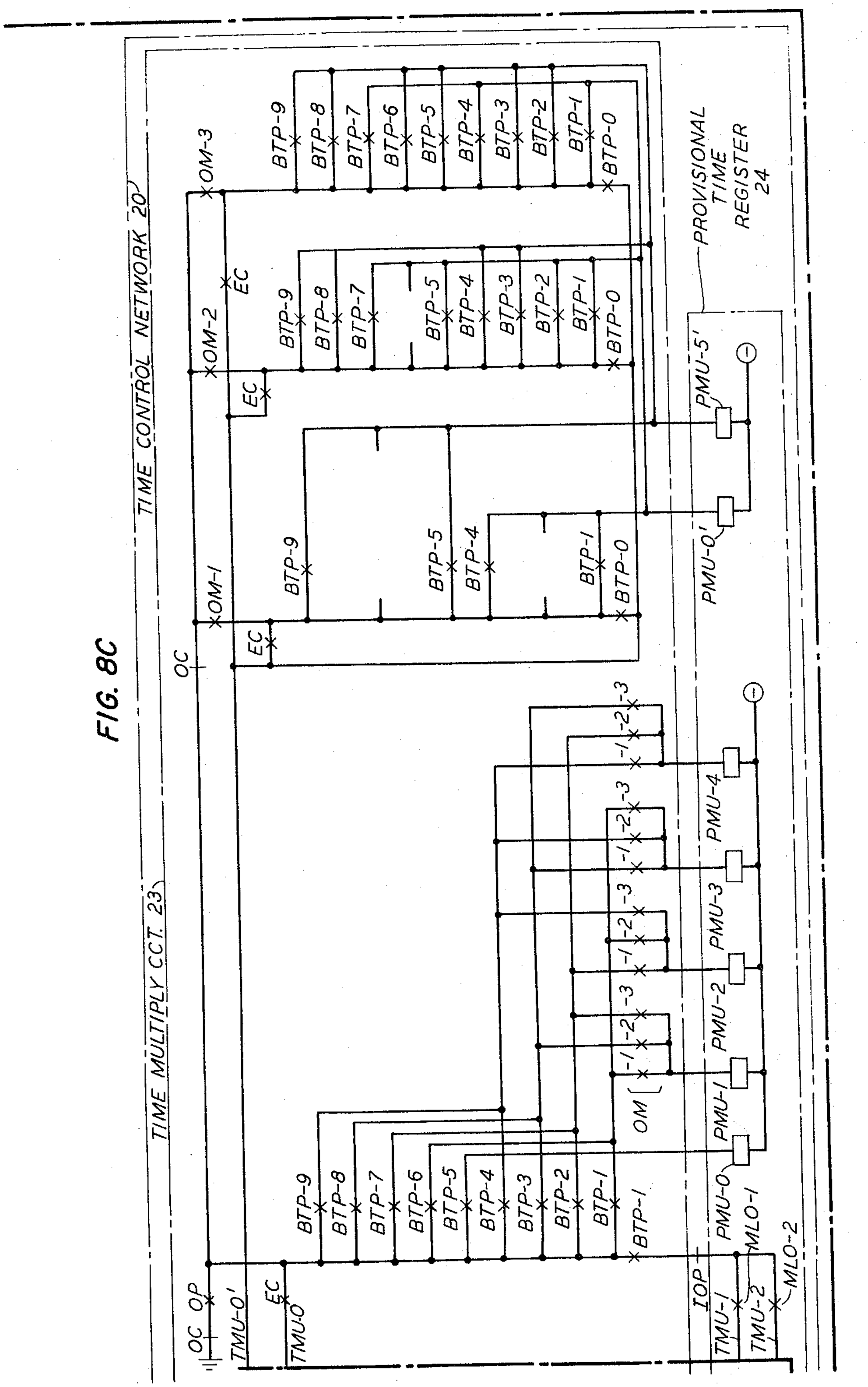

Whether or not there is a surcharge, the trunk timing recycles after ten overtime periods. The recycling is accompanied by the grounding of an EC relay (FIG. 6) to request calculated totals for the preceding cycle of operation. The EC relay operates the ATP–9 relay directly (FIG. 8A) to multiply the overtime period and the basic overtime charge by ten. Thus, for the overtime period, TMT and TMU relays give an indication of 10, 20 or 30 minutes depending upon whether the OM–1, 2 or 3 relay operates through the closed contacts of the OP and EC relays with the OC relay normal (FIG. 8B). Similarly the action of the ATP–9 relay in the multiplier (FIGS. 13A through 13E) results in TCH, TCT and TCU registration whose overtime charge constituent is ten times that of the basic charge.

Other details will be apparent to those skilled in the art. And, while the calculator has been largely instrumented with electromagnetic relays, electronic and other means may be employed in whole or in part.

Also apparent will be numerous adaptations and modifications which are encompassed by the invention.

I claim:

1. Calculator apparatus for developing signals representative of total assessed charges for telephone communication services comprising:
- means responsive to applied rate information for deriving a signal indicative of an initial service charge for a predetermined interval of time,
- means for supplementing said initial service charge signal by an amount representing a tax percentage thereof in accordance with a prescribed format,
- means responsive to said applied rate information for deriving a signal indicative of an overtime service charge for a subsequent interval of time,
- means for deriving a signal representative of a tax percentage of the sum of said initial and overtime charge signals in accordance with a prescribed format,
- and means for supplementing said overtime service charge signal by an amount corresponding to the difference between said two representative tax signals to derive a total assessed service charge for said subsequent interval of time.

2. Calculator apparatus for developing representative charge signals comprising:
- means responsive to applied rate information for deriving an initial service charge signal,
- means for supplementing said initial service charge signal by an amount representing a rounded percentage thereof,
- means responsive to said applied rate information for deriving an overtime service charge signal,
- means for deriving a signal representative of a rounded percentage of the sum of said initial and overtime charge signals,
- and means for supplementing said overtime service charge signal by an amount corresponding to the difference between said two rounded percentage signals.

3. In a communication system, apparatus for processing incoming rate information which comprises:
- means for developing an initial signal representative of a service charge for a predetermined interval of time,
- means for developing a signal proportional to a predetermined fractional portion of said representative service charge signal,
- means for developing a subsequent signal representative of a service charge for a subsequent interval of time,

- means for developing a signal proportional to the sum of said initial and said subsequent signals,
- means for developing a signal proportional to a predetermined fractional portion of said sum signal,
- means for developing a signal proportional to the difference between said two proportional fractional signals,
- and means for incrementing said subsequent signal by said difference signal to develop a signal representative of the total service charge for said subsequent interval of time.

4. Calculator apparatus for processing incoming rate information which comprises:
- means for developing an initial signal representative of a first service charge,
- means for developing a signal proportional to a rounded percentage of said representative service charge signal,
- means for developing a subsequent signal representative of a second service charge,
- means for developing a signal proportional to a rounded percentage of the sum of said initial and said subsequent signals,
- means for developing a signal proportional to the difference between said two rounded signals,
- and means for incrementing said subsequent signal by said difference signal to develop a signal representative of a total second service charge.

5. Calculator apparatus responsive to applied rate information for developing a total service charge signal, which comprises:
- means responsive to said rate information for developing a first signal representative of the charge for a predetermined period of service,
- means responsive to said rate information for developing a second signal representative of the charge for a second period of service,
- means for developing a third signal proportional to a predetermined fraction of said first charge signal,
- means for developing a fourth signal proportional to a predetermined fraction of the sum of said charge signals,
- means for developing a signal proportional to the difference of said third and said fourth signals,
- and means for supplementing said second charge signal by the proportional amount of said difference signal.

6. Calculator apparatus for developing a total communication service charge indication, which comprises:
- means responsive to applied rate information for developing a first service charge indication,
- means for developing a first signal proportional to a rounded percentage of said first charge indication,
- means responsive to said applied rate information for developing a second service charge indication,
- means for developing a second signal proportional to a rounded percentage of the sum of said service charge indications,
- means for developing a signal proportional to the difference of said first and said second signals,
- and means for supplementing said second charge indication by the proportional amount of said difference signal.

7. Apparatus for determining the charge for selected modes of communication services comprising:
- means responsive to applied rate information for developing an initial rate indication,
- addend register means for storing said initial rate indication,
- means responsive to said applied rate information for developing a subsequent rate indication,
- augend register means for storing said subsequent rate indication,
- means responsive to said addend and augend register means for developing an indication representative of the sum of said stored indications, means for deriving an indication proportional to a predetermined rounded fraction of said sum indication, means for deriving an indication proportional to a predetermined rounded fraction of said stored initial rate indication, and means for supplementing said stored subsequent rate indication by the difference between said two proportional rounded indications.

8. Apparatus for determining the charge including the tax thereon for telephone service comprising:

means responsive to applied rate information for developing an initial rate signal, means for storing said initial rate signal, means responsive to said applied rate information for developing an overtime rate signal, means for storing said overtime rate signal, means responsive to both of said storing means for developing a signal representative of the sum of said stored signals, means for deriving a signal proportional to a predetermined tax percentage of said sum signal, means for deriving a signal proportional to a predetermined tax percentage of said stored initial rate signal, and means for supplementing said stored overtime rate signal by the difference between said two tax percentage signals.

References Cited by the Examiner

UNITED STATES PATENTS

| | | | |
|---|---|---|---|
| 2,955,163 | 10/1960 | Ostline et al. | 179—7.1 |
| 3,074,640 | 1/1963 | Maley | 235—176 |
| 3,075,701 | 1/1963 | Wilhelmsen | 235—176 |
| 3,164,677 | 1/1965 | Morris et al. | 179—7.1 |

ROBERT C. BAILEY, *Primary Examiner.*

G. D. SHAW, *Assistant Examiner.*